(12) United States Patent
Ingold

(10) Patent No.: US 12,161,521 B2
(45) Date of Patent: Dec. 10, 2024

(54) ELECTRICAL BRUSH HANDPIECE AND AN ELECTRICAL TOOTHBRUSH HAVING THE ELECTRICAL BRUSH HANDPIECE AND AN ATTACHMENT BRUSH

(71) Applicant: TRISA HOLDING AG, Triengen (CH)

(72) Inventor: Andreas Ingold, Triengen (CH)

(73) Assignee: TRISA HOLDING AG, Triengen (CH)

( * ) Notice: Subject to any disclaimer, the term of this patent is extended or adjusted under 35 U.S.C. 154(b) by 642 days.

(21) Appl. No.: 17/601,355

(22) PCT Filed: Apr. 3, 2020

(86) PCT No.: PCT/EP2020/059570
§ 371 (c)(1),
(2) Date: Oct. 4, 2021

(87) PCT Pub. No.: WO2020/201511
PCT Pub. Date: Oct. 8, 2020

(65) Prior Publication Data
US 2022/0183809 A1 Jun. 16, 2022

(30) Foreign Application Priority Data
Apr. 5, 2019 (EP) .................................... 19167623

(51) Int. Cl.
*A61C 17/22* (2006.01)
*A46B 5/00* (2006.01)
(Continued)

(52) U.S. Cl.
CPC .......... *A61C 17/222* (2013.01); *A46B 5/0095* (2013.01); *A46B 9/04* (2013.01); *A46B 13/02* (2013.01); *A61C 17/3418* (2013.01)

(58) Field of Classification Search
CPC ....... A46B 13/02; A61C 17/222; A61C 17/32; A61C 17/34; A61C 17/3418
See application file for complete search history.

(56) References Cited

U.S. PATENT DOCUMENTS

2017/0141638 A1* 5/2017 Woog ..................... H02K 7/145

FOREIGN PATENT DOCUMENTS

| CN | 103490581 A | 1/2014 |
| CN | 103762817 A | 4/2014 |

(Continued)

OTHER PUBLICATIONS

Sep. 25, 2019 Extended Search Report issued in European Patent Application No. 19167623.8.
(Continued)

*Primary Examiner* — Randall E Chin
(74) *Attorney, Agent, or Firm* — Oliff PLC

(57) ABSTRACT

An electrical brush handpiece, in particular toothbrush handpiece, includes at least one interface for a coupling with a plug-on brush, includes at least one frame unit and includes at least one drive unit for driving the interface which is accommodated in the frame unit, the drive unit including at least one rotor and at least one reset element that is coupled with the rotor with a first end in a rotationally fixed manner and is fixated to the frame unit with a second end in a rotationally fixed manner, wherein the at least one reset element is implemented so as to be plate-shaped.

28 Claims, 19 Drawing Sheets

Figure 1:
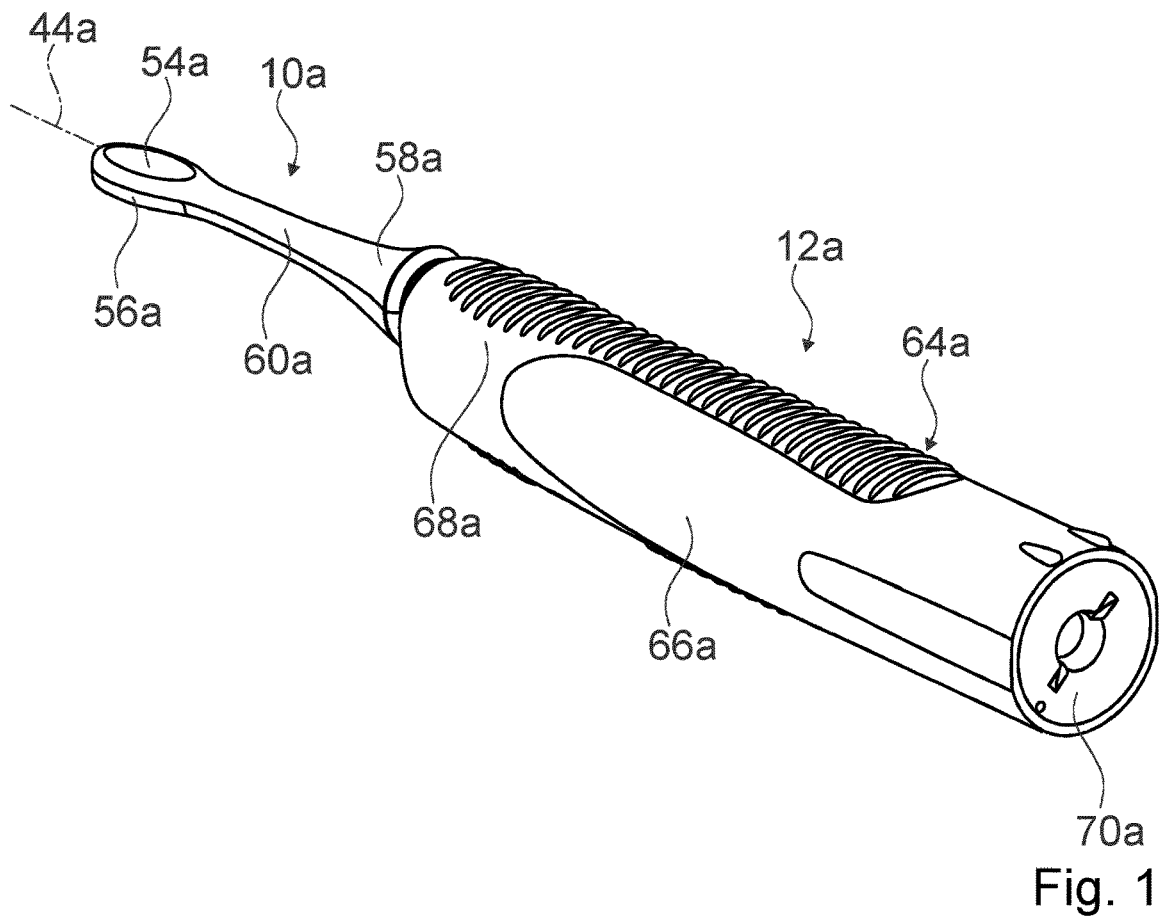

(51) Int. Cl.
*A46B 9/04* (2006.01)
*A46B 13/02* (2006.01)
*A61C 17/34* (2006.01)

(56) References Cited

FOREIGN PATENT DOCUMENTS

| | | |
|---|---|---|
| CN | 203656045 U | 6/2014 |
| CN | 205911933 U | 1/2017 |
| DE | 20319996 U1 * | 4/2004 ......... A61C 17/3418 |
| EP | 1 467 472 A2 | 10/2004 |
| EP | 2 246 009 A1 | 11/2010 |
| EP | 2 550 938 A1 | 1/2013 |
| EP | 2 550 939 B1 | 3/2016 |
| EP | 2 873 143 B1 | 5/2018 |
| EP | 2 873 144 B1 | 8/2018 |

OTHER PUBLICATIONS

Jun. 16, 2020 International Search Report issued in International Patent Application No. PCT/EP2020/059570.

Sep. 28, 2021 International Preliminary Report on Patentability issued in International Patent Application No. PCT/EP2020/059570.

Nov. 28, 2023 Search Report issued in European Patent Application No. 23192689.0.

* cited by examiner

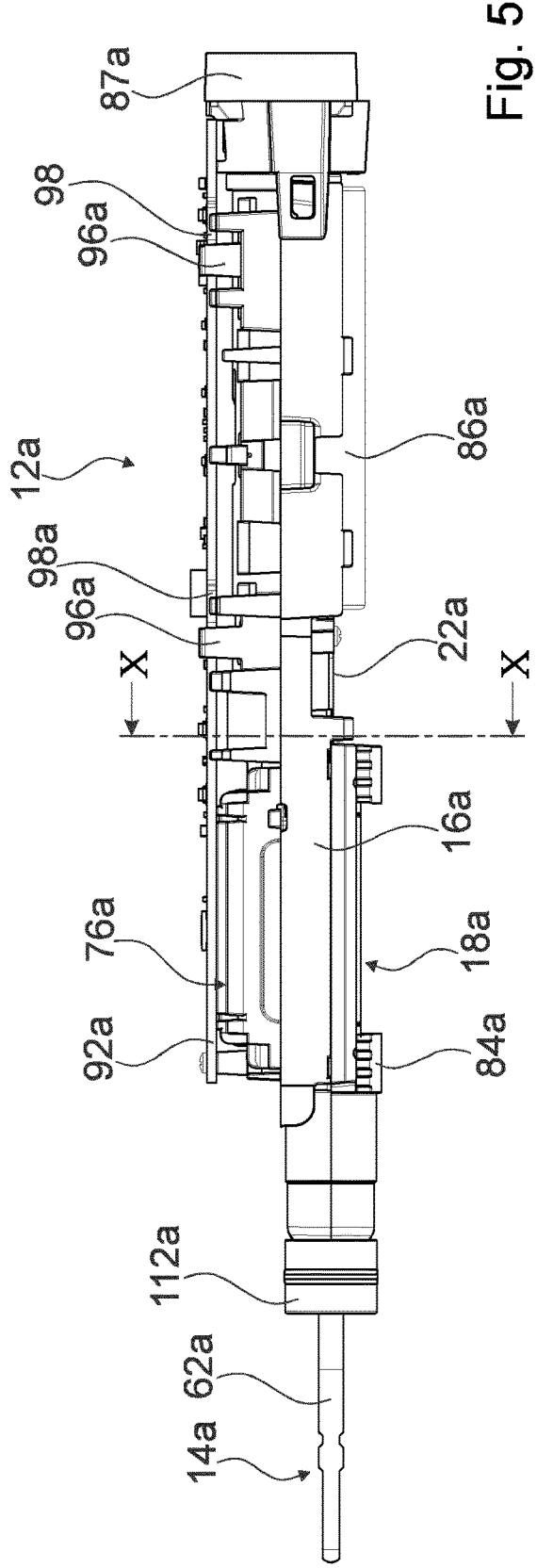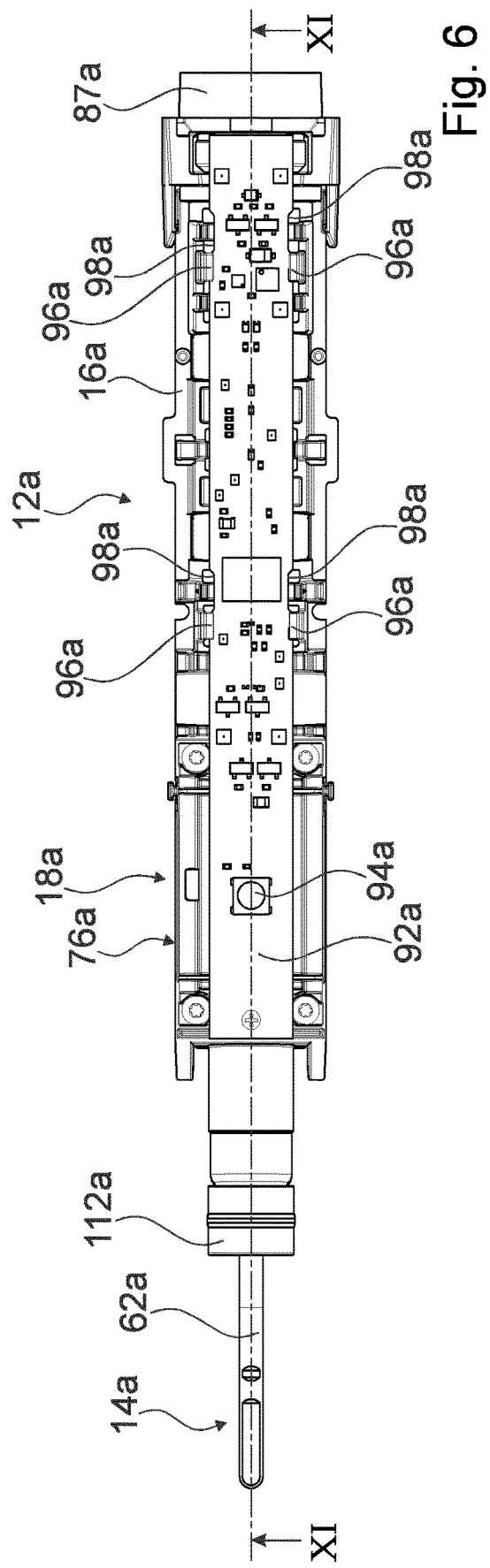

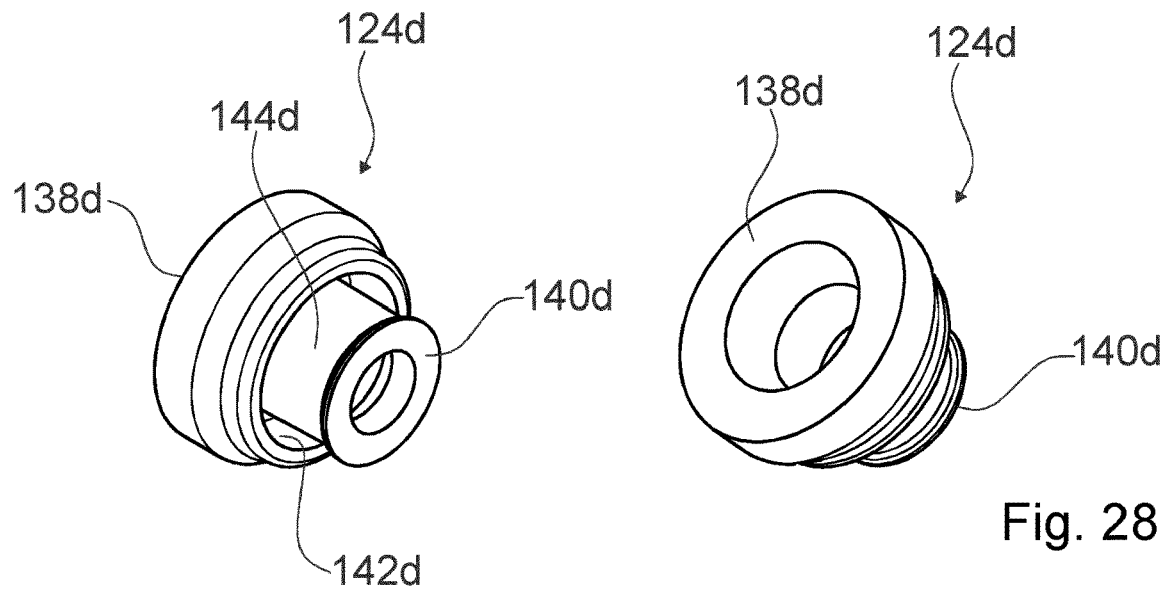
Fig. 27
Fig. 28
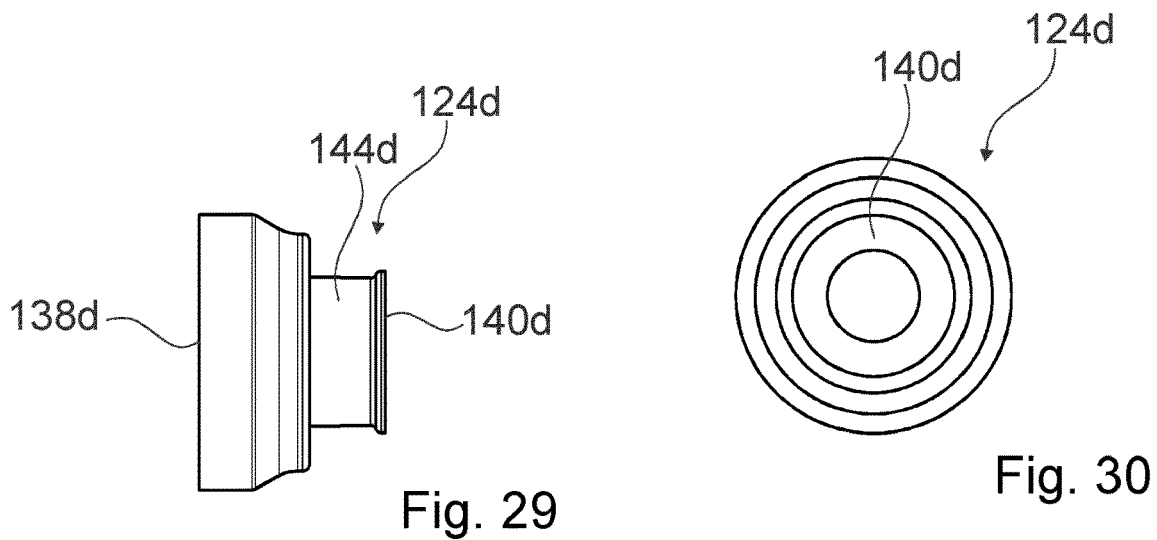
Fig. 29
Fig. 30
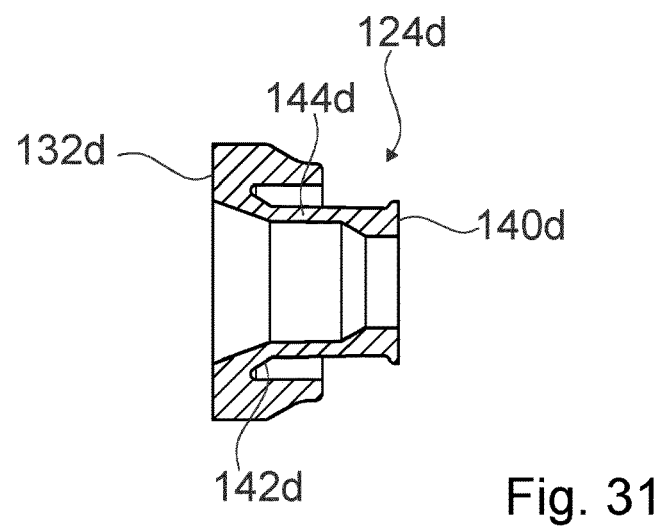
Fig. 31

ELECTRICAL BRUSH HANDPIECE AND AN ELECTRICAL TOOTHBRUSH HAVING THE ELECTRICAL BRUSH HANDPIECE AND AN ATTACHMENT BRUSH

STATE OF THE ART

The invention concerns an electrical brush handpiece and an electrical toothbrush having the electrical brush handpiece and a plug-on brush.

Electrical brush handpieces and electrical toothbrushes have already been proposed, like for example in the documents CN 103490581 B, CN 103762817 B, CN 205911933 U and EP 1 467 472 A2. Furthermore, the documents EP 2 873 143 B1, EP 2 550 938 B1, EP 2 873 144 B1 and EP 2 550 939 B1 are known.

In particular, electrical brush handpieces comprising at least one interface for a coupling with a plug-on brush, comprising at least one frame unit and comprising at least one drive unit for driving the interface, which is accommodated in the frame unit, the drive unit comprising at least one rotor and at least one reset element that is coupled with the rotor with a first end in a rotationally fixed manner and is fixated to the frame unit with a second end in a rotationally fixed manner, have already been proposed.

The objective of the invention is in particular to provide a generic device having improved characteristics regarding its space requirements and/or regarding its reset behavior.

A further objective of the invention is to provide a system for a sealing between a frame unit and a housing of a small electric appliance, in particular an electrical toothbrush or a face brush.

A further objective of the invention is an optimized actuation of the motor, for example via a sinus-shaped signal.

Another objective of the invention is to create a motor with a frame unit, which is optimized in its construction.

A further objective of the invention is to provide brush heads which optimally function with the mentioned motor construction. This allows optimizing a cleaning performance.

Advantages of the Invention

The invention is based on an electrical brush handpiece comprising at least one interface for a coupling with a plug-on brush, comprising at least one frame unit and comprising at least one drive unit for driving the interface which is accommodated in the frame unit, the drive unit comprising at least one rotor and at least one reset element that is coupled with the rotor with a first end in a rotationally fixed manner and is fixated to the frame unit with a second end in a rotationally fixed manner.

It is proposed that the at least one reset element is implemented so as to be plate-shaped. Preferably the at least one reset element is produced from a plate-shaped blank, like in particular a metal sheet. Preferably the frame unit extends axially over the entire drive unit. Preferably the frame unit forms part of the drive unit. Preferably the frame unit forms an accommodation for parts of the drive unit. Preferentially the drive unit is in particular implemented of a motor. The drive unit in particular comprises an electromotor. Preferably the electrical brush handpiece moreover comprises an energy storage and/or a charging coil. The energy storage and/or the charging coil are/is preferably accommodated in the frame unit. Furthermore, the energy storage is in particular realized by a rechargeable battery. However, a different implementation of the energy storage, deemed expedient by someone skilled in the art, would principally also be conceivable, like for example as a primary battery. Preferably the frame unit is in particular configured for accommodating a single energy storage cell, like in particular an AA energy storage cell, and for accommodating three energy storage cells at the same time, in particular three AAA energy storage cells. Preferentially, for three energy storage cells a frame is provided, which accommodates the three energy storage cells and fits into a receiving region of the frame unit for the single energy storage cell. Preferentially the frame unit is accommodated in a housing together with the drive unit. The frame unit is in particular realized such that is slid into a housing of the electrical brush handpiece.

The electrical brush handpiece is in particular implemented of an electrical body care apparatus. Preferably the electrical brush handpiece is implemented of an electrical toothbrush handpiece. Herein different forms of movement are conceivable for a plug-on brush, like for example oscillating, pivoting, translational, vibrating and/or combinations or superpositions thereof. The oscillation of the plug-on brush and/or of the moved part of the plug-on brush may occur substantially around an axis that is parallel or perpendicular to a longitudinal direction of the axis of the interface/rotation axis. However, other, in particular cosmetic, applications of the electrical brush handpiece are also conceivable, for example mascara, nail polish brushes, face brushes, applicators, massaging apparatus, make-up brushes and/or make-up sponges.

Preferentially the rotor is in particular configured to execute an oscillating movement. Particularly preferentially the rotor is in particular coupled with the interface, preferably with a shaft of the interface that is configured for transmitting a drive movement to a plug-on brush.

An "interface" is in particular to be understood, in this context, as a region of the electrical brush handpiece that is configured for a loss-proof coupling with an interface receptacle of a plug-on brush. Preferably the interface comprises a shaft of the interface that protrudes from a housing of the brush handpiece. The interface may further comprise a stud which the shaft of the interface protrudes from, the stud being attached (for example mounted, injection-molded, etc.) to the frame unit or to the housing. Preferably the interface receptacle is in particular configured for a force-fit and/or form-fit accommodation of the interface. The interface receptacle in particular forms a receiving region, which the interface of the brush handpiece can be slid into, wherein the interface gets latched and/or jammed in the receiving region, in particular when a defined slide-in force is exceeded. The interface may also be exchangeably connected to the receiving region in several positions (e. g. via latching and/or jamming, etc.), for example in a region of the shaft of the interface and also in a region of the stud. Preferably the interface receptacle is arranged on a side of the plug-on brush that faces away from the brush head.

A "housing" is in particular to be understood, in this context, as a protective outer casing of the brush handpiece. Preferably the housing encompasses a substantial portion of the brush handpiece. Preferentially the housing also comprises a handle region. Preferably the housing forms a handle of the brush handpiece. The housing is preferably implemented of a plastic housing. However, a different material, deemed expedient by someone skilled in the art, is principally also conceivable. The housing may furthermore be implemented of one piece but also in particular in two-shell fashion, which means consisting of two shells.

Preferably the housing comprises structural parts implemented of at least one hard component, which have a structural load-bearing function. Especially preferentially the housing is in particular implemented of hard components and soft components, wherein in particular gripping surfaces for holding and switching surfaces, in particular for operating switches, are made of the soft components. Preferably the soft components are realized as an injection-molded enveloping of the hard components and/or fill recesses in a peripheral region of the housing. Furthermore, a "fix frame unit" is in particular to be understood, in this context, as a unit which forms a support structure, which is implemented in one piece and/or at least consists only of fixedly interconnected parts. The fix frame unit is in particular different from a plurality of respectively separate individual frames. The frame unit preferably forms several receiving regions, in particular at least for the drive unit and the energy storage, which are positioned in a defined manner relative to one another, in particular both in an assembled state and in a non-assembled state. The fix frame unit is in particular configured to realize a pre-fabricated module, which can be built and/or introduced into the housing in one piece. The frame unit may in particular be designed to provide a variety of movements of the plug-on brush; this will result in a partially different structure of the frame unit and in different interface geometries. Both the housing and the frame unit are designed in such a way that differently structured frame units, for example frame units with different interfaces, can be accommodated in the housing. A holding, respectively fixation, of the frame unit in the housing is ensured in places which are not involved in a different construction. Furthermore, the housing and the frame unit are adapted to each other such that the geometries of the frame unit on a usage-side end of the housing are identical for the different movements of the plug-on brush, and thus the fixation points of the frame unit in the housing need not be changed.

A "reset element" is in particular to be understood, in this context, as an element, preferably a spring element, like for example a flexible spring or a torsion spring, which is configured to move the rotor back into a defined initial position after a rotation, thus forming a system that is capable of oscillation. Preferably the element is moreover configured for a dampening of the oscillating movement of the rotor in a change of the movement direction. In particular, the reset element is configured, respectively following a switching-off of the drive unit, to move the rotor back into an initial position. The reset element is in particular implemented in a spring-elastic fashion. In particular, the reset element is made of a spring steel. Especially preferentially the reset element is implemented by a leaf spring. "Plate-shaped" is in particular to mean, in this context, that the reset element has a thickness, in particular a thickness extension, that is essentially smaller, in particular smaller at least by a three-fold, in particular by a five-fold, preferably by a ten-fold and especially preferably by a fifteen-fold, than a width, in particular a transverse extension, and/or a length, in particular a longitudinal extension, of the reset element. Preferentially this is in particular to mean that a smallest imaginary rectangular cuboid, which just still encloses the structural unit completely, has a shortest side edge whose length is essentially smaller, in particular smaller at least by a three-fold, in particular by a five-fold, preferentially by a ten-fold and especially preferentially by a 15-fold, than the length of any side edge of the imaginary rectangular cuboid that runs transversely thereto. Preferably, the length of the shortest side edge of the rectangular cuboid is maximally 2 mm, preferably maximally 1 mm and particularly preferentially maximally 0.5 mm. Preferentially the material thickness of the reset element is 0.2 mm to 1 mm, preferably 0.3 mm to 0.7 mm. Preferably the material thickness of the reset element is constant over its entire length. Principally it would however also be conceivable that the reset element has a thickness profile. In particular, the spring constant of the reset element is adjustable via the material thickness and the respective width, for example at the shaft. "Configured" is in particular to mean specifically programmed, designed and/or equipped. By an object being configured for a certain function is in particular to be understood that the object fulfills and/or executes said certain function in at least one application state and/or operation state.

By the implementation of the electrical brush handpiece according to the invention, in particular an autonomous and reliable resetting of the rotor is achievable. It is in particular achievable that, after deactivation of the electrical brush handpiece, the shaft of the interface always stops in substantially the same position, respectively always moves back into the same position. In this way easy, always the same mounting of the plug-on brush is achievable in the deactivated state, resulting in a high degree of comfort. It furthermore possible to provide an advantageously compact, easily mountable reset element. In particular, advantageously small space requirements of the reset element are achievable.

In particular, an advantageous performance of the whole brush handpiece is achievable. It is furthermore in particular possible to provide a symmetrical spring having very narrow manufacturing tolerances, thus ensuring constant performance. The symmetrical shape permits easy alignment during assembly.

It is further proposed that the at least one reset element is implemented so as to be planar in a rest position. "Planar" is in particular to mean, in this context, that a main extension surface of the reset element is implemented so as to be planar. Preferably it is in particular to mean that the main extension area of the reset element runs at least substantially parallel to a largest side surface of a smallest imaginary rectangular cuboid that just still completely encloses the reset element. Preferentially, it is in particular to mean that a smallest imaginary rectangular cuboid, which just still encloses the structural unit, has a shortest side edge whose length at least approximately corresponds to a thickness of the reset element. Preferably the length of the shortest side edge of the rectangular cuboid is maximally 2 mm, preferably maximally 1 mm and particularly preferably no more than 0.5 mm. Preferentially a value of the thickness of the reset element amounts to at least 50%, preferably at least 70% and especially preferentially at least 90% of the length of the shortest side edge of the rectangular cuboid. Herein "at least substantially parallel" is in particular to mean an orientation of a direction relative to a reference direction, in particular in a plane, wherein the direction has a deviation from the reference direction that is in particular smaller than 8°, advantageously smaller than 5° and particularly advantageously smaller than 2°. This in particular allows providing a reset element that is easily built in. Preferably in this way a position of the reset element can in particular be captured in an advantageously simple manner. Moreover, it is thus in particular possible to provide an easily manufacturable reset element.

It is also proposed that the at least one reset element comprises at least one abutment element, which is for example implemented as an abutment projection and which is configured to adjoin an abutment of the frame unit in at least one first abutment position of the rotor. The rotor is preferably configured, in operation, for an oscillating movement in a defined angle range, said angle range being in particular delimited by two abutment positions. Preferentially the abutment element is configured to limit a rotation of a rotor of the drive unit out of an initial position in at least one direction, in particular toward the first abutment position. Preferably the abutment element is configured to limit an oscillating movement of the rotor toward the first abutment position. Preferentially the abutment element in particular serves to provide a movement of the rotor that is always the same. Preferably the abutment element, implemented as an abutment projection, is in particular realized by a mechanical abutment with which in a movement, when reaching an end position, the rotor abuts on at least one counter abutment. The at least one counter abutment may herein in particular be shaped in different ways. The at least one counter abutment is in particular formed by an abutment cylinder on the frame unit, wherein in particular a shape does not matter. The abutment cylinder is in particular arranged in the frame unit in an off-center fashion. The abutment cylinder in particular has a round, oval or polygonal cross section. In particular, the abutment cylinder has a T-shaped cross section shape. The counter abutment is herein in particular arranged in such a way that the abutment element hits on the counter abutment in case of a rotation, the end surface of the counter abutment being in particular adapted to a shape of the end surface of the abutment element. The abutment element preferably contacts the counter abutment only in one point of the surface; however, there may also be a contact line. However, a surface-to-surface contact would also be conceivable, wherein the surfaces would have to be aligned relative to the rotation axis. Preferentially, in an initial position of the rotor a minimum distance between the abutment element and the counter abutment is from 0.5 mm to 3 mm, preferably from 1 mm to 2 mm. The end surface of the counter abutment in particular has an area of 2 mm$^2$ to 20 mm$^2$, preferably of 5 mm$^2$ to 10 mm$^2$. It would also be conceivable, in order to dispense with a second abutment, that the abutment element is encompassed by a U-shaped counter abutment which the abutment element abuts on in both directions in case of a rotation. If the abutment element is implemented as an abutment projection, an "abutment projection" is in particular to mean, in this context, an abutment element that is realized as a projection. The abutment element is in particular configured for an abutment on a counter abutment, which is in particular positionally fixed relative to the housing and/or to the frame unit. In this way a movement of the rotor can be restricted selectively. It is in particular possible to restrict a movement of the rotor selectively in a defined manner. As a result, it is in particular possible to prevent a damaging to components of the drive unit, like for example the reset element, in particular by overload and/or overwinding. Furthermore, a manual overwinding of the rotor, for example by an operator, as a result of turning the plug-on brush, is avoidable. In particular, damaging of the brush handpiece is intentionally avoidable. Moreover, an overstraining of the reset element can be avoided, like for example when manually rotating the shaft of the interface and/or the output shaft, or if the motor is started when no plug-on brush is mounted on the shaft of the interface. It is in particular possible to provide a limitation of the deflection angle by geometric elements on the reset element and on the frame unit. Preferably, the abutment element does not abut on the counter abutment during normal operation. In an operation without a plug-on brush the abutment element can abut on the counter abutment.

It is moreover proposed that the at least one reset element comprises at least one further abutment element, which is configured to adjoin an abutment of the frame unit in at least one second abutment position of the rotor. Preferentially the further abutment element is configured to limit a rotation of a rotor of the drive unit out of an initial position in at least one direction, in particular toward the second abutment position. Preferably the further abutment element is configured to limit an oscillating movement of the rotor toward the second abutment position. Preferentially the further abutment element in particular serves to provide a movement of the rotor that is always the same. Preferably the abutment element is in particular realized by a mechanical abutment, with which the rotor mechanically abuts on a counter abutment when reaching an end position in a movement. The at least one counter abutment is in particular formed by an abutment cylinder on the frame unit wherein in particular a shape is not relevant. The abutment cylinder is in particular arranged off-center in the frame unit. The abutment cylinder in particular has a round, oval or polygonal cross section. In particular, the abutment cylinder has a T-shaped cross section. The counter abutment is herein arranged in such a way that the abutment element hits onto the counter abutment in case of a rotation, the end surface of the counter abutment being in particular adapted to a shape of the end surface of the abutment element. Preferably the abutment element contacts the counter abutment only in one point of the surface; however, there may also be a contact line. Principally, however, a surface-to-surface contact would also be conceivable, wherein the surfaces would have to be aligned relative to the rotation axis. Preferentially, in an initial position of the rotor a minimum distance between the abutment element and the counter abutment is 0.5 mm to 3 mm, preferably 1 mm to 2 mm. The end surface of the counter abutment in particular has an area of 2 mm$^2$ to 20 mm$^2$, preferably 5 mm$^2$ to 10 mm$^2$. This allows selectively limiting a movement of the rotor. It is in particular possible to selectively limit a movement of the rotor in a defined manner. In particular, it is in this way possible to prevent damaging of components of the drive unit, for example the reset element, in particular by overloading and/or overwinding. Furthermore, a manual overwinding of the rotor, for example by an operator, by turning the plug-on brush or starting the motor when there is no plug-on brush mounted on the shaft of the interface, is avoidable. It is in particular possible to selectively avoid damaging of the brush handpiece. The abutment element does not abut on the counter abutment during normal operation. In an operation without a plug-on brush the abutment element may abut on the counter abutment.

The first and the second abutment elements are preferably implemented symmetrically with respect to the rotation axis. Moreover, the two counter abutments are preferably also implemented symmetrically with respect to the longitudinal axis.

Beyond this it is proposed that the at least one abutment element and the at last one further abutment element extend on the first end of the reset element, on opposed sides transversely to a base body of the reset element and away from the base body of the reset element. Preferably each abutment element is allocated to an abutment position. In particular, each abutment element limits a rotation of the rotor in respectively one direction. Preferably the limitation is symmetrical to the rotation axis, which means that the movements are possible on both sides of the abutment element at a same angle. Preferably the reset element has at least approximately a T-shape, wherein the abutment elements in particular form the transverse beam of the T-shape. Preferentially the main extension directions of the abutment elements, respectively here the abutment projections, are arranged in a plane. In particular, main extension planes of the abutment elements, respectively the abutment projections, are arranged in a main extension plane of the of the abutment elements, respectively the abutment projections. By a "main extension direction" of an object is here in particular a direction to be understood that extends parallel to a longest edge of a smallest geometrical rectangular cuboid which just still completely encloses the object. By a "main extension plane" of a structural unit is in particular a plane to be understood which is parallel to a largest side surface of a smallest imaginary rectangular cuboid that just still encloses the structural unit completely, and which in particular extends through the center point of the rectangular cuboid. This advantageously allows incorporating an abutment into the reset element. It is furthermore in particular possible to provide an advantageous shape, in particular an easily manufacturable shape, of the reset element. Principally it would also be conceivable that the abutment elements, respectively the abutment projections, are arranged in a longitudinal axial direction in the middle of the reset element or between the first end and the middle of the reset element. This would, however, involve the disadvantage that the reset element is no longer entirely protected.

It has been shown that it is also possible to use 0-shaped or triangle-shaped reset elements. These two shapes of reset elements are dimensionally in the same range as the already-described reset element. Like in the already-described reset element, it is in these reset elements possible to adjust the spring constant via the thickness of the element. These two variants may furthermore be adjusted via the width of the respective frame. In these two variants the lateral frame elements are stressed respectively by torsion and by bending, in comparison thereto the already-described reset element is substantially subject to torsional stress in the shaft.

The O-shaped reset elements are themselves implemented in a plate-shaped manner, as a leaf spring. They have two parallel short sides and two parallel long sides. The reset element has in this context the shape of a frame, the interior of the reset element being an empty space. In a mounted state, the O-shaped reset element is oriented in the frame unit such that the two long sides are aligned parallel to the longitudinal axis, respectively the rotation axis. On the two short sides, in each case one hole is implemented for the fixation of the reset element by screws. The fixation itself is brought about at an adjoining surface on the rotor and at a fixation surface on the frame unit, which are of course modified relative to a T-shaped reset element, for example in regard to walls. The abutment elements are directly integrated in the "frame". The O-shaped reset element can abut with the corner regions, such that the movement is restricted.

The triangle-shaped reset elements are themselves implemented in a plate-shaped manner as a leaf spring. They are formed as an isosceles triangle having two long legs and a short third side. The reset element has in this context the shape of a frame, the interior of the reset element being an empty space. In a mounted state, the triangle-shaped reset element is oriented in the frame unit such that its perpendicular bisector is aligned parallel to the longitudinal axis, respectively the rotation axis. For a fixation of the reset element by screws, there is in each case one hole implemented in the vertex between the two legs and in the short side. The fixation itself is brought about at an adjoining surface on the rotor and at a fixation surface on the frame unit, which are of course modified relative to a T-shaped reset element, for example in regard to the walls.

The abutment elements are directly integrated in the "frame". The triangle-shaped reset element can abut with the corner regions between the short side and leg, such that the movement is restricted.

The O-shaped reset element as well as the triangle-shaped reset element have a width of the frame that is 1 mm to 5 mm, preferably 1.5 mm to 3 mm. The width is not necessarily implemented equally in all places, it may vary, for example in a region of the fixation holes.

It is further proposed that the at least one abutment element and the at least one further abutment element are configured to restrict a rotation of the rotor of a brush handpiece of a toothbrush having an oscillating bristle region, with a rotation axis that is substantially parallel to the longitudinal direction of the brush handpiece, to a rotation angle of 2° to 25°, preferably 4° to 18° and especially preferentially 4° to 15°. A rotation of the rotor of a brush handpiece of a toothbrush having an oscillating bristle region, with a rotation axis that is substantially perpendicular to the longitudinal direction of the brush handpiece, is restricted to a rotation angle of 5° to 35°, preferably 10° to 35° and especially preferentially 14° to 30°. Herein the rotation angle in particular corresponds to the total rotation angle, which means an addition of the deflection on the left, starting from the initial position, and the deflection on the right, starting from the initial position. In this way in particular an advantageously defined movement of the rotor is achievable. In particular, it is furthermore advantageously possible to achieve an autonomous resetting of the rotor.

It is moreover proposed that the at least one abutment element and the at least one further abutment element are in each case implemented so as to be curved along their respective main extension direction. Preferably, the at least one abutment element and the at least one further abutment elements in each case extend perpendicularly to a main extension direction of the reset element, away from a base body of the reset element, and curve in a direction that in the mounted state points away from the rotor. "Curved" is in particular to mean, in this context, that a midline of the abutment elements in each case has a curvature that is greater than zero. Preferably the midlines of the abutment elements in each case have a curved contour. A "curvature" in a point of a contour, in particular a midline, that is different from zero is in particular to mean, in this context, a deviation growing with a square of a distance to the point of the contour. In this way in particular an advantageously compact arrangement of the reset element is achievable. It is in particular achievable that a counter abutment for the abutment elements can advantageously be arranged axially on a level with the reset element. The abutment elements may advantageously be curved away from a rotor.

Beyond this it would be conceivable that the at least one abutment element and the at least one further abutment element can be used for a sensor system. The abutment elements may in particular be used for measuring a deflection angle, a contact pressure, that is in particular a pressure onto the cleaning element, respectively the plug-on brush, during usage, a current speed of the rotor, and/or a movement itself, e. g. a uniformity of the movement. There are in particular different possibilities for a back-reference, which means that a measurement on the reset element may, for example, provide input and/or feedback for the motor control or may actuate an optical element, for example an LED. It is in particular possible to achieve a regulation. Via the measurement of the deflection angle, it may, for example, be determined whether this already has a critical value that could result in a damaging of the reset element. By such a determination the motor control could regulate such that the deflection is reduced. Principally it would also be conceivable that the abutment elements are dispensed with and the reset element is implemented to be straight. It would herein in particular be conceivable that an abutment is realized, for example, directly on a rotor.

A further cluster of methods for the detection of the contact pressure and of the load on the motor concerns the measuring of the motor current. This enables, for example, a reduction of the movement if the contact pressure grows too large, or a reduction of the movement, even a stop of the apparatus, if an overload onto the reset element is imminent. This may occur, for example, if the apparatus is operated without a plug-on brush.

A deflection may also be restricted by an implementation of abutment elements on the rotor and corresponding counterpieces on the frame unit. These elements, when adapted to the reset element, also bring about the protection of the element that is necessary for avoiding damage to the reset element.

It is further proposed that the at least one reset element is implemented in an anchor shape, wherein the first end of the reset element is realized on a crown, in particular a crown of an imaginary anchor of the anchor shape. Preferentially the reset element has at least approximately an anchor shape. In particular, a base body of the reset element is herein implemented by a shank of the anchor shape. The abutment elements are preferably realized as abutment projections of arms with flukes of the anchor shape. Especially preferentially the reset element is connected to the frame unit in a region of a head of the anchor shape, and is connected to the rotor in a region of a crown of the anchor shape. The reset element in particular has the shape of an anchor with at least a head, a shank, a crown and arms with flukes. Other than an anchor, the reset element is in particular realized in one piece. Preferably all transitions of the reset element are contiguous and rounded. The reset element is furthermore free of burrs and has smooth surfaces. The surface roughness $R_a$ of the reset element is in particular 5 μm to 50 μm, preferably smaller than 20 μm. As a result, it is in particular possible to avoid causes for strain and rupture, like in particular sharp corners. Moreover, the free ends of the abutment elements, respectively the abutment projections, are preferably rounded. Preferably a transition from the base body to the abutment elements, respectively the abutment projections, is rounded, a radius being in particular 0.5 mm to 5 mm, preferably 1.5 mm to 2.5 mm. Preferentially a transition from the straight portion of the base body to a second fixation portion, in which the reset element is connected to the frame unit, is rounded, a radius being in particular 0.5 mm to 5 mm, preferably 1.5 mm to 2.5 mm. Preferably all the edges are rounded in their cross sections, a rounding radius being 0.1 mm to 0.7 mm, preferably 0.15 mm to 0.35 mm. The second fixation portion is preferably arranged on the second end of the reset element. The second fixation portion is in particular arranged centrally on a free end of the reset element and in particular has a hole. The hole is in particular located on a rotation axis of the rotor. Preferably the hole has a diameter of 1 mm to 2 mm, preferably of 1.3 mm to 1.7 mm. Preferably the reset element comprises, in the region of the crown of the anchor shape, a first fixation portion, in which the reset element is connected to the rotor. The first fixation portion is preferably arranged on the first end of the reset element. The first fixation portion is in particular arranged centrally in the region of the crown of the anchor shape of the reset element, and in particular comprises a hole. The hole is in particular arranged on a rotation axis of the rotor. The hole is in particular located symmetrically, centrally between the abutment elements. Preferably the hole has a diameter of 1 mm to 2 mm, preferably of 1.3 mm to 1.7 mm. A distance between the hole of the first fixation portion and the hole of the second fixation portion is in particular 8 mm to 16 mm, preferably 10 mm to 14 mm. On a side facing toward the rotor, the reset element in particular has in a top view a straight edge, which extends perpendicularly to an axis of the hole of the first fixation portion and/or perpendicularly to a main extension direction of the reset element, respectively of the rotation axis. A sidewise transition to the abutment elements, respectively abutment projections, is herein implemented in such a way that the straight edge is designed with the further contour of the outer edge, in a symmetrically increasing fashion, in a trapezoid shape (as an isosceles trapezoid and symmetrical trapezoid), wherein the trapezoid, that is the two legs, may in particular be also formed as a rounding. Principally it would also be conceivable that the abutment elements, respectively the abutment projections, extend in a straight fashion and form a T-shape with the base body of the reset element. Preferably, the reset element is implemented symmetrically with respect to a plane which the rotation axis of the rotor extends through. "In one piece/integrally" is in particular to mean connected at least by substance-to-substance bond, for example by a welding process, a gluing process, a (surrounding) injection molding process and/or another process that is deemed expedient by someone skilled in the art, and/or advantageously formed in one piece, like for example by a production from a cast and/or by a production in a one-component or multi-component injection molding procedure, and advantageously from a single blank. This in particular allows providing an advantageous shape of the reset element. As a result, in particular an advantageously compact implementation of the reset element is achievable. It is in particular achievable that a counter abutment for the abutment elements can be advantageously arranged in an axial region of the reset element. The abutment element, respectively abutment projections, may advantageously be curved away from a rotor.

Preferably the reset element has a length of 12 mm to 20 mm, preferably of 14 mm to 18 mm. Along the central axis the reset element has its first fixation portion, a straight portion and the second fixation portion. The straight portion herein has a length of 3 mm to 10 mm, preferably of 5 mm to 8 mm, and is arranged centrally between the first and second fixation portions. The first fixation portion and the second fixation portion are respectively arranged on opposite sides of the straight portion, dividing the remaining length equally among them. Preferentially the reset element has a width across the abutment elements of 7 mm to 15 mm, preferably 10 mm to 14 mm. In the straight portion the reset element has a width of 1 mm to 4 mm, preferably of 1.5 mm to 3 mm. The second fixation portion in particular has a width of 2 mm to 8 mm, preferably of 3 mm to 5 mm. While the described measurements of the reset element are optimized for a brush handpiece of a toothbrush with an oscillating bristle region, with a rotation axis that is substantially parallel to the longitudinal direction of the brush handpiece, said measurements may also be used for a brush handpiece with an oscillating bristle region, with a rotation axis that is substantially perpendicular to the longitudinal direction of the brush handpiece.

In a further implementation variant, for example for a brush handpiece with an oscillating bristle region with a rotation axis that is substantially perpendicular to the longitudinal direction of the brush handpiece, the length of the reset element may also be modified. The reset element may be implemented having a greater length, which may in this case be 17 mm to 30 mm, preferably 19 mm to 27 mm. With the increased length an optimization of the movement is achievable. Herein the length of the above-described straight portion is increased. The implementation of the fixation portions and abutment elements remains as described.

It is moreover proposed that the at least one reset element is implemented at least partially of a spring steel. Preferably the reset element is implemented in a shape of a leaf spring, which is strained at least partly in regard to a torsion and/or a bending. Herein principally micromovements in an axial direction are also conceivable, which are caused by the leaf spring being fixated in two points in an axial direction, with the leaf spring rotating/twisting and therefore of course also slightly moving and/or stretching and/or expanding in the axial direction. Preferentially the reset element is completely made of spring steel. Preferentially the spring steel is a steel having a higher strength than other steels. The spring steel preferably is an alloy. The reset element is in particular implemented of a tempered spring band steel. The reset element is in particular made of a tempered spring band steel. The spring steel is in particular magnetic. Different types of spring steel are conceivable, which are deemed expedient by someone skilled in the art. The spring steel is preferably realized as a spring steel according to the German standard 1.1274 comprising maximally 1.05% carbon, 0.15 to 0.30% silicon, 0.30 to 0.45% manganese, maximally 0.02% phosphorus, maximally 0.02% sulfur and about 0.01% chromium, and/or as a spring steel according to the German standard 1.1269 comprising maximally 0.8 to 0.9% carbon, 0.15 to 0.35% silicon, 0.40 to 0.70% manganese, maximally 0.025% phosphorus, 0.025% sulfur and less than 0.4% chromium. A spring steel in particular must have a great capability of elastic shape-changing. It must further have a high elastic limit, high elongation and high contraction at fracture, as well as a good creep strength and vibration fatigue strength. The elasticity of the spring steel is in particular achieved in the production process by a specific alloy by adding silicon (Si), manganese (Mn), chromium (Cr), vanadium (V), molybdenum (Mo) and/or nickel (Ni). The spring steel should in particular have a smooth rupture-free surface. The tensile strength of the spring steel may preferably be increased by a finishing tempering. There are non-magnetic as well as magnetic spring steels. The spring steel of the reset element is in particular magnetic. Preferably the reset element has a spring constant of 5 mNm/° to 24 mNm/°, preferentially 9 mNm/° to 13 mNm/°. Herein the spring constant for a brush handpiece with an oscillating bristle region, with a rotation axis that is substantially parallel to the longitudinal direction of the brush handpiece, is in particular optimized for oscillations of 200 Hz to 420 Hz, preferably of 250 Hz to 350 Hz. The spring constant is herein in particular optimized for oscillations of 260 Hz+/−20 Hz. 260 Hz is herein in particular equivalent to approximately 15,600 oscillations per minute, corresponding to 31,200 wiping movements, i.e. to-and-fro movements. 333.3 Hz is herein in particular equivalent to approximately 20,000 oscillations per minute, corresponding to 40,000 wiping movements, i.e. to-and-fro movements. The spring constant of a brush handpiece with an oscillating bristle region, with a rotation axis that is substantially perpendicular to the longitudinal direction of the brush handpiece, is herein in particular optimized for oscillations of 100 Hz to 350 Hz, preferably 130 Hz to 330 Hz. Furthermore, the reset element, in particular the spring steel of the reset element, preferentially has a spring stiffness of 400 HV (Vickers hardness) to 650 HV, preferably 500 HV to 575 HV and especially preferentially 513 HV to 539 HV. The spring stiffness is herein in particular advantageously for highly stressed springs with a continuous load. The reset element in particular has a good endurance strength. This in particular allows providing an advantageously stable and elastic reset element. In particular, an advantageous durability of the reset element is achievable. It is in particular possible to provide an advantageous endurance of the reset element.

Furthermore, it is proposed that a material of the at least one reset element comprises carbon, silicon, manganese, phosphorus, sulfur and/or chromium. Preferably the material of the reset element comprises carbon, silicon, manganese, phosphorus, sulfur and chromium. It is preferentially proposed that a carbon content of the material of the at least one reset element is 0.7% to 1.3%, preferably 0.8% to 1.1%. It is moreover proposed that a silicon content of the material of the at least one reset element is 0.1% to 0.5%, preferably 0.15% to 0.4%. It is further proposed that a manganese content of the material of the at least reset element is 0.2% to 0.8%, preferably 0.3% to 0.7%. It is also proposed that a phosphorus content of the material of the at least one reset element is 0.00% to 0.04%, preferably 0.00% to 0.03%. It is furthermore proposed that a sulfur content of the material of the at least one reset element is 0.00% to 0.04%, preferably 0.00% to 0.03%. It is moreover proposed that a chromium content of the material of the at least one reset element is 0.00% to 0.5%, preferably 0.00% to 0.4%. As a result, it is in particular possible to provide an advantageously stable and elastic reset element. Thus in particular advantageous durability of the reset element is achievable. In particular, in this way advantageous material characteristics of the reset element are achievable.

Beyond this it is proposed that a material of the at least one reset element comprises carbon, silicon, manganese, phosphorus, sulfur, chromium and/or molybdenum. The material of the reset element preferably comprises carbon, silicon, manganese, phosphorus, sulfur, chromium and molybdenum. Preferentially it is proposed that a carbon content of the material of the at least one reset element is 0.1% to 0.8%, preferably 0.2% to 0.5%. It is also proposed that a silicon content of the material of the at least one reset element is 0.2% to 0.6%, preferably 0.3% to 0.5%. It is further proposed that a manganese content of the material of the at least one reset element is 0.1% to 1%, preferably 0.4% to 0.8%. Moreover it is proposed that a phosphorus content of the material of the at least one reset element is 0.00% to 0.04%, preferably 0.00% to 0.03%. It is furthermore proposed that a sulfur content of the material of the at least one reset element is 0.00% to 0.04%, preferably 0.00% to 0.03%. It is also proposed that a chromium content of the material of the at least one reset element is 10% to 17%, preferably 12% to 15%. It is further proposed that a molybdenum content of the material of the at least one reset element is 0% to 4%, preferably 0% to 2%. This in particular allows providing an advantageously stable and elastic reset element. In particular, an advantageous durability of the reset element is achievable. As a result, in particular advantageous material characteristics of the reset element are achievable.

Furthermore, it is proposed that the drive unit comprises at least one rotor, which comprises at least one integrally implemented cage element having at least one receiving region for an accommodation of at least one magnet. The cage element preferably comprises at least two receiving regions, which are in each case configured for accommodating a magnet. Preferentially the magnets are in each case realized as permanent magnets. However, a different implementation of the magnet, deemed expedient by someone skilled in the art, would principally also be conceivable. Preferentially the rotor is in particular configured to execute an oscillating movement. Particularly preferentially the rotor is in particular coupled with the interface, preferably with a shaft of the interface, which is configured to transmit a driving movement to a plug-on brush. This in particular allows providing an advantageous rotor. Preferably, it is in this way in particular possible to provide a rotor that is configured to directly receive the at least one magnet. As a result, it is in particular possible to keep a number of structural parts advantageously low. By a "cage element" is in particular, in this context, an element to be understood which is configured for an encompassing accommodation of the at least one magnet. Preferably the cage element in particular forms a receiving region, which is completely materially enclosed by the cage element in at least one plane.

It is also proposed that the cage element has a base body comprising at least one receiving region for the at least one magnet, and has axis projections, which are arranged on both sides of the base body, forming a rotation axis of the rotor. The base body preferably comprises at least two receiving regions, which are arranged side by side. Preferentially the axis projections in particular serve in supporting the cage element in the frame unit. Preferably the base body of the cage element is supported on the frame unit such that it is rotatable via the axis projections. Especially preferentially at least one of the axis projections moreover serves to transmit a driving movement of the base body to the interface. Preferably one of the axis projections is directly coupled with a shaft of the interface. As a result, in particular an advantageous support of the cage element is achievable. It is furthermore in particular possible to keep a number of structural parts at a low level. In addition, an advantageous simple and quick assembly of the brush handpiece is achievable. By a "shaft of the interface" is in particular, in this context, a shaft to be understood which protrudes from a housing of the brush handpiece and is configured for directly transmitting a driving movement of the drive unit of the brush handpiece to the plug-on brush. Preferably the shaft of the interface is in particular embodied as a metal shaft. However, principally a different implementation of the shaft of the interface, deemed expedient by someone skilled in the art, would also be conceivable. The cage element is preferably made of a hard component.

Beyond this it is proposed that the rotor comprises at least one, in particular metallic, cover, which is configured for a closure of the receiving region of the cage element and which bundles the magnetic field lines and conveys them outside to the sheet pack. The receiving region of the cage element is preferably open toward at least one side, preferably to at least two opposite-situated sides. Preferentially, the rotor in particular comprises two covers, which are connected to the base body of the cage element from opposite sides and cover the open sides of the receiving region. Particularly preferentially the covers are screwed or glued with the cage element. It is also possible to fixate the covers via geometric elements: for example with an insertion geometry on one end and with one or several hook-shaped form-fitting elements on the other sides. It is also possible that the fixation via the hook-shaped form-fitting elements is realized only at the end that is situated opposite the insertion geometry if the covers get to lie in a hollow that prevents a lateral displacement by its side walls. In this way in particular an advantageously secure accommodation of the at least one magnet is achievable. In particular, it is thus further possible to achieve an advantageously positionally fixed accommodation of the magnet and an improved distribution of the magnetic field. Furthermore, an advantageously simple and easy assembly of the brush handpiece is achievable. The receiving region of the cage element is implemented in such a way that the magnets protrude beyond the receiving region. This ensures that there is a preferably small gap between the magnets and the metallic cover. Preferably the magnets and the metallic cover are in contact with each other. The mechanical connection, for example by gluing, prevents a displacement of the magnets in the cage element during operation, which could produce noise.

It is also proposed that the reset element is with its first end coupled with a first axis projection of the rotor in a rotationally fixed manner. Preferably the reset element is in particular connected to the first axis projection via a screw connection. However, other connection methods would principally also be conceivable. As a result, in particular an autonomous resetting of the rotor is advantageously achievable. It is in particular achievable that the shaft of the interface stops always in the same position. It is moreover in this way possible to achieve in particular an advantageous mounting of the reset element.

Furthermore, it is proposed that the axis projection comprises an adjoining surface for a fixation of the first end of the reset element, the adjoining surface being parallel to the rotation axis of the rotor and facing toward the rotation axis of the rotor. Preferably the axis projection is implemented at least approximately half-cylindrically, wherein in particular a central axis of the original cylinder is at least approximately equivalent to a rotation axis. The reset element is preferentially configured to lie upon the adjoining surface with a main extension surface in a region of the first fixation portion. In a mounted state, in an initial position of the rotor, a main extension plane of the reset element in particular extends in parallel to the adjoining surface. Preferably the adjoining surface is implemented in a planar fashion. The axis projection in particular forms a free, supported end of the rotor. This in particular allows achieving an advantageous fixation of the reset element to the rotor. In particular, an advantageously simple mounting is achievable.

It is further proposed that a smallest distance between the adjoining surface and the rotation axis of the rotor is at least approximately equivalent to 50% of the smallest thickness of the reset element. Preferably the rotation axis of the rotor extends at least approximately through the adjoining surface of the axis projection. In particular, the adjoining surface extends at a small distance parallel to the rotation axis of the rotor. Preferentially a smallest distance between the adjoining surface and the rotation axis of the rotor is 0.1 mm to 0.5 mm, preferably 0.15 mm to 0.35 mm. Preferably, in a mounted state of the reset element, in an axial region of the axis projection, the reset element extends through the rotation axis. Preferentially the rotation axis extends through the reset element over the entire main extension of the reset element. In particular, the rotation axis extends through a geometrical center point of the reset element. Particularly preferentially the rotation axis extends along a central axis of the reset element. Further particularly preferentially, the rotation axis extends along the longitudinal symmetry axis of the reset element. In this way in particular an optimum centering of the reset element is achievable. It is in particular achievable that the rotation axis extends through a geometrical center point of the reset element.

Moreover, it is proposed that the adjoining surface is arranged in a deepening, which is configured for securing the reset element parallel to the adjoining surface in a form-fit manner. The adjoining surface is in particular implemented of a deepened surface. Preferably the reset element is at least partly held in the deepening of the axis projection in a form-fit manner. The deepening in particular serves for a temporary securing and alignment of the reset element. The first fixation portion of the reset element may in particular be laid into the deepening in a defined and aligned manner. The deepening is in particular realized so as to at least partially correspond to the first fixation portion. Preferably the adjoining surface in particular has an area of 15 mm$^2$ to 35 mm$^2$, preferably of 18 mm$^2$ to 28 mm$^2$. In this way in particular advantageous mounting of the reset element is achievable. In particular, a temporary securing and alignment of the reset element on the adjoining surface is achievable. In this way it is then achievable that during mounting the reset element is fixed in a zero position.

The deepening around the adjoining surface for the first or second fixation portion has a depth of at least 50%, preferentially at least 75%, most preferentially at least 90%, of the height of the reset element.

Furthermore, it is proposed that the drive unit comprises at least one first fixation element, which is embodied as a screw and is configured to connect the reset element to a first axis projection of the rotor. It is also proposed that the drive unit comprises at least one second fixation element, which is embodied as a screw and is configured to fix the reset element on a projection of the frame unit. Preferably the reset element is fixated on its opposite end to the rotor and to the frame unit via the fixation element. The first fixation element embodied as a screw is in particular screwed through the hole of the first fixation portion into a bore of the first axis projection of the rotor. The second fixation element embodied as a screw is in particular screwed through the hole of the second fixation portion into a bore of the frame unit. Screws implementing fixation elements for the reset element are by way of example—other fixation elements for the reset element, deemed expedient by someone skilled in the art, are also conceivable. The frame unit in particular comprises an elevated fixation surface, which the reset element is fixated on. The fixation surface is in particular situated on a projection of the frame unit. The fixation surface is in particular realized by a square or rectangular area. The fixation surface in particular has a dimension of 8 mm$^2$ to 30 mm$^2$, preferably of 12 mm$^2$ to 20 mm$^2$. Preferentially the fixation surface is delimited on at least two sides by elevated walls of the projection. The walls in particular serve for a temporary securing and alignment of the reset element in a sidewise direction. In an initial position the fixation surface and the adjoining surface are situated in one plane and are respectively situated at least approximately in the rotation axis. This in particular allows achieving an advantageously secure fixation of the reset element. Furthermore, in this way in particular an advantageously compact arrangement of the reset element is achievable. However, principally a different fixation of the reset element, deemed expedient by someone skilled in the art, would also be conceivable, like in particular via a gluing connection, a rivet connection, a melt connection, like in particular riveting via melting a stud on, which is in particular attached to the fixation surface of the frame unit, and/or via injection molding around the reset element directly in the plastic of the rotor and/or of the frame unit.

Beyond this it is proposed that the drive unit is implemented by an oscillating armature motor. Preferably the oscillating armature motor is actuated in sinus-shape manner while, among others, a rectangular actuation is also possible. The actuation regulates an alternatingly polarized magnetic field in the coil of the stator via the current flow. In this way the deflection of the rotor is controlled.

The voltage, that is the primary-battery voltage, respectively rechargeable-battery voltage, is up to 4.1 Volt. The energy storage providing the voltage is preferably embodied as a lithium-ion battery.

By a "rectangular actuation" is the following actuation principle to be understood. The alternating magnetic field is controlled via an alternating current flow through an H-bridge. The voltage applied at the system corresponds to the voltage of the energy storage, respectively to the primary-battery or rechargeable-battery voltage, which is applied to the coil of the stator during certain pulse widths in an alternatingly positive and negative manner. There is one pulse width per half-period. The pulse width is controlled via the duty cycle (ratio of the pulse width to the duration of the half-period) and the frequency. The resulting current is determined on the basis of the pulse width and the battery voltage. The greater the resulting current, the greater the intensity of the magnetic field will be and the greater the resulting deflection of the rotor, respectively of the shaft of the interface, will be.

When setting up the circuitry for a realization of the rectangular actuation, care was taken that the electronic switches (e. g. in the form of so-called MOSFETs) have an ON resistance (also called RDSON or $R_{DS(on)}$) that is as small as possible. This is to reduce power loss, resulting eventually in an increased performance of the drive unit and less heat at the corresponding structural part, respectively at the printed circuit board.

For a brush handpiece of a toothbrush with an oscillating bristle region, with a rotation axis that is substantially parallel to the longitudinal direction of the brush handpiece, the following combinations, which are advantageous for cleaning, can be realized with a rectangular actuation, the mode designation being purely indicatory:

| Mode designation | Frequency | Duty Cycle | Deflection |
| --- | --- | --- | --- |
| A | 240 Hz to 280 Hz | 40% to 60% | 10° to 15° |
| B | 315 Hz to 355 Hz | 70% to 90% | 3° to 7° |
| C | 240 Hz to 280 Hz | 35% to 55% | 7° to 13° |
| D | 240 Hz to 290 Hz | 40% to 60% | 6° to 12° |

The deflection mentioned corresponds to the total deflection for a brush handpiece with an oscillating bristle region, with a rotation axis that is substantially parallel to the longitudinal direction of the brush handpiece, i. e. to an addition of the lefthand deflection starting from the zero position and the righthand deflection starting from the zero position. This corresponds to the deflection of the shaft of the interface of the respective brush handpiece and at the same time to the deflection of the plug-on brush.

A brush handpiece with an oscillating bristle region, with a rotation axis that is substantially parallel to the longitudinal direction of the brush handpiece, is generally operated at a frequency of 200 Hz to 400 Hz, preferably of 240 Hz to 360 Hz. Herein a deflection of 2° to 20°, preferably 3° to 15°, is achieved. (In the case of rectangular actuation) the duty cycle is in a range of 30% to 100%, preferably of 40% to 90%.

For a brush handpiece of a toothbrush with an oscillating bristle region, with a rotation axis that is substantially perpendicular to the longitudinal direction of the brush handpiece, the following combinations, which are advantageous for cleaning, can be realized with a rectangular actuation, the mode designation being purely indicatory:

| Mode designation | Frequency | Duty Cycle | Deviation |
| --- | --- | --- | --- |
| A | 110 Hz to 150 Hz | 55% to 75% | 10° to 20° |
| B | 130 Hz to 170 Hz | 70% to 90% | 15° to 25° |
| C | 160 Hz to 180 Hz | 80% to 100% | 15° to 25° |
| D | 240 Hz to 280 Hz | 80% to 100% | 25° to 35° |
| E | 315 Hz to 355 Hz | 80% to 100% | 10° to 20° |

The deflection mentioned corresponds to the total deflection of a moved bristle region of a brush handpiece of a toothbrush with an oscillating bristle region, with a rotation axis that is substantially perpendicular to the longitudinal direction of the brush handpiece, as measured on a brush head piece, i. e. to an addition of the lefthand deflection starting from the zero position and the righthand deflection starting from the zero position.

A brush handpiece of a toothbrush with an oscillating bristle region, with a rotation axis that is substantially perpendicular to the longitudinal direction of the brush handpiece, is generally operated with a frequency of 50 Hz to 400 Hz, preferably of 80 Hz to 360 Hz. Herein a deflection of 5° to 40°, preferably 10° to 25°, is achieved. (In the case of rectangular actuation) the duty cycle is in a range of 30% to 100%, preferably of 40% to 90%.

By a "sinus actuation" the actuation principle is to be understood that is explained below. The alternating magnetic field is controlled via an alternating current flow through an H-bridge. The voltage applied at the system corresponds to the voltage of the energy storage, respectively the primary-battery or rechargeable-battery voltage. In this type of actuation a half-period of the voltage signal is divided into several pulses having different pulse widths. The pulse width is selected such that the resulting current progression is approximated to a sinus shape. For this purpose, the half-period is divided into 4 to 16 blocks, preferably 6 to 12 blocks. In each of these blocks a certain number of pulses having a certain identical pulse width (duty cycle) are applied. While the pulse widths are identical within the blocks, they change from block to block. Alternatively, only one pulse having a certain pulse width could be realized per block, with the pulse width changing from block to block. The pulse widths increase towards the middle of the respective half-period, then they decrease. The difference between pulse widths from block to block is between 30% and 100%, in each case increasing or decreasing.

For a brush handpiece of a toothbrush with an oscillating bristle region, with a rotation axis that is substantially perpendicular to the longitudinal direction of the bristle region, and also for a brush handpiece of a toothbrush with an oscillating bristle region, with a rotation axis that is substantially parallel to the longitudinal direction of the bristle region, and driven with a sinus actuation, the same combinations are possible as described to be advantageous and listed above for a rectangular actuation (cf. tables given above) apply, only the duty cycle is implemented differently, as has been described.

Furthermore, the frequencies may be exceeded and/or gone below for a short time in order to transmit certain signals to the user. This may be a signal consisting of a single short-time change in frequency or there may be signals realized by several changes in frequency in quick succession. For example, a quadrant timer or a timer for a cleaning-time can be signaled by a frequency change from 330 Hz to 370 Hz for a duration of 200 ms to 600 ms, preferably 350 ms to 450 ms. Another type of short-time change in frequency is a reduction to 0 Hz, i. e. switching the drive off, for a duration of 200 ms to 800 ms, preferably 400 ms to 600 ms.

In particular in comparison to a rectangular actuation, in particular an improved movement of the rotor of the drive unit is achievable by a sinus actuation. In particular, an advantageously smooth movement of the rotor is achievable. Furthermore, noise of the drive unit is reliably avoidable and the energy required for operation is reducible. By an "oscillating armature motor" is in particular, in this context, a drive to be understood which is configured to electromagnetically generate a vibrating movement, in particular an oscillating movement. The drive in particular comprises a positionally fixed sheet pack with a field coil and a movable rotor comprising at least one magnet. Preferably the rotor is held in a rest position by a reset spring.

It is further proposed that the drive unit comprises at least one stator comprising an integrally implemented carrier, a sheet pack inserted in the carrier and a coil encompassing the sheet pack. Preferably the sheet pack realizes an iron core of the stator while the coil realizes a field coil of the stator. Preferentially, the coil of the stator is actuated in sinus-shape manner during operation. Especially preferentially the coil and the sheet pack are contact-free. Preferably the stator is in particular implemented by a pre-fabricated module which can be inserted in one piece. This in particular allows providing an advantageously compact stator which can be mounted easily. It is in particular possible to keep a number of components advantageously small. Moreover, this in particular allows providing an advantageously modular stator. A "sheet pack" is in particular to mean, in this context, a package consisting of a plurality of interconnected or mutually adjacent metal sheet components. Preferably, the metal sheet parts in each case have the same shape and are tightly connected to form a pack in a same orientation.

It is also proposed that the carrier of the drive unit is directly connected to the frame unit, covering a rotor of the frame unit from at least one side. Preferably the carrier of the drive unit is screwed directly to the frame unit. However, a different type of connection, deemed expedient by someone skilled in the art, is also conceivable. Preferentially the rotor of the drive unit is in particular accommodated in a receiving region of the frame unit, the receiving region being preferably open towards one side, preferentially towards at least two sides. The carrier is in particular configured for closing at least one open side of the receiving region of the frame unit. Preferably, in a mounted state the rotor of the drive unit is at least partly encompassed by the sheet pack of the stator. This in particular allows providing a brush handpiece that can be mounted in an advantageously simple manner. In particular, an advantageously simple and reliable alignment of the stator relative to the rotor is achievable during mounting. In this way in particular mounting errors are avoidable. It is herein crucial that the rotor is arranged exactly centrally in the stator, so as to obtain an optimum efficiency factor. This means that the airgap has essentially the same dimensions on the left and right between the rotor and the sheet pack of the stator. Optimally the distance between the sheet pack and the metallic cover, respectively the rotor, is kept as small as possible. Herein the rotatability of the rotor must be essentially possible without colliding with the sheet pack. Due to the small distances a small magnetic reluctance is ensured.

Beyond this it is proposed that the electrical brush handpiece comprises at least one rotor cover, which is fixedly connected to the frame unit and is configured, together with the frame unit, for a support and/or fixation of a rotor of the drive unit. Preferably the rotor of the drive unit is in particular accommodated in a receiving region of the frame unit, said receiving region being preferably open towards one side, preferably towards at least two sides. Preferentially at least one open side of the receiving region of the frame unit is closed by a carrier of the drive unit, wherein the rotor cover in particular closes the second open side. Preferably the rotor cover is screwed with the frame unit. However, a different type of connection, deemed expedient by someone skilled in the art, is also conceivable. Particularly preferentially both the rotor cover and the frame unit form at least one semicircle-shaped shaft receptacle for receiving at least one axis projection of the rotor. Preferentially the rotor is supported directly between the frame unit and the rotor cover. In this way advantageously quick and simple mounting is achievable. It is in particular possible to provide an advantageous covering and support of the rotor. Moreover, advantageously quick and positionally accurate fitting-in of the rotor can be ensured. Preferably, the rotor cover and the frame unit further serve for a support and/or for a sealing of the shaft of the interface. The shaft of the interface is preferably supported in a shaft receptacle via a sealing, the shaft receptacle being composed of a semicircle-shaped shaft receptacle of the frame unit and a semicircle-shaped shaft receptacle of the rotor cover.

It is moreover proposed that the at least one interface is configured for driving a plug-on brush with an oscillating bristle region, with a rotation axis that is substantially parallel to a longitudinal direction. In particular, for a brush handpiece of a toothbrush with an oscillating bristle region, with a rotation axis that is substantially parallel to the longitudinal direction of the brush handpiece, it is proposed that the electrical brush handpiece comprises at least one mounting ring and at least one sealing cap, which are configured for a connection of the rotor cover and the frame unit to each other. The mounting ring is in particular configured to be slid over a shaft-side end of the rotor cover and the frame unit. Preferably, in a mounted state the mounting ring engages around the shaft-side end of the rotor cover and the frame unit respectively. Preferably the mounting ring in particular serves for centering the rotor cover and the frame unit. The mounting ring in particular serves as a shaft guidance for the shaft of the interface. The shaft of the interface is in particular guided through the mounting ring. In addition to the connection function, the mounting ring in particular also has a supporting function for the sealing cap. The sealing cap is in particular configured to latch with the frame unit and/or with the rotor cover. Furthermore, the sealing cap in particular serves for a sealing of a housing interior against the interface. For this purpose, the sealing cap adjoins the shaft of the interface, in particular with an interference, such that the sealing cap at least partially twists in a rotational movement of the shaft of the interface. The sealing cap preferably serves for a sealing between the housing and the frame unit.

It is further proposed that the at least one interface is configured for driving a plug-on brush with an oscillating bristle region, with a rotation axis that is substantially perpendicular to a longitudinal direction. In particular, a brush handpiece with an oscillating bristle region, with a rotation axis that is substantially perpendicular to the longitudinal direction of the brush handpiece, is proposed, wherein the electrical brush handpiece comprises at least one stud and at least one sealing element implemented as a bellows seal. The stud is equipped with two functions: on the one hand the stud itself constitutes a portion of the interface to the plug-on brush, on the other hand the rear portion of the stud forms something like a mounting ring, which is configured for a connection of the rotor cover and the frame unit to each other. The stud is in particular configured to be slid with its rear portion over a shaft-side end of the rotor cover and of the frame unit. Preferentially, in a mounted state this portion of the stud, which is similar to a mounting ring, engages around the shaft-side end of the rotor cover and of the frame unit respectively. Preferably, the mounting-ring-like portion of the stud in particular serves for centering the rotor cover and the frame unit. In particular, the mounting-ring-like portion of the stud serves as a shaft guidance for the shaft of the interface. The shaft of the interface is in particular guided through the entire stud. The stud itself serves as an interface to a defining element of the plug-on brush, respectively generally to the rear portion of the plug-on brush. The stud moreover accommodates the sealing element in its rear portion. The sealing element implemented as a bellows seal on the one hand clamps in the front portion (toward the stud itself) inwards onto the shaft of the interface while pressing onto the stud outward in the rear portion. In this way the sealing element in particular serves for a sealing of a housing interior against the interface. For this purpose, the sealing element in particular adjoins the shaft of the interface with undersize, such that the sealing element at least partially twists in a rotational movement of the shaft of the interface. On the other hand, the sealing element adjoins the stud with oversize for an adjoinment that is as fix as possible. The sealing between the stud, i. e. actually the frame unit, and the housing is preferably done with an O-ring adjoining the stud on the outside. In its cooperation with the frame unit the stud may comprise an anti-twist protection such that the stud is mountable in one position only, as it is necessary for a brush handpiece with an oscillating bristle region, with a rotation axis that is substantially perpendicular to the longitudinal direction of the brush handpiece, to have the position precisely defined, such that the plug-on brush will eventually be put onto the brush handpiece always in the same position. This may, for example, be realized by a groove-and-ridge combination in the stud, respectively the frame unit or the rotor cover, for example with a ridge within the stud that is oriented in a longitudinal direction and a groove in the frame unit functioning as a counterpiece.

In both movement variants of the bristle region, the described sealing between the frame unit and the housing is realized in the same position. The difference lies in the realization via the sealing cap or the O-ring.

The sealing element implemented as a bellows sealing has a rotationally symmetrical structure. In its outer envelope the sealing element is similar to a truncated cone. The broad end serves with its outer shape for sealing against the stud while the narrow end serves with its inner shape for sealing against the shaft of the interface. The end having the greater diameter has an outer diameter of 5 mm to 11 mm, preferably of 6.5 mm to 8.5 mm; in the mounted state this portion adjoins the stud inside. At the narrow end, the inner diameter is 2 mm to 7 mm, preferably 3.5 mm to 5.5 mm; in the mounted state this portion adjoins the shaft of the interface on an outside. The two diameters given are realized in such a way that they tightly adjoin the counterpiece in each case. The sealing has a greater material thickness in a region of these sealings, such that the pressures adequate to the sealing are achievable and the sealing is not too slack. In the region of the greater diameter the material thickness/wall thickness is between 0.8 mm and 2 mm, preferably between 1 mm and 1.7 mm, with the wall thickness decreasing toward the smaller diameter. The material thickness/wall thickness is in the region of the smaller diameter between 0.5 mm and 1.3 mm, preferably between 0.7 mm and 1.1 mm. The portion of the sealing element that is situated between the greater diameter and the smaller diameter realizes two functionalities essentially. On the one hand, something like a tub is formed, in which running-in liquid is caught, such that it will not run to the sealing opposite the stud. On the other hand, a torsion opportunity is created in this region, the sealing element having a small wall thickness in this region, as a result of which the torsion is enabled. The wall thickness is in this region between 0.2 mm and 0.7 mm, preferably 0.3 mm to 0.5 mm. The sealing element is preferably made of an elastomer. The length of the sealing element is between 3 mm and 7 mm, preferably between 4 mm and 6 mm. A rest area in the region of the smaller diameter pressing onto the shaft of the interface has a length of 0.7 mm to 1.1 mm, preferably 0.8 mm to 1 mm. In the region of the greater diameter, pressing onto the stud, the length of the rest area is 0.8 mm to 2 mm, preferably 1.3 mm to 1.6 mm.

In at least one operation state the brush handpiece, respectively the shaft of the interface, is operated according to the tables and values given above. In particular, the deflection angle of the shaft of the interface is on each side of the zero position in a range of 2.5° to 9°, preferably 4° to 7°.

The invention is moreover based on a method for a production of the electrical brush handpiece.

A production of the reset element is in particular realized from a steel sheet. The steel sheet is herein in particular rolled longitudinally. However, it would principally also be conceivable that the steel sheet is rolled transversally. For a production, in a first step a punching of the contour and/or of the holes of the reset element is carried out. However, it would principally also be conceivable that the holes are drilled. After that deburring and rounding of the reset element is done, this may be brought about, for example, by slide grinding, in particular by vibratory finishing. However, principally a production by lasering would also be conceivable, which is, however, in particular unfavorable as the starting point of the lasering process is overstressed. Therefore, when selecting the starting point, care should be taken that the temperature distribution does not cause any follow-up problems in that region, or that the starting point is situated completely outside the geometry of the reset element. Further possibilities of a production of the reset element are, in decreasing priority, etching, fine eroding/wire eroding, milling, waterjet cutting, punching, lasering or combinations thereof.

For achieving the necessary finish quality, vibratory finishing and/or electropolishing is recommended, in particular subsequently to milling, punching and waterjet cutting. The follow-up processing by vibratory finishing and/or electropolishing is in particular intended such that no discontinuities are brought about, like fissures, scratches or ruts, which could when in use develop into ruptures, thus reducing a load-bearing capacity.

In a production of the electrical toothbrush handpiece, a mounting of the reset element to the frame unit is in particular carried out from a side, preferably from above.

The mounting is herein realized by fixation of the two fixation elements which are embodied as screws. This has the advantage that in a non-usage state no alignment of the rotor is necessary, the alignment happening automatically via the bores and via the alignment of the mounting surfaces as well as by the planar reset element itself. The alignment is in particular brought about automatically as the reset element has narrow manufacturing tolerances and the geometrical arrangement is optimized as well. For an initial position, the surfaces on the rotor and on the frame unit are aligned relative to each other by the reset element. Herein the surfaces must in particular be aligned precisely so as to avoid an additional load on the reset element, which would result in rupture. Thus the entire system of the rotor and the shaft of the interface is eventually aligned with respect to the plug-on brush mounted on the shaft of the interface.

The characteristics of the brush handpiece, of the plug-on brush and of the reset element as well as the actuation via software/hardware are herein in particular precisely adapted to each other in order to achieve optimum performance; herein a brush handpiece with an oscillating bristle region, with a rotation axis that is substantially parallel to the longitudinal direction of the brush handpiece, differs from a brush handpiece with an oscillating bristle region, with a rotation axis that is substantially perpendicular to the longitudinal direction of the brush handpiece.

The plug-on brush, which is preferably used with the presently described brush handpiece, in this case a brush handpiece with an oscillating bristle region, with a rotation axis that is substantially parallel to the longitudinal direction of the brush handpiece, is realized in such a way that it is mounted directly onto the shaft of the interface. It is plugged on and is exchangeable. Herein its only connection to the brush handpiece is defined by the shaft of the interface. The shaft of the interface, and thus the entire drive system, bear the weight of the plug-on brush, which is thus coupled with the drive in 1:1 fashion.

The further plug-on brush used with the present device, which has an oscillating bristle region, with a rotation axis that is substantially perpendicular to the longitudinal direction of the brush handpiece, is equipped with two connections to the brush handpiece. On the one hand, the defining element is plugged onto the stud of the brush handpiece, on the other hand a drive rod is plugged onto the shaft of the interface. The connection between the defining element and the stud defines the rigid position of the brush handpiece relative to the plug-on brush housing. The connection between the shaft of the interface and the drive rod brings about a connection of the moved parts of the plug-on brush to the shaft of the interface. The movement is transmitted from the shaft of the interface via the drive rod to the brush head piece comprising a bearing pin. In this case the shaft of the interface only bears the weight of the drive rod.

With the bristle region being moved around the rotation axis of the brush handpiece, the mass moved by the brush handpiece corresponds to the mass of the entire plug-on brush, the respective weights are listed below. In a plug-on brush with a bristle region, with a rotation axis that is substantially perpendicular to the longitudinal direction of the brush handpiece, the mass moved by the brush handpiece corresponds to the cumulated weight of the drive rod, the bearing pin and the brush head piece. The bearing pin may also be unmoved, i. e. fix. The moved mass corresponds to a weight of 1.2 g to 3.5 g, preferably 1.5 g to 2.5 g. The plug-on brush with an oscillating bristle region, with a rotation axis that is substantially parallel to the longitudinal direction of the brush handpiece, is implemented at least of a hard component, which is preferably made of polypropylene and which forms at least the basic structure. At least the interface geometry with respect to the shaft of the interface with corresponding clamping and/or latching elements as well as the structure in the brush head itself for a fixation of the filaments belong to the basic structure. In addition, further hard and/or soft components may be used to form a body. A usage of soft components may be implemented so as to form cleaning elements in the brush head as well as for a protection around the body that is made of a hard component, in order to dampen a thrusting of the body against the teeth. The body of the plug-on brush with an oscillating bristle region, with a rotation axis that is substantially parallel to the longitudinal direction of the brush handpiece, is preferably produced via injection molding, requiring no assembly steps.

In comparison to the plug-on brush with an oscillating bristle region, with a rotation axis that is substantially parallel to the longitudinal direction of the brush handpiece, the plug-on brush with an oscillating bristle region, with a rotation axis that is substantially perpendicular to the longitudinal direction of the brush handpiece, is structured in a multi-part implementation. A plug-on brush housing forms the basic structure that keeps everything together. The brush head piece is mounted, from the front side of the plug-on brush housing, in the plug-on brush housing with its rear side, and is fixated from behind via the bearing pin. The fixation is implemented so as to enable an oscillating rotational movement with a rotation axis that is substantially perpendicular to the longitudinal direction of the plug-on brush housing. The bearing pin thus forms the rotation axis of the bristle region. During operation the bristle region rotates oscillatingly around this axis. A drive rod is inserted from the plug-on side toward the brush handpiece of the plug-on brush, the drive rod being mounted in such a way that its toothing, which is arranged end-side, engages into the toothing on the rear side of the brush handpiece. A defining element, which is inserted directly subsequently to the drive rod, on the one hand latches with the plug-on brush housing and on the other hand holds the drive rod in position. The drive rod is movable so as to rotate around its longitudinal axis in an oscillating manner. The rotation axis of the drive rod is substantially parallel, respectively identical, to the rotation axis of the shaft of the interface. In order to achieve a movement of the plug-on brush, respectively the brush head piece, the plug-on brush is plugged with its opening into the defining element onto the stud of the brush handpiece, and at the same time the shaft of the interface of the brush handpiece is inserted into the plug-on brush. The stud of the brush handpiece herein fixates the plug-on brush housing via the defining element, such that in the operating state the plug-on brush does not make any movement relative to the brush handpiece, which means is fixed relative to the brush handpiece. The shaft of the interface is inserted into the drive rod and is clamped, thus serving to guide the movement from the brush handpiece to the brush head piece. The shaft of the interface of the brush handpiece is stuck on the drive rod, which transmits the movement, via its toothing, to the toothing on the rear side of the brush head piece, which results in the brush head piece—and thus the bristle region with cleaning and bodycare elements attached thereto—being set into motion. The plug-on brush is structured in such a way that the oscillating rotational movement of the shaft of the interface of the brush handpiece is deflected into a rotational movement of the brush head piece oscillating perpendicularly thereto, with the deflection being put into effect via the mutually engaging toothing of the drive rod and the brush head piece.

The structural parts of the plug-on brush with an oscillating bristle region, with a rotation axis that is substantially perpendicular to the longitudinal direction of the brush handpiece, are manufactured differently. The plug-on brush housing is made at least of a hard component and forms the basic structure of the plug-on brush, the other structural parts are fixated or built thereon/therein. In addition, further hard and/or soft components can be used to form the body. The usage of soft components may, for example, be implemented as a protection around the body made of a hard component, for dampening a thrust of the body against the teeth. The defining element and the drive rod are made, at least in their basic structures, of a hard component, and a soft component may also be formed thereon; however, preferably they are only made of a hard component or several hard components. The brush head piece is implemented at least of a hard component, which forms the carrier structure as well as the functional elements of the movement. Utilization of soft components for the brush head piece is possible. For a shaping of cleaning elements in the brush handpiece and as a protection around a body that is made of a hard component, the utilization of soft components may be realized for dampening a thrust of the body against the teeth. Furthermore, the bearing pin is a structural part of the plug-on brush and is made of a metal. The parts are mounted in order to make the plug-on brush functional.

The brush handpiece preferably has a rounded or oval basic shape of the bristle anchoring surface, wherein in case of the oval basic shape the larger dimension points in the longitudinal direction of the plug-on brush housing. With a round basic shape, the respective longitudinal and transversal dimensions are in a range of 10 mm to 17 mm, preferably of 12 mm to 15 mm. With an oval basic shape, the smaller transversal dimension is in a range as given before for round basic shapes while the longitudinal dimension is in a range of 14 mm to 21 mm, preferably of 16 mm to 19 mm.

The plug-on brush with an oscillating bristle region, with a rotation axis that is substantially parallel to the longitudinal direction of the brush handpiece, has a weight of 3 g to 10 g, preferably of 4 g to 8 g. The length of the plug-on brush is between 50 mm and 90 mm, preferably 65 mm to 75 mm. The maximum width of this plug-on brush is between 8 mm and 17 mm, preferably 10 mm to 15 mm.

The plug-on brush with an oscillating bristle region, with a rotation axis that is substantially perpendicular to the longitudinal direction of the brush handpiece, has a weight of 3 g to 10 g, preferably of 4 g to 8 g. The length of the plug-on brush is between 50 mm and 90 mm, preferably 65 mm to 75 mm. The maximum width of this plug-on brush is between 8 mm and 17 mm, preferably 10 mm to 15 mm.

For both types of plug-on brushes the brush handpiece provides similar, in particular almost identical, movements which differ only in their values. The movement itself remains the same; the movement provided is an oscillatingly rotating movement of the shaft of the interface. The brush handpiece is special in that no mechanical transmission is required for providing the movement. This means that neither gearing up nor gearing down is realized. Any transformations take place directly in the drive unit, which is in each case just differently actuated. Optionally, it is possible—as described above—to use a different reset element.

The mechanical movement of the plug-on brush with an oscillating bristle region, with a rotation axis that is substantially perpendicular to the longitudinal direction of the brush handpiece, and with several parts besides the brush handpiece, involves losses (e. g. friction, tolerance, etc.). This is optimized as much as possible by a suitable actuation. The losses are in particular evident as noise, respectively as noises produced, and therefore of course also as an increased energy consumption. For minimizing the losses, the parts must engage into each other in a manner as tolerance-free as possible; the shaft of the interface and the drive rod must therefore fit into each other optimally, at the most with a slight press fit. In comparison, in the region of the toothing minimum tolerance is necessary for the movement involving less resistance. Manufacturing of the parts generally involves tolerances, which are then of course evident in the structural part, respectively need to be compensated in the structural part if possible. With the drive rod fixed on the brush head, the mounted plug-on brush has a maximum tolerance (total movement) in a range of 2° to 7°, preferably 2° to 5°, which means that the brush head can be moved in this angle range without involving movement of the drive rod.

The cleaning elements are in particular implemented as care bristles, respectively tooth-cleaning bristles. The care bristles, respectively tooth-cleaning bristles, are in particular produced from filaments, respectively cut to length from filaments. In anchoring punching procedures respectively one or several filaments, which is/are cut to length, is/are bent in a U-shape. In this way the filaments form in each case two connected care bristles having respectively one utilization end.

The utilization end corresponds to the end of the care bristle by which the bodycare function is implemented. Accordingly, in the finished toothbrush the utilization end is a free bristle end.

In the brush head, a plurality of care bristles in particular form bristle bundles. The care bristles, respectively the bristle bundles, in particular form a bristle region in the brush head/brush head piece.

Besides care bristles, the bristle region may also comprise cleaning and massaging elements, which are for example made of a soft component. The cleaning and massaging elements may be formed of an elastomer, respectively of a rubber-elastic material. The cleaning and massaging elements may be injection-molded and/or may be injection-molded to the brush head/brush head piece by means of an injection-molding procedure.

The care bristles are in particular implemented of plastic. The care bristles may be implemented of a hard component. The care bristles may be implemented of a soft component. The care bristles may be implemented of a combination of hard and soft component.

The care bristles may be produced in a customary manner, i. e. extruded. Extruded care bristles may be implemented of polyamide (PA) or polyester (PBT). The care bristles may thus be made of polyamide PA 6.10 or PA 10.10.

The care bristles may also be produced from sustainable materials. In particular, the care bristles may be produced from renewable primary products. Thus the care bristles may be produced from cellulose or from a cellulose-based material. The care bristles may further be produced on the basis of lactic acid (PLA). The care bristles may in particular also be produced from a biodegradable plastic material.

The care bristles may furthermore be produced from a recycled plastic, e. g. from a recycled polyester (PET).

The care bristles may be cylindrical or tapered. The care bristles may get tapered in a chemical process, in particular if they are made of polyester (PBT).

The care bristles may have a cylindrical, undulating, twisted or helical longitudinal shape.

The cross-sectional shape of the care bristles may be round (circular), elliptic, oval, polygonal, like triangular, rectangular, square, trapezoid-shaped, parallelogram-shaped, or lozenge-shaped.

The care bristles used in oral hygiene may have a diameter of 0.075 mm to 0.25 mm. The care bristles may have a cross-section area of 0.002 mm$^2$ to 0.2 mm$^2$.

The care bristles used in cosmetics may have a diameter of 0.025 mm to 0.2 mm. The care bristles may have a cross-section area of 0.001 mm$^2$ to 0.15 mm$^2$.

The surface of the care bristles may be smooth or textured.

The care bristles are in particular combined to form bristle bundles. If the care bristles are fixated in bristle holes as bristle bundles, with customary anchor punching a bristle hole accommodates respectively one bristle bundle.

A bristle bundle may comprise care bristles of the same type or may comprise different types of care bristles, thus forming a mixed bristle bundle. Different types of care bristles may mean different geometries and/or different materials. For example, cylindrical and tapered filaments may be mixed, such that different care bristles are provided in a bristle bundle.

According to one implementation variant, the care bristles may also be injection-molded in an injection-molding procedure. The care bristles may thus be injection-molded directly to the brush head/brush head piece.

As the base body usually does not form a substance-to-substance connection with the plastic material injection-molded thereto, structuring elements, in particular deepenings and/or recesses, like undercuts, blind holes and/or through holes may be formed on the base body, enabling form-fit holding of the injection-molded elements like care bristles.

The injection-molded care bristles are in particular formed of a thermoplastic elastomer, particularly preferably of a thermoplastic polyurethane elastomer (TPE-U). This elastomer is distinguished by favorable flow characteristics as well as quick consolidation, i. e. crystallization. The molecule chains in particular already connect at (still) high temperatures.

The injection-molded care bristles may also be formed of polyethylene (PE), for example implemented as low-density polyethylene (LDPE) or linear low-density polyethylene (LLDPE).

The injection-molded care bristles may furthermore also be formed of a thermoplastic polyester elastomer (TPE-E) or of a thermoplastic polyamide elastomer (TPE-A).

For injection-molded care bristles special types of soft components are used, which usually have higher Shore D hardnesses than soft components from which soft-elastic cleaning and massaging elements or housing zones, like thumb supports or tongue cleaners, are formed.

The component for injection-molded care bristles, in particular made of a thermoplastic elastomer, in particular has a Shore D hardness of 0 to 100, particularly preferably of 30 to 80.

The injection-molded care bristles may be combined with further cleaning and massaging elements.

During injection molding (two-component or multicomponent injection molding) the components for injection-molded care bristles usually do not form a substance-to-substance bond with the brush head/brush head piece and the other soft and/or hard components used. Therefore, for possible connections to other hard and/or soft components a form-fit is provided (undercuts and/or break-throughs and/or partial and/or complete injection-molded envelopings, etc.).

When cooling, the second injection-molded component for injection-molded care bristles gets shrunk onto the first injection-molded hard or soft component and then forms a shrink connection.

Injection-molded care bristles may be produced from sustainable materials. These may in particular be produced from renewable primary products. Injection-molded care bristles may in particular be produced from a biodegradable plastic material. This allows biodegradable disposal of the base body together with the injection-molded care bristles. Separating the injection-molded care bristles from the base body is no longer necessary.

Injection-molded care bristles may also be produced from recycled plastic materials.

The brush head/brush head piece may comprise bristle holes, which will be described in detail below.

One, several or all bristle hole/s may be implemented at least partly cylindrically.

The bristle holes may have a diameter of 1.3 mm to 2.1 mm, in particular of 1.5 mm to 1.9 mm. Particularly preferably the bristle holes have a diameter of 1.6 mm.

The bristle holes may have a depth of 1.5 mm to 5 mm, in particular of 2 mm to 4 mm. Particularly preferably they have a depth of 3.5 mm.

Bristle holes may have been introduced at an angle to the front side, i. e. to a bristle hole surface in the region of the brush head. The angle may be 0° to 45° (angular degrees), in particular 5° to 25°.

Bristle holes introduced at an angle may be oriented in the direction of the longitudinal axis or, in an oscillatingly rotating movement, in a circular manner.

Furthermore, bristle holes introduced at an angle may also be oriented at an angle to the longitudinal axis, i. e. transversely to the longitudinal axis. This angle may be 0° to 90°, in particular 0° or 90°. 0° herein corresponds to an orientation in the direction of the longitudinal axis.

Due to the angular arrangement of bristle bundles, these may also protrude sidewise beyond a brush body in the direction of the longitudinal axis or at an angle thereto, i. e. transversely to the longitudinal axis. As a result, the bristle region will have a greater width or length than the base body.

Bristle holes with different diameters may be provided in a bristle region. Herein different bristle furnishments, respectively bundles with bristles of different types, can be realized for the different diameters. Thus there may be larger bristle bundles with tapered care bristles and smaller bristle bundles with cylindrical care bristles.

Bristle bundles of different sizes and implementations may be arranged in a variety of patterns. Some possibilities are listed below by way of example.
- alternating sizes in longitudinal or transversal rows;
- a row of bristle bundles on a periphery of the bristle region, with a different size than the bristle bundles in the interior;
- a bristle region of one bristle bundle size with individual islands of bristle bundles having a different size or several different sizes;
- having a size progression: from larger bristle bundles at the front of the bristle region to smaller bristle bundles at the rear of the bristle region.

There may also bristle holes be realized which are arranged very close to one another, thus forming a larger bristle bundle.

Beyond this, the care bristles have been processed, in particular fixed to the brush head, in particular as bristle bundles, preferably by at least one anchor punching method or an anchor-free method, or something like that. Preferably the brush handpiece comprises a plurality of, in particular drilled and/or injection-molding-shaped, bristle receptacles, in particular holes for bristle bundles, and forms a bristle anchoring surface. In the case of anchor punching, it is conceivable, for example, that first of all a base body is manufactured via injection molding, in particular of a hard component, preferably a hard component of the brush head, wherein advantageously blind holes for bristle bundles are formed in the injection molding process. However, subsequent drilling of blind holes is of course also conceivable. Preferably, then bristles, respectively bristle bundles, are folded and are fixed in each case in a blind hole by means of at least one anchor, in particular by punching-in. Sling punching is also conceivable.

Alternatively, as has been mentioned, anchor-free methods are also conceivable, wherein advantageously care bristles, respectively bristle bundles, are not folded. In such a case, filaments have approximately half the length as compared to anchor punching. Herein it is, for example, conceivable that the bristle bundles are first singulated and/or melt and/or, in particular subsequently, injection-molding is done around their bristle ends for a fixation thereof. It is herein advantageously possible to combine bristle bundles.

It is moreover conceivable that an application unit is composed of a base body and of a bristle platelet, which is studded with care bristles and/or further cleaning elements. For this purpose, firstly bristle platelets with through holes, through which then care bristles are guided, are manufactured by injection molding. Preferably the care bristles are then connected, in particular melted, preferably with one another and/or with the corresponding bristle platelet, on a rear side. Bristle platelets provided with bristles in this way may then be welded and/or glued with a base body, in particular a brush head, preferably via ultrasound welding. For this the base body, in particular the brush head, in particular has a recess which the bristle platelet can be inserted in. To name a well-known production method in this context, there is anchor-free tufting, which in particular allows combining bristle bundles. In particular, a side of the bristle platelet, which is laid into a recess of the base body and points toward a rear side of the application unit, is designated as an underside of the bristle platelet. Correspondingly thereto, the upper side of the bristle platelet points toward the front side of the application unit.

Manufacturing, in particular injection-molding, of a brush head with through holes for care bristles is possible as a further method for an anchor-free bristling. Care bristles may afterwards be guided through the through holes and may be melted on a rear side, in particular melted with one another and/or with the brush head. Preferably then an overmolding of the melted regions and/or of the brush head is done, in particular an overmolding with at least one soft component.

Furthermore, it is conceivable to produce firstly a brush head having blind holes, for example by injection-molding and/or by drilling the blind holes. In this case care bristles are in particular laid together to form bundles and are on one end melted and/or otherwise connected to one another. Then the brush head is heated. After this bristle bundles may advantageously be introduced into the blind holes and anchored by pressing on the brush head. In particular, herein the heated blind holes get deformed, such that the bristle bundles are anchored therein.

Alternatively or additionally to punched and/or welded and/or glued care bristles, injection-molded care bristles are also conceivable. These may in particular be manufactured together with the brush head piece during multi-component injection-molding.

Beyond this the invention is based on an electrical toothbrush with the electrical brush handpiece and with the plug-on brush.

The terms "axial" and "radial" in particular refer, in this context, to a main extension axis of the electrical brush handpiece, such that the term "axial" in particular designates a direction that runs parallel to or coaxially with one of the main extension axes. Furthermore, in the following the term "radial" in particular means a direction that runs perpendicularly to one of the main extension axes. By a "main extension axis" of an object is herein in particular an axis to be understood which runs parallel to a longest edge of a smallest geometrical rectangular cuboid just still completely enclosing the object, and which in particular goes through a geometrical center of the object.

Moreover, the terms "upper side" or "front side" of the toothbrush are in particular to mean, in this context, the side of the toothbrush which the thumb is laid upon. The upper or front side is usually also the side toward which the bristle region, in particular the bristle region of the brush head of the plug-on brush, is oriented. By the "underside" or "rear side" of the toothbrush is in particular the side to be understood which faces away from the bristle region of the brush head. Furthermore, the terms "left side" and "right side" respectively refer to a view of the front side. An "underside of the head platelet" is to designate the side that is laid into the recess of the base body and points toward the underside of the toothbrush. The "upper side of the head platelet" accordingly points toward the upper side of the toothbrush.

The electrical brush handpiece, the electrical toothbrush and the method are herein not be restricted to the application and implementation described above. In particular, in order to realize a functionality that is described here, the electrical brush handpiece, the electrical toothbrush and the method may comprise a number of individual elements, structural parts and units that differs from a number given here.

DRAWINGS

Further advantages will become apparent from the following description of the drawings. In the drawings four exemplary embodiments of the invention are illustrated. The drawings, the description and the claims contain a plurality of features in combination. Someone skilled in the art will purposefully also consider the features separately and will find further expedient combinations.

Figure 2:
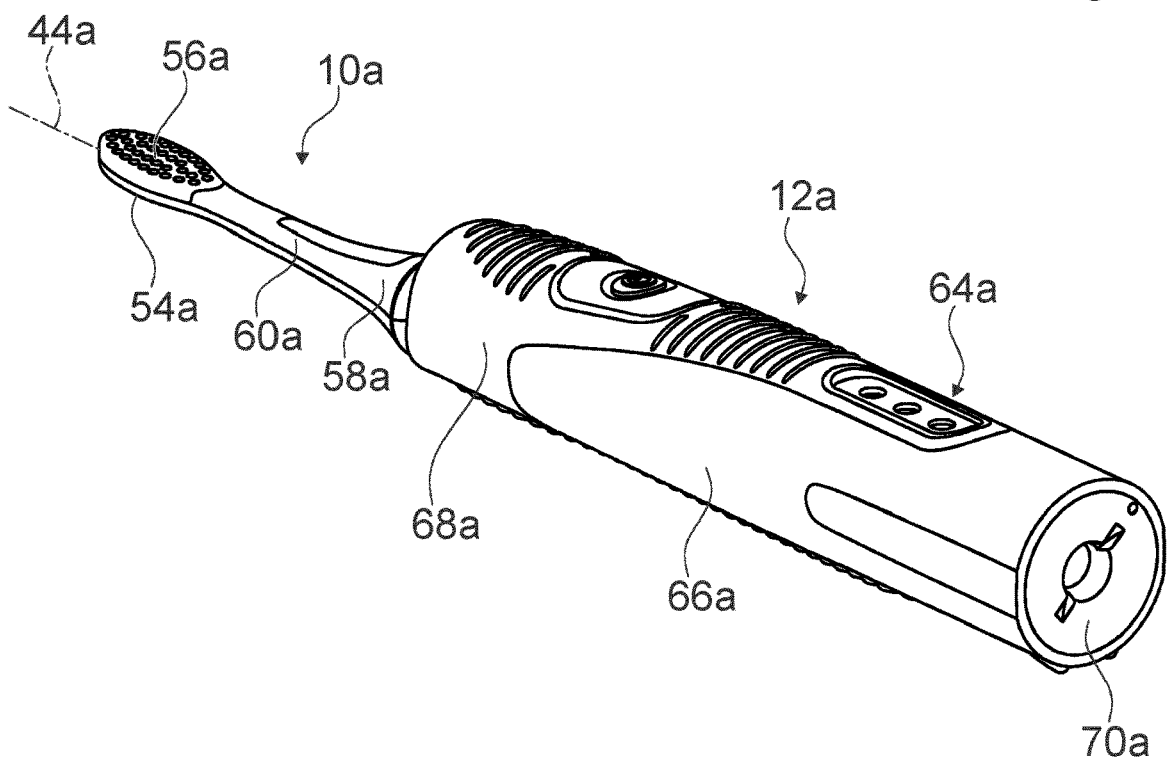
Figure 3:
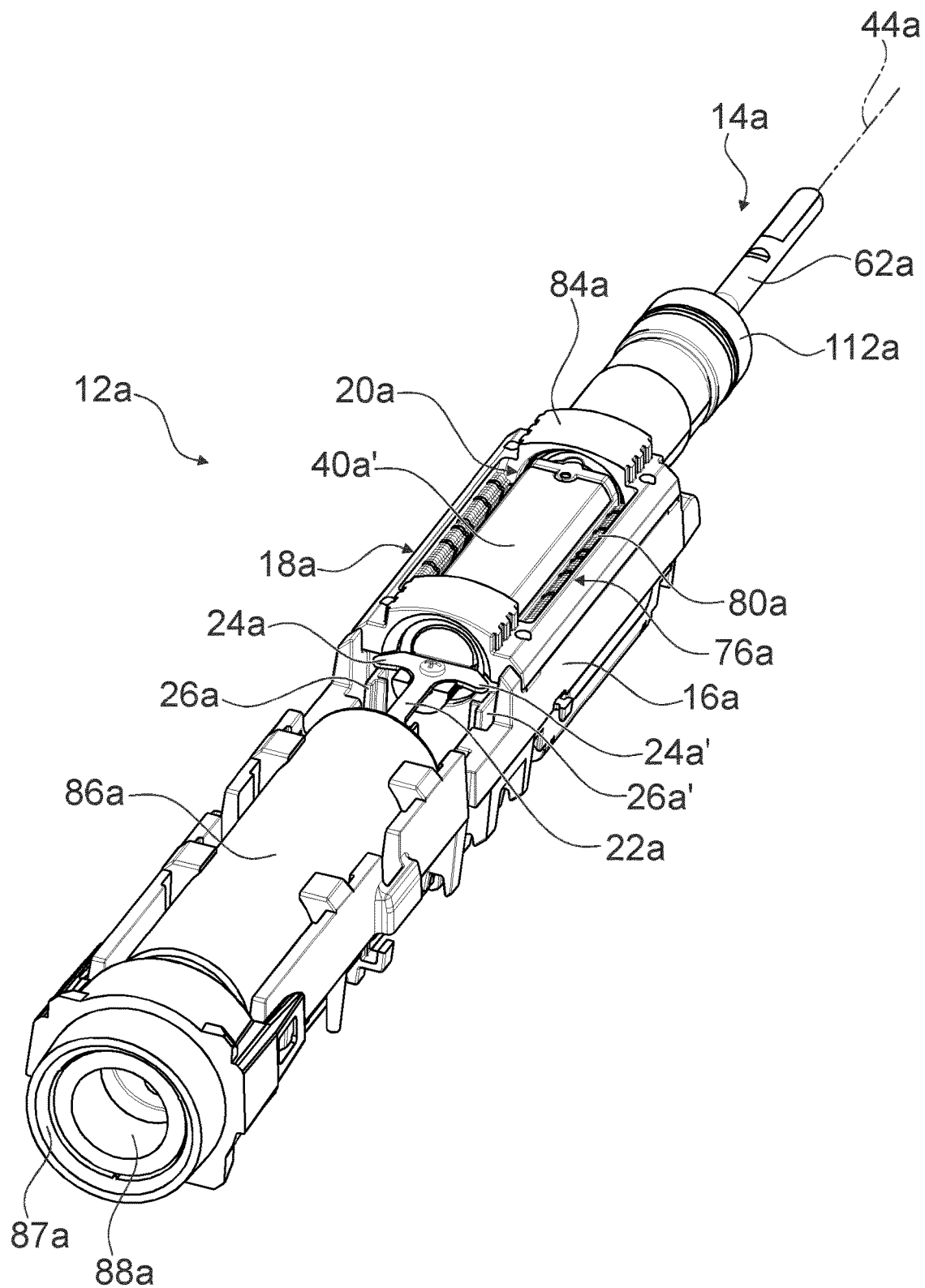
Figure 4:
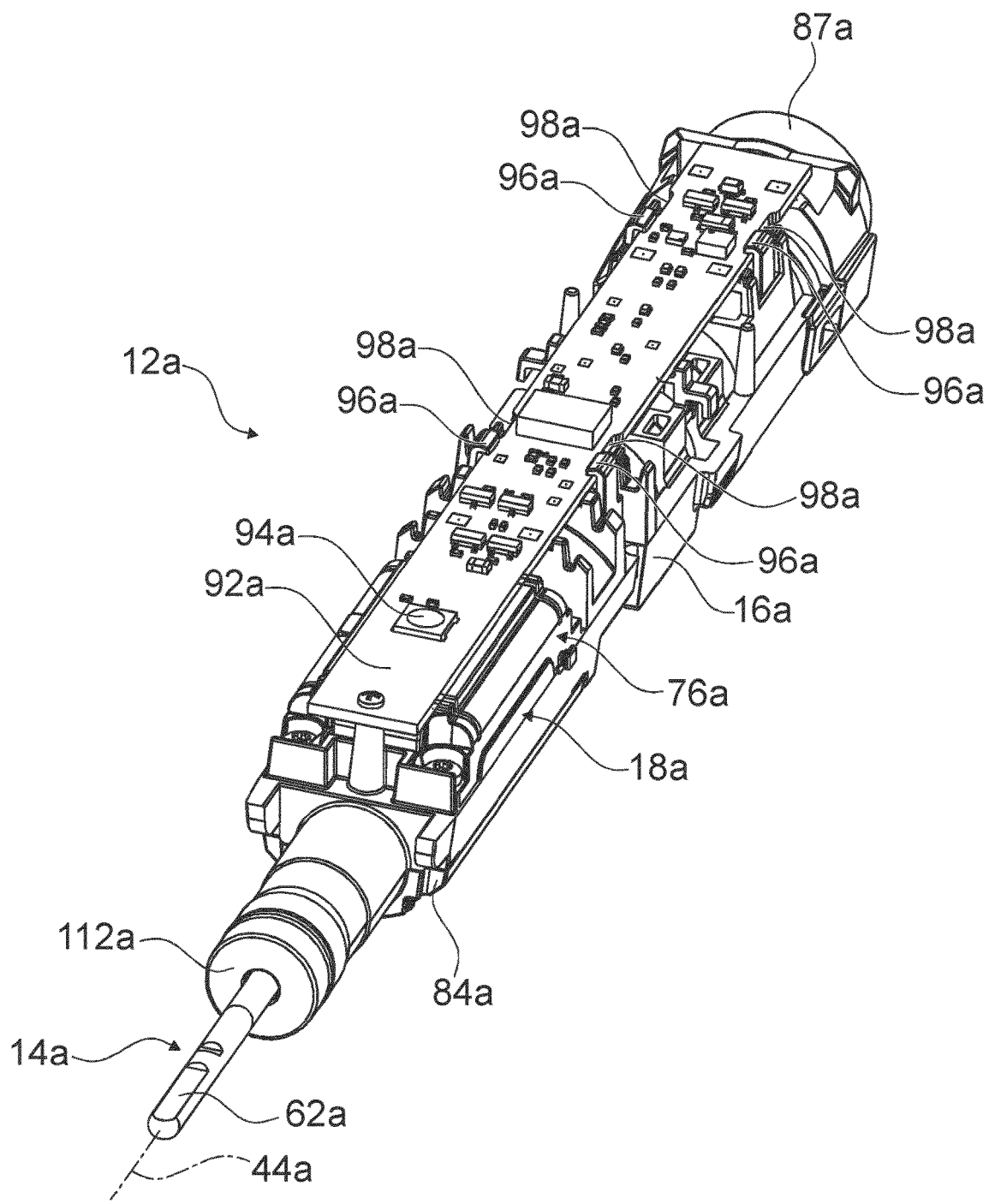
Figure 7:
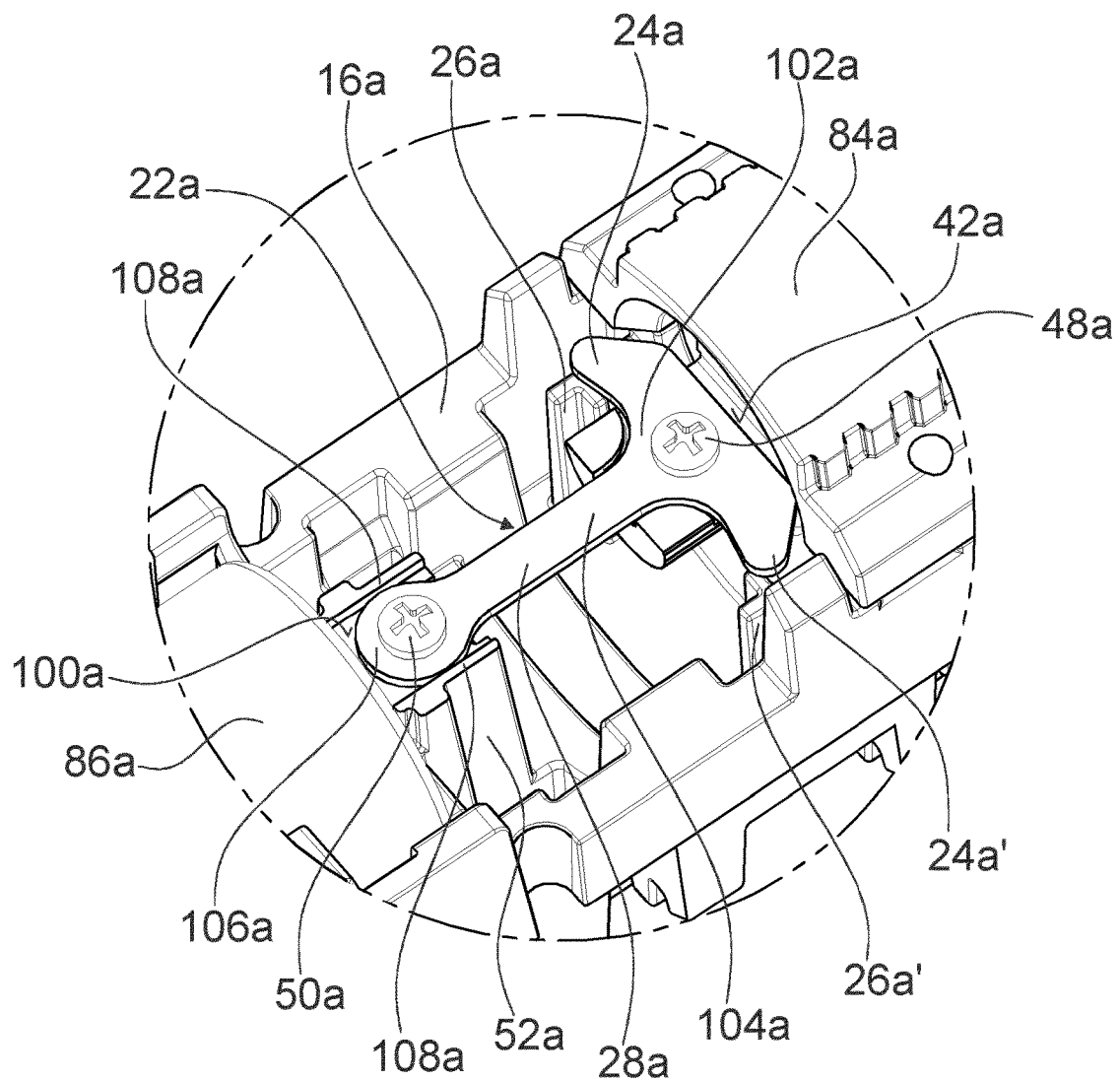
Figure 8:
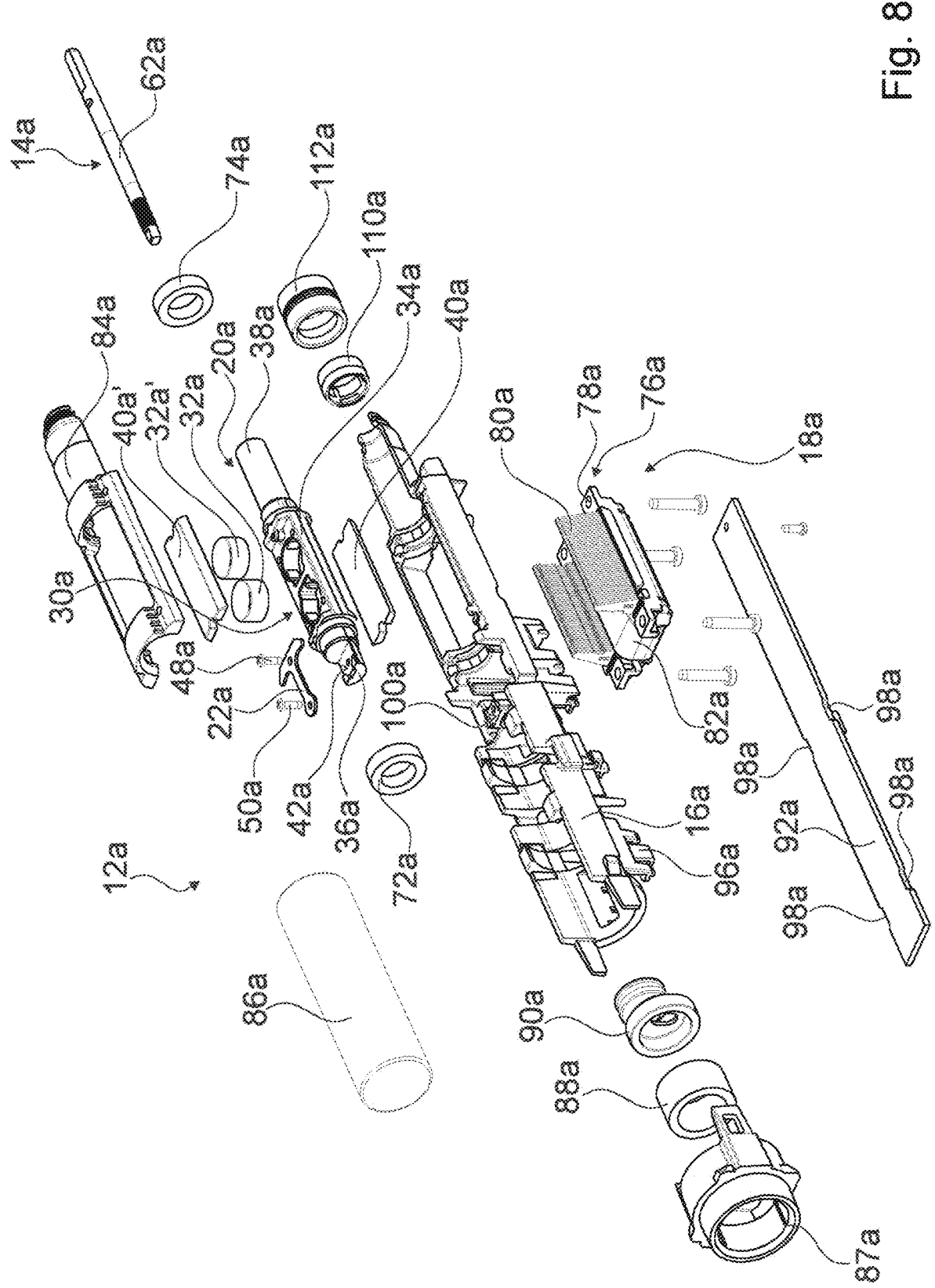
Figure 9:
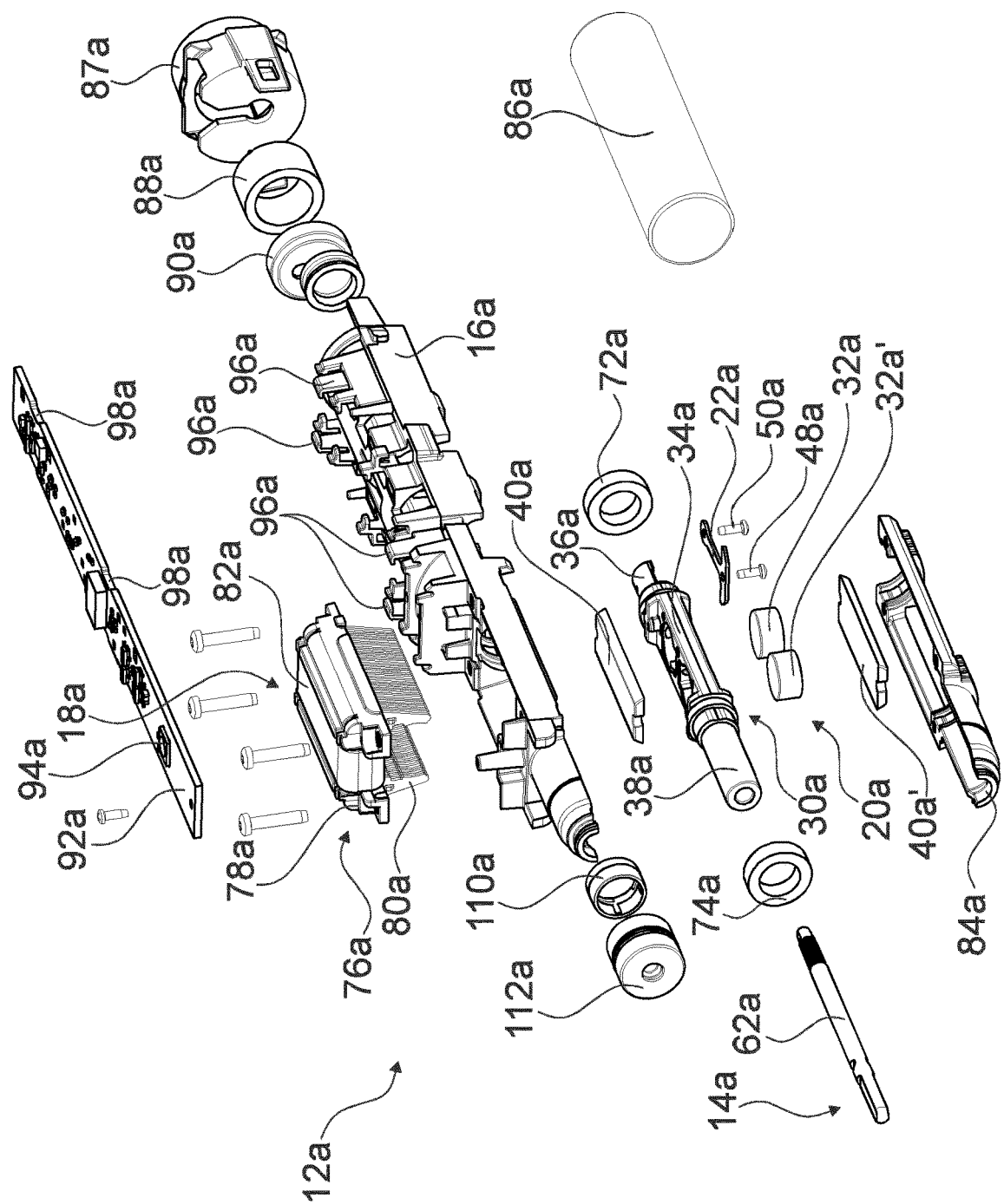
Figure 10:
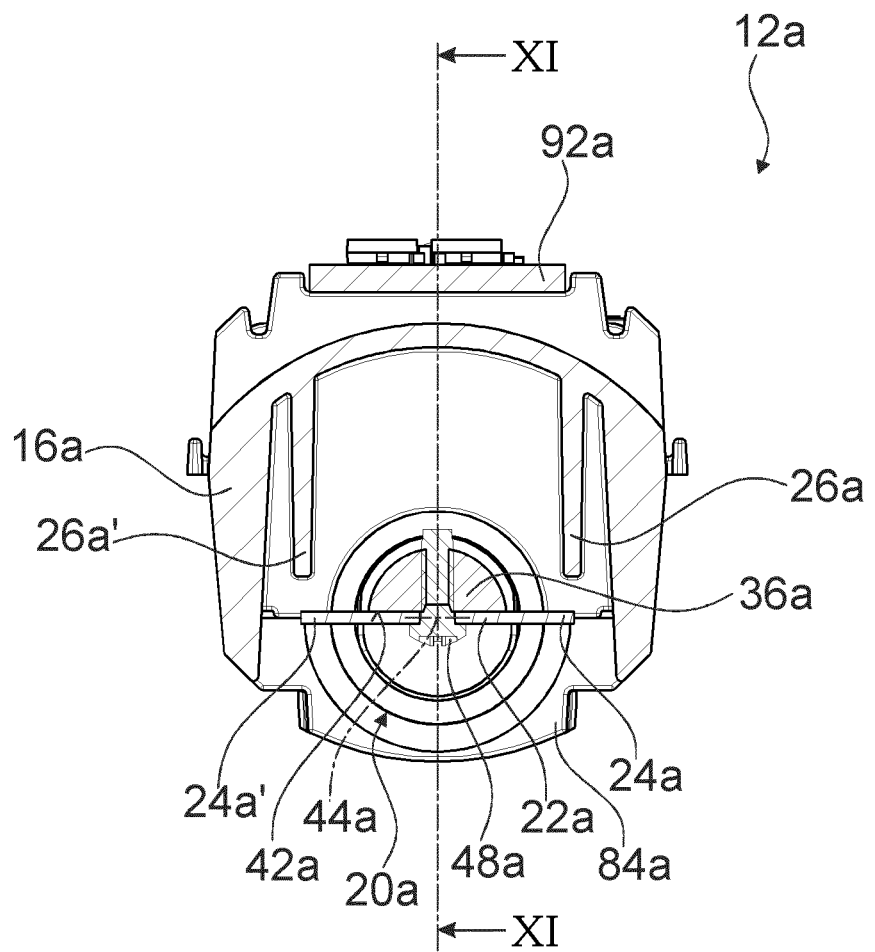
Figure 11:
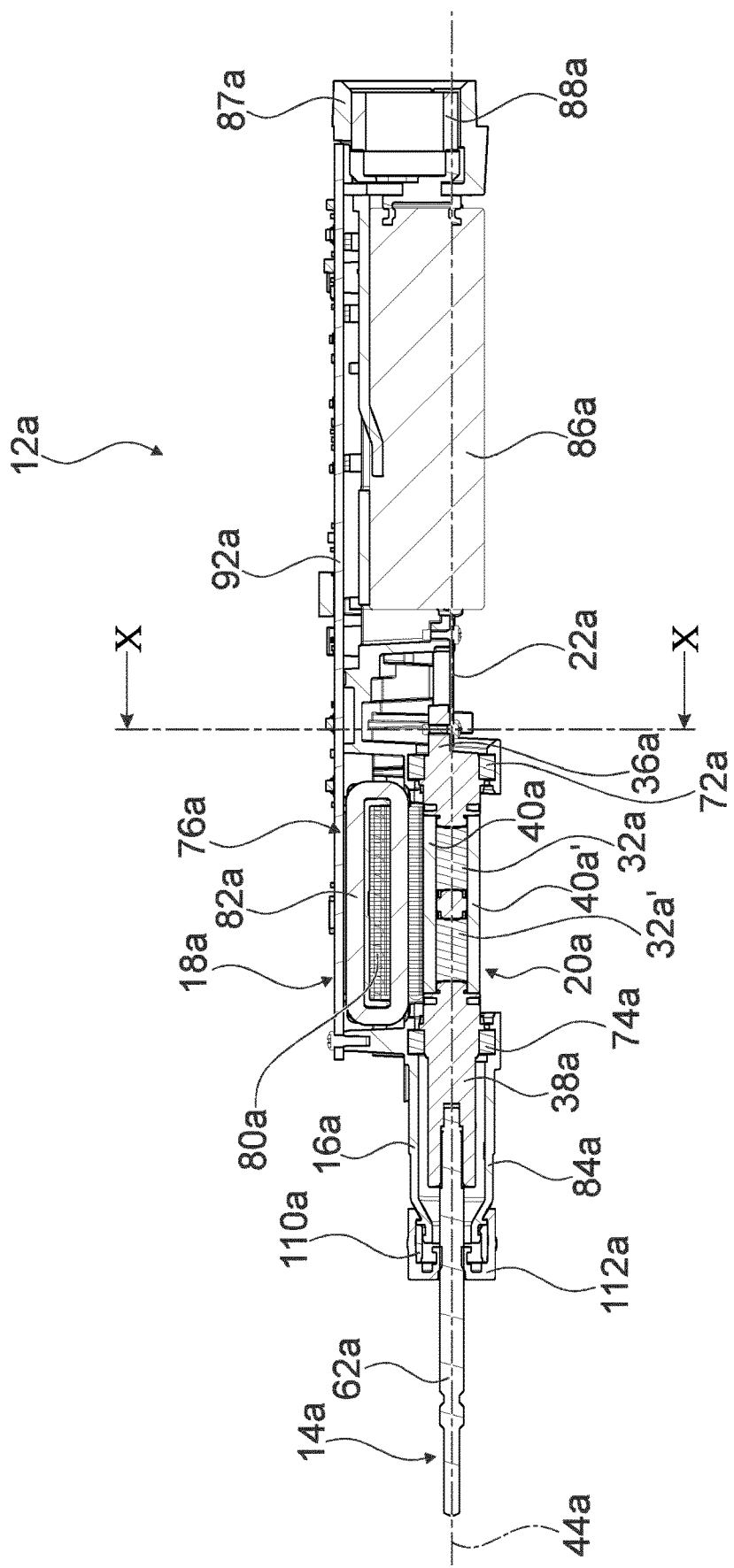
Figure 12:
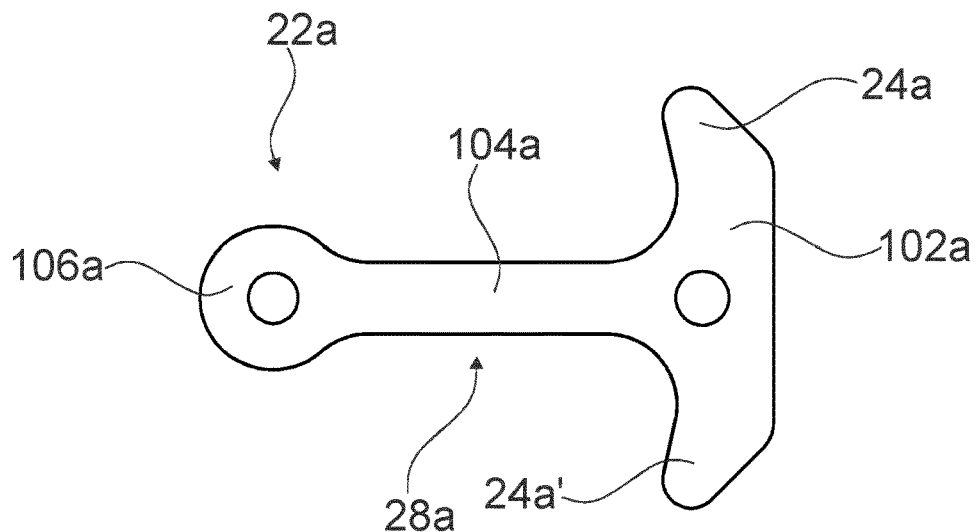
Figure 13:
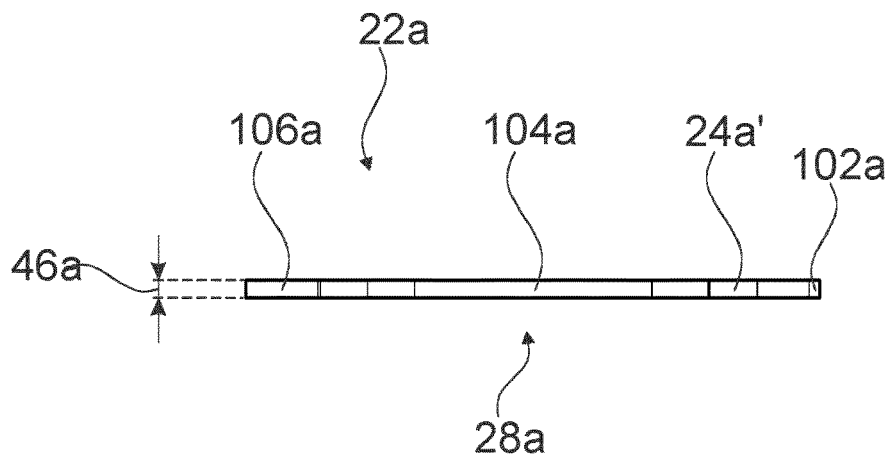
Figure 14:
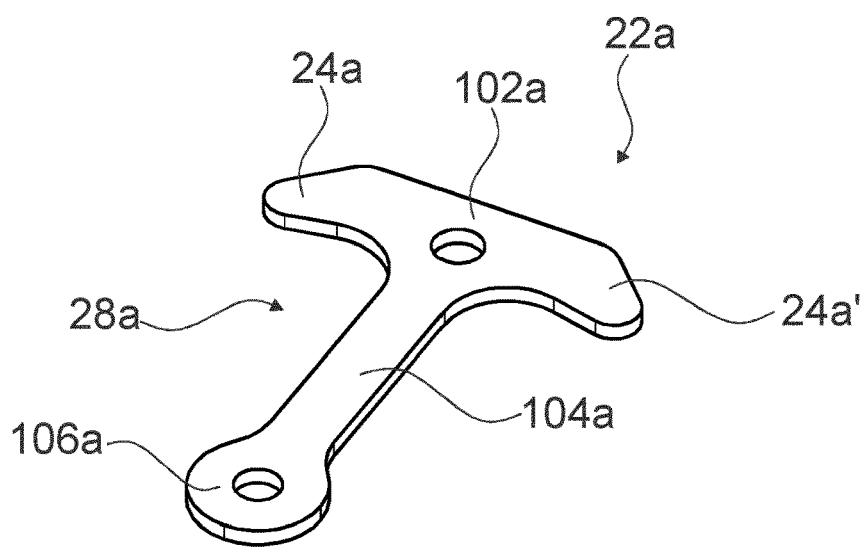
Figure 15:
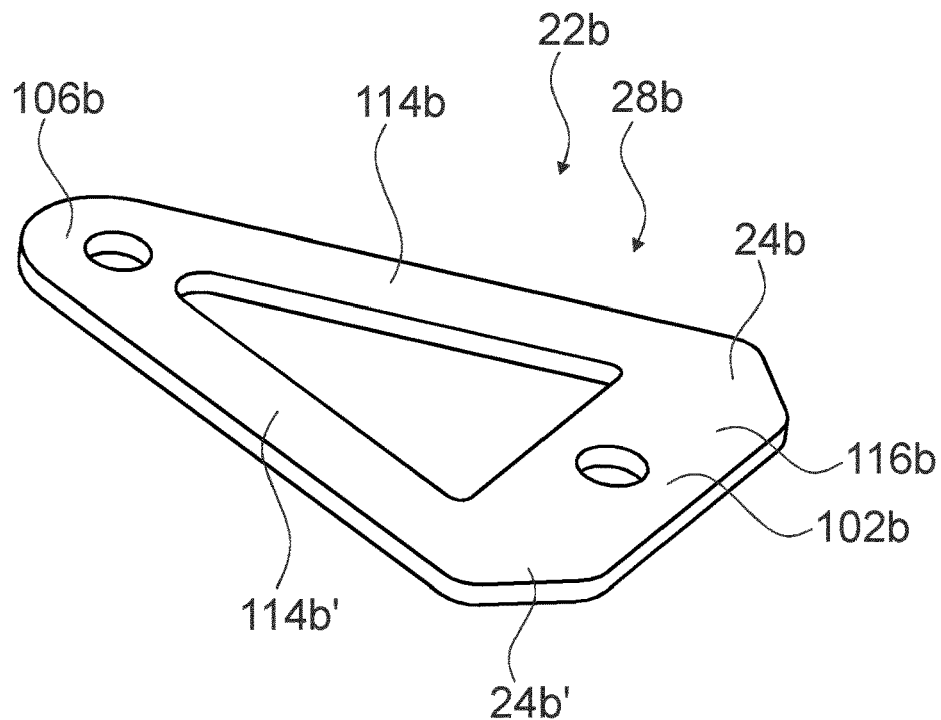
Figure 16:
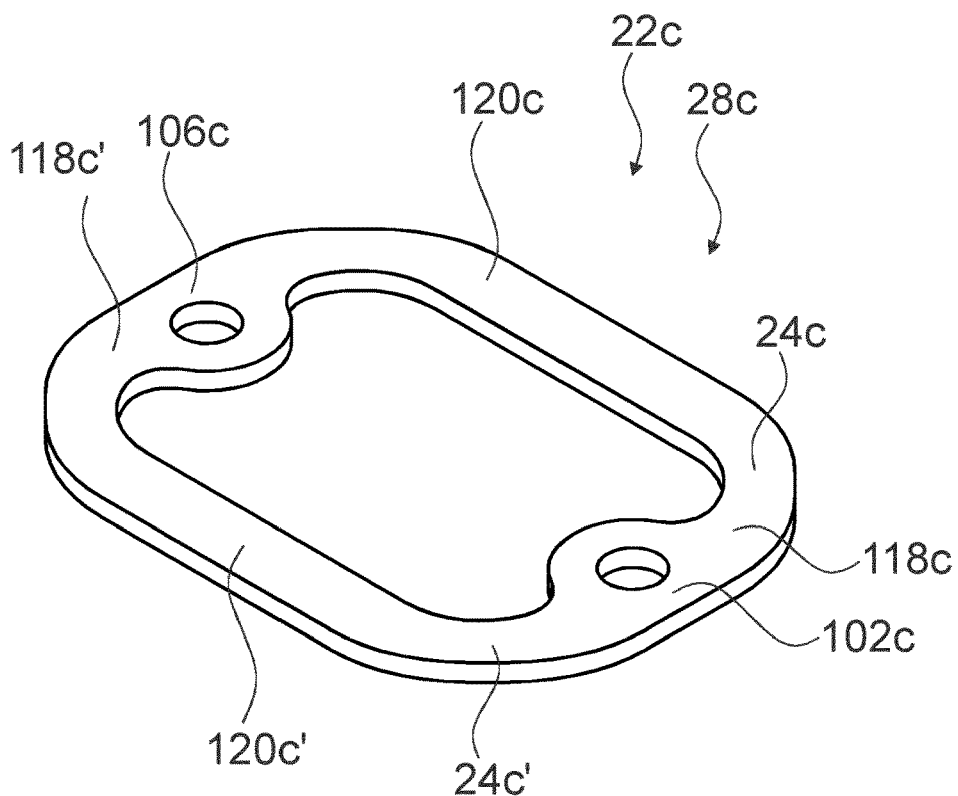
Figure 17:
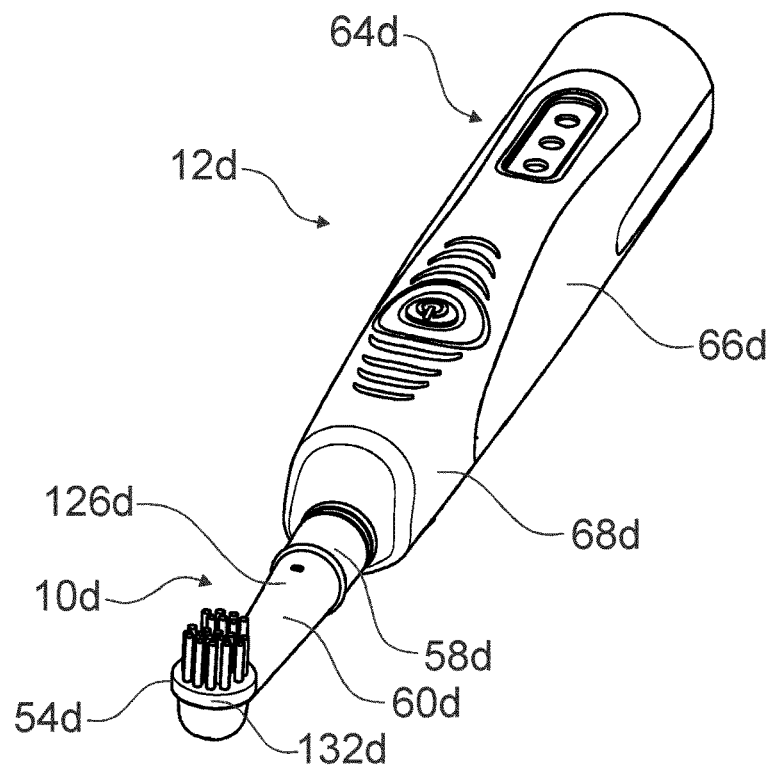
Figure 18:
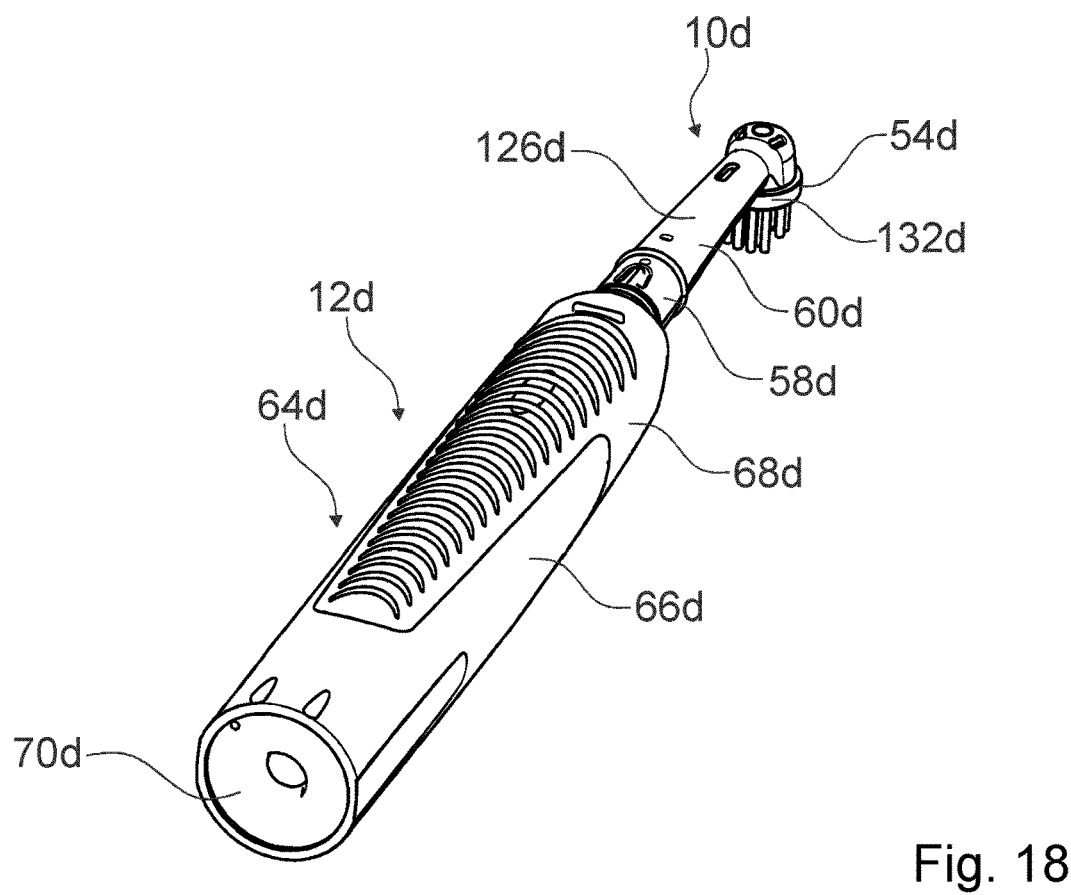
Figure 19:
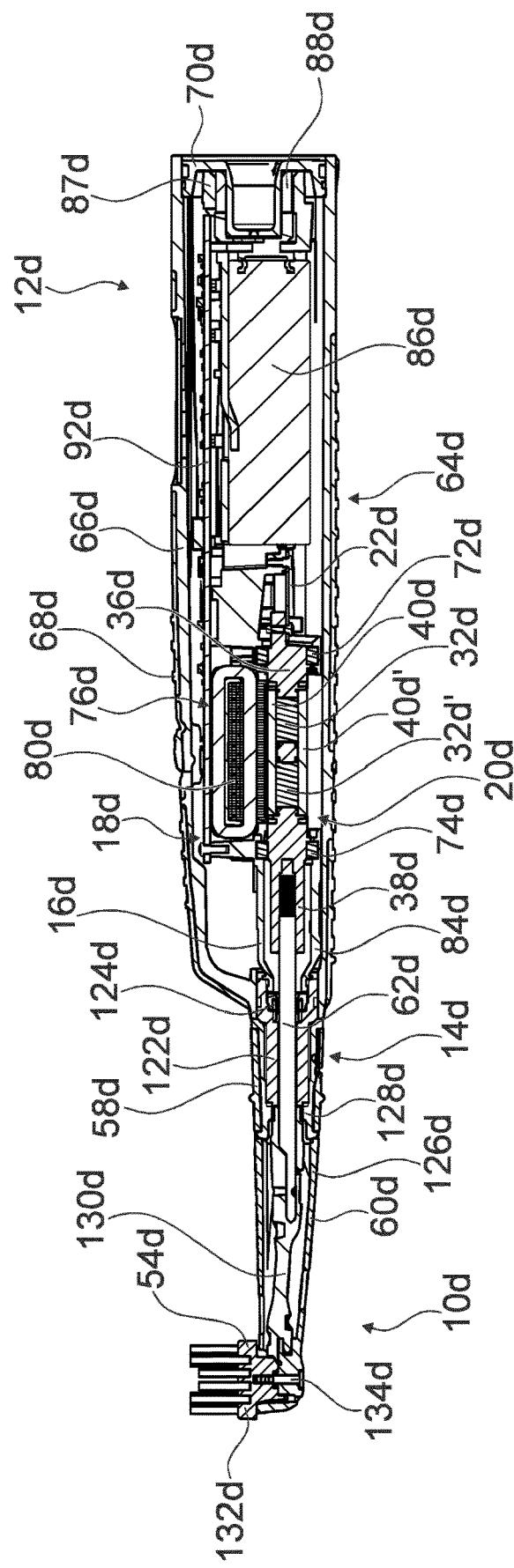
Figure 20:
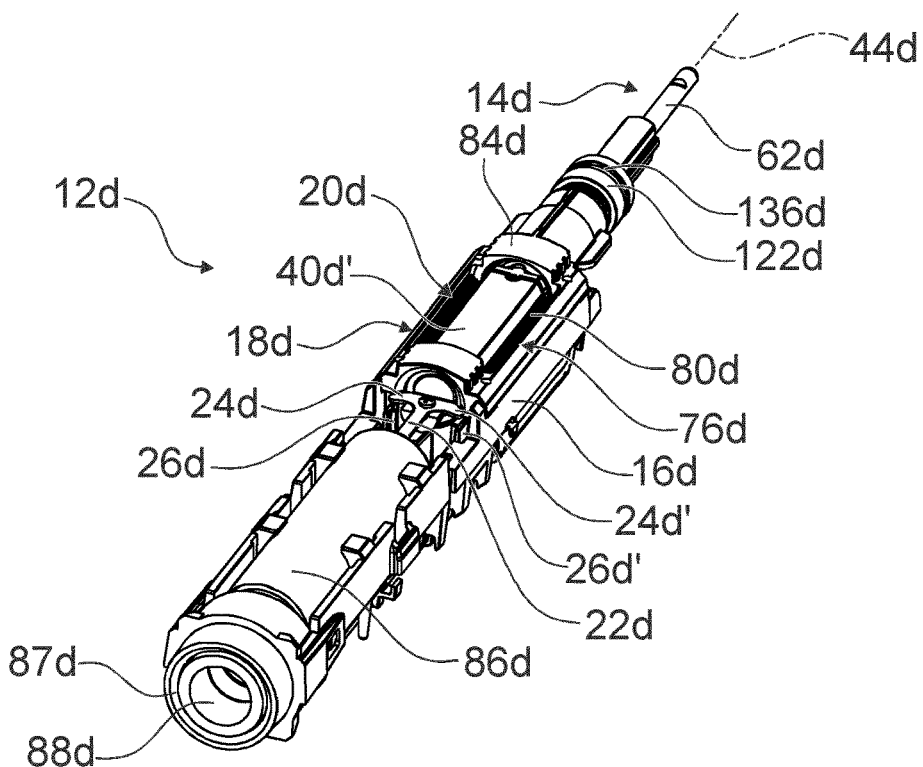
Figure 21:
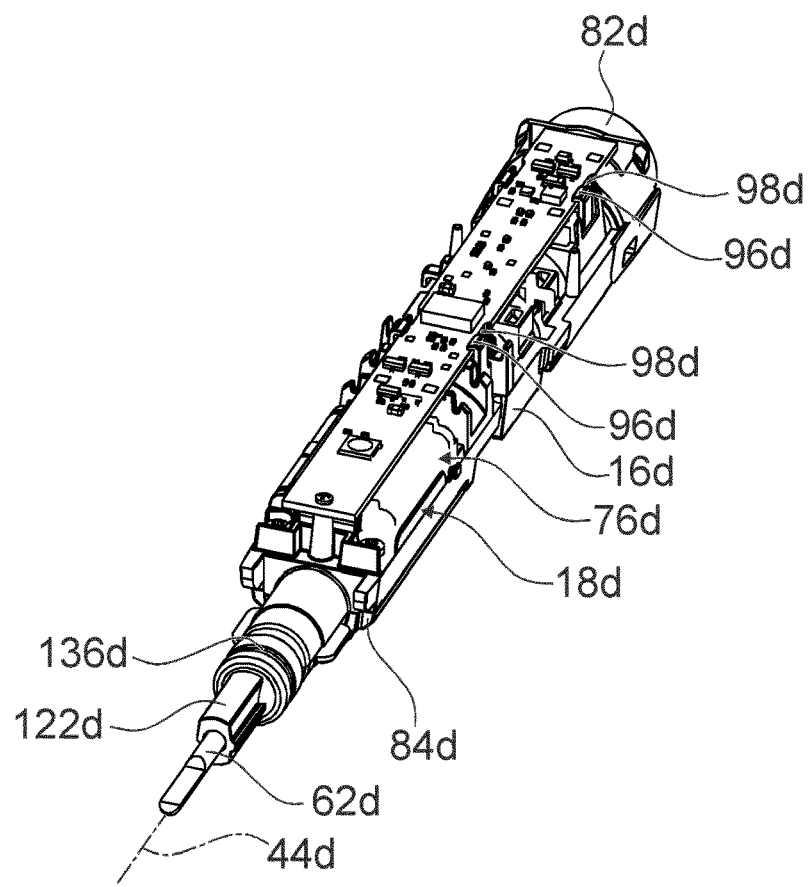
Figure 22:
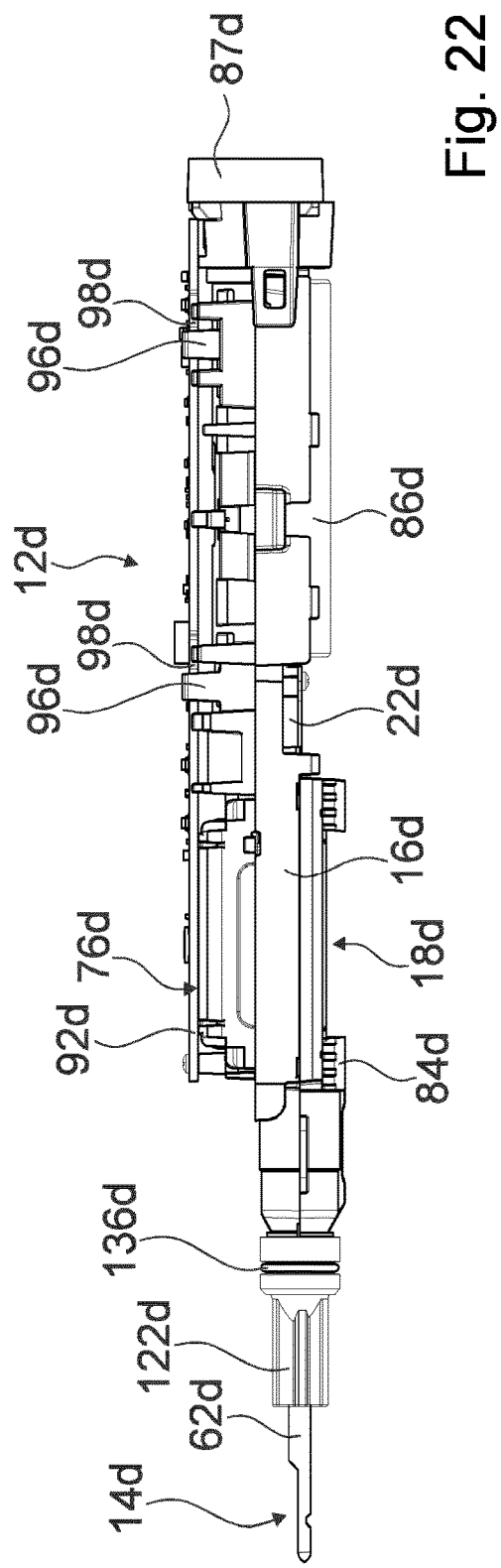
Figure 23:
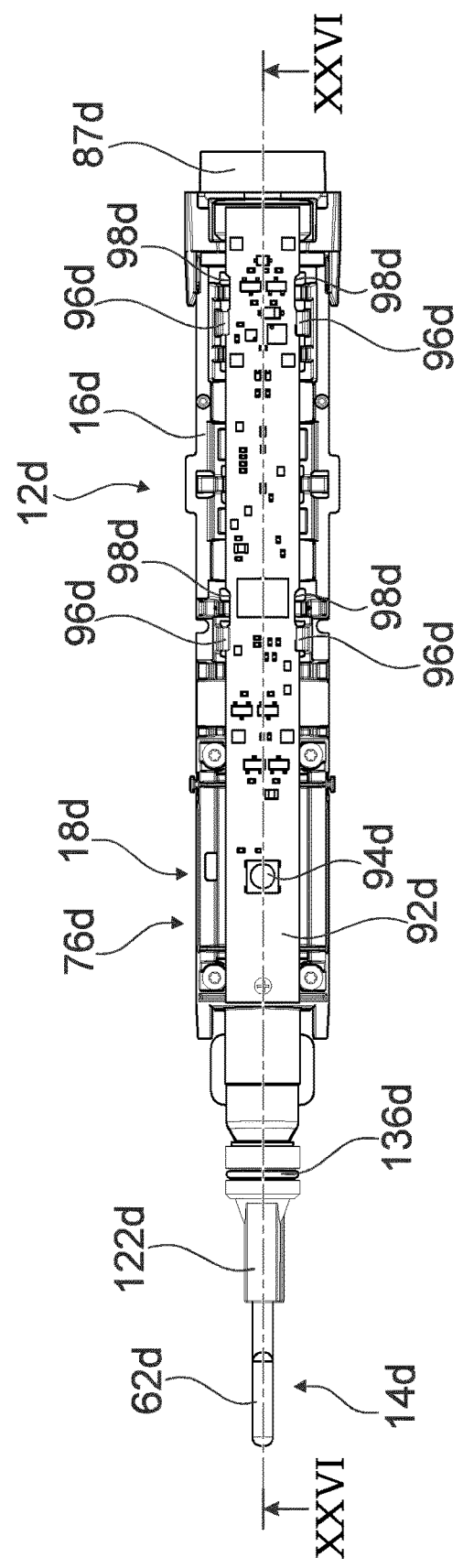
Figure 24:
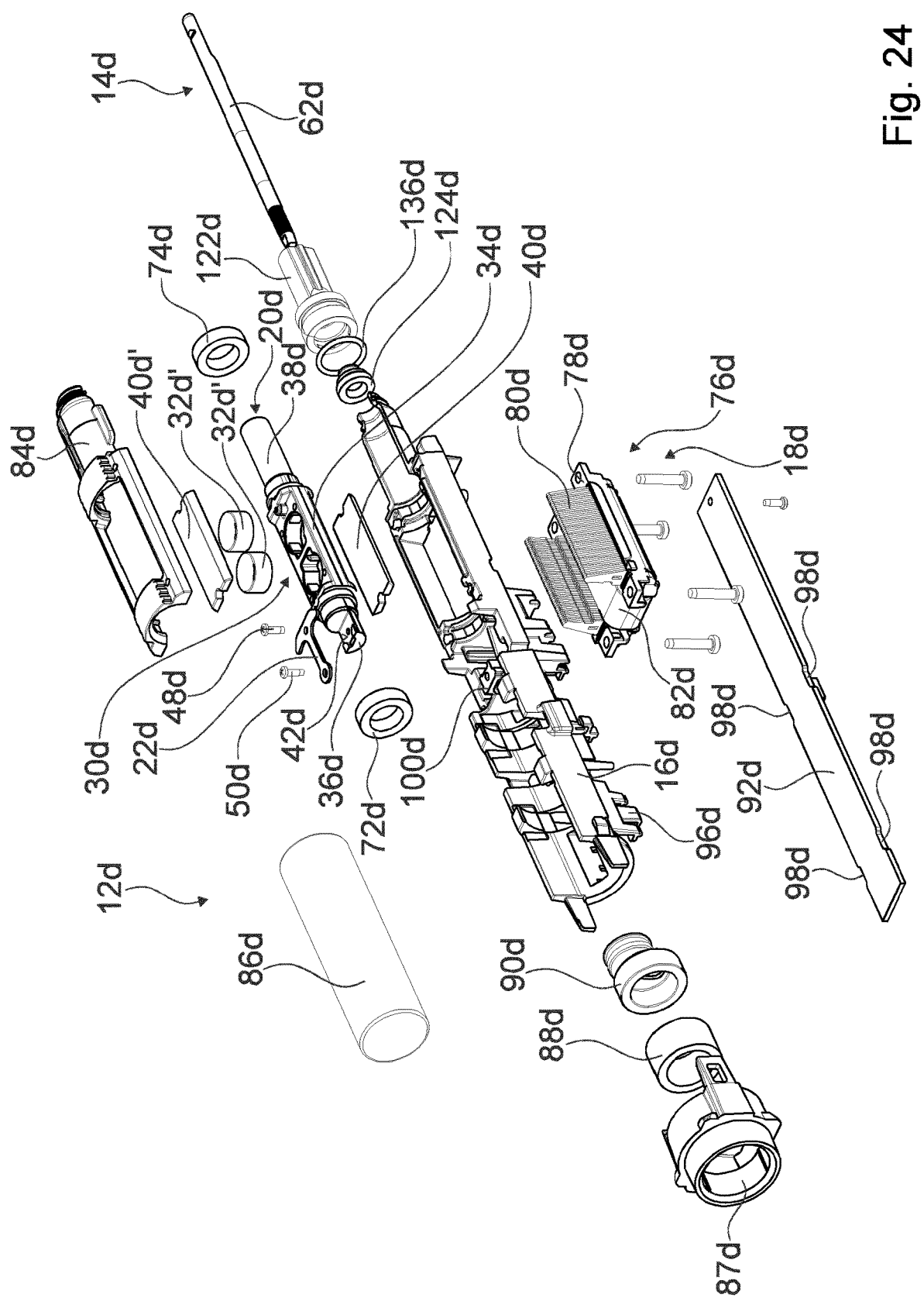
Figure 25:
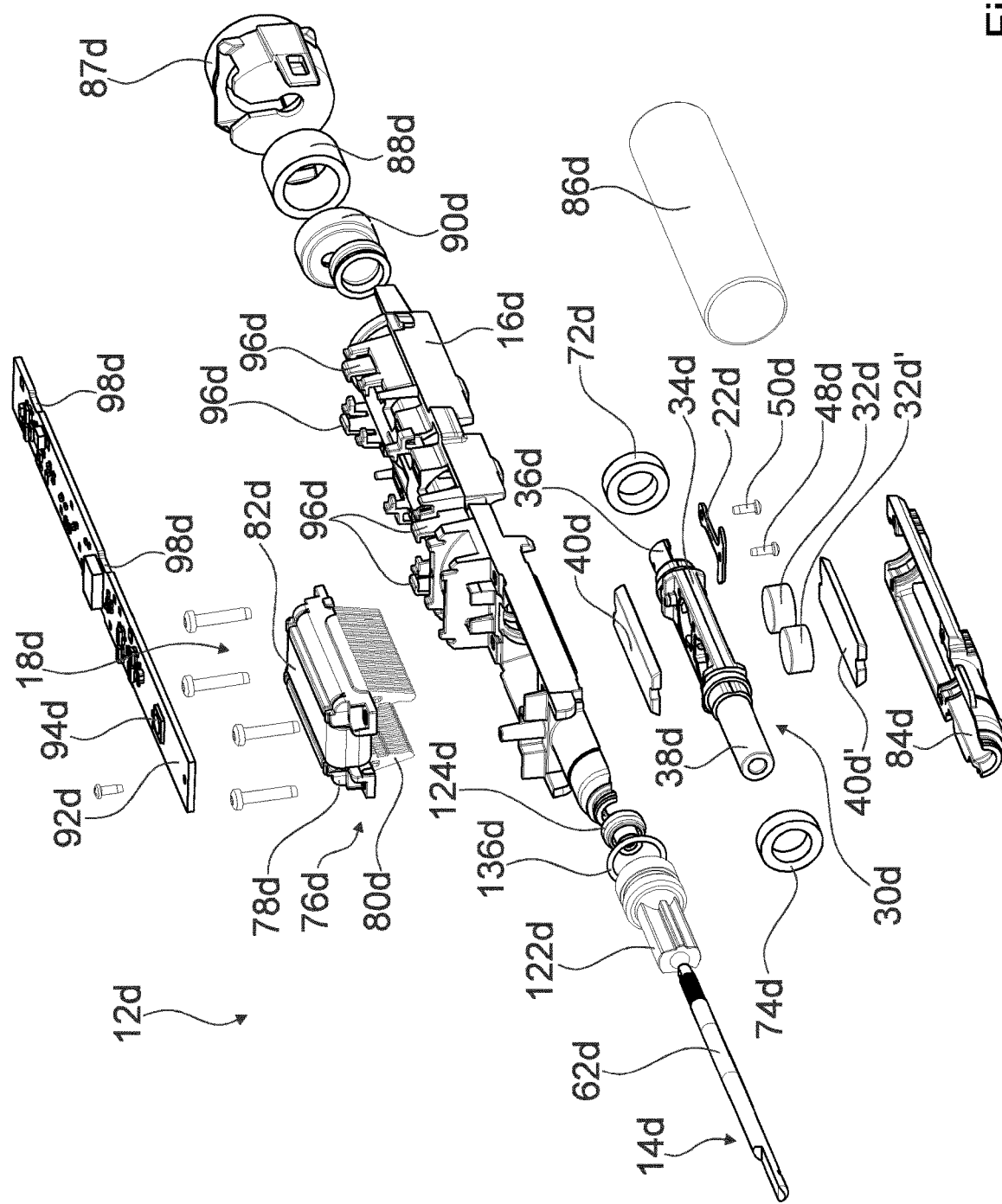
Figure 26:
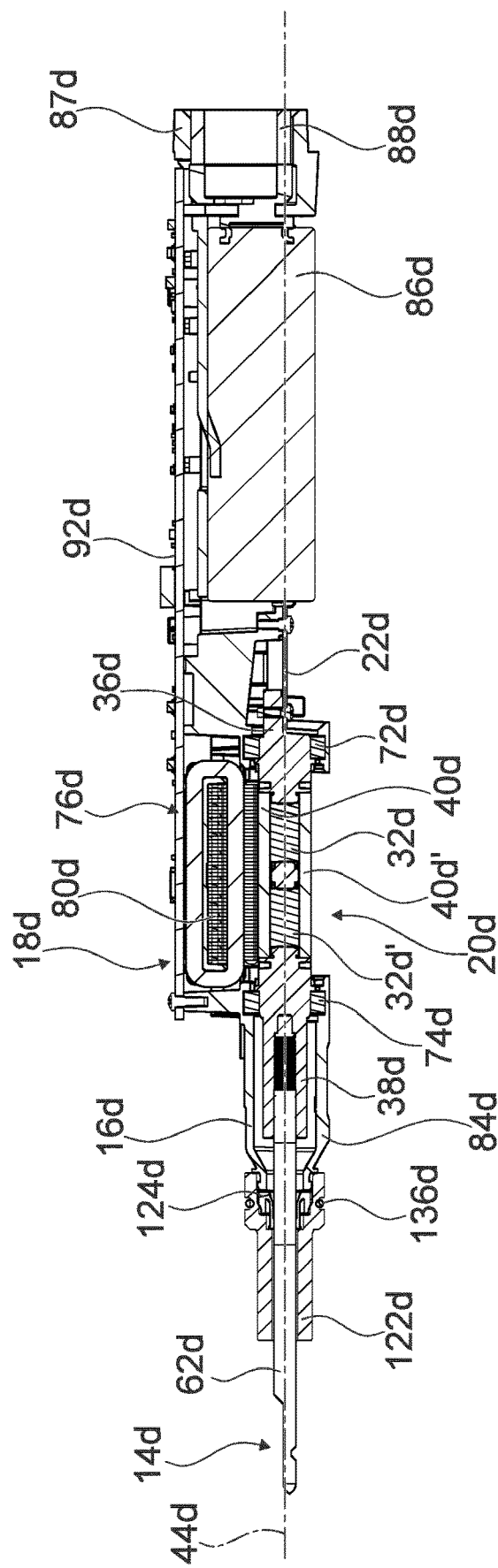

It is shown in:

FIG. 1 an electrical toothbrush with an electrical brush handpiece according to the invention and with a plug-on brush, in a first three-dimensional view, FIG. 2 the electrical toothbrush with the electrical brush handpiece according to the invention and with the plug-on brush, in a second three-dimensional view, FIG. 3 a portion of the brush handpiece according to the invention with the frame unit, with the energy storage, with the drive unit and with the interface, in a first three-dimensional view, FIG. 4 the portion of the brush handpiece according to the invention with the frame unit, with the energy storage, with the drive unit and with the interface, in a second three-dimensional view, FIG. 5 the portion of the brush handpiece according to the invention with the frame unit, with the energy storage, with the drive unit and with the interface, in a side view, FIG. 6 the portion of the brush handpiece according to the invention with the frame unit, with the energy storage, with the drive unit and with the interface, in a top view, FIG. 7 a detail cutout of the portion of the brush handpiece according to the invention, FIG. 8 the portion of the brush handpiece according to the invention with the frame unit, with the energy storage, with the drive unit and with the interface, in an exploded view in the first three-dimensional view, FIG. 9 the portion of the brush handpiece according to the invention with the frame unit, with the energy storage, with the drive unit and with the interface, in an exploded view in the second three-dimensional view, FIG. 10 the portion of the brush handpiece according to the invention with the frame unit, with the energy storage, with the drive unit and with the interface, in a sectional view along the section line X-X through the reset element, FIG. 11 the portion of the brush handpiece according to the invention with the frame unit, with the energy storage, with the drive unit and with the interface, in an exploded view in a sectional view along the section line XI-XI through the reset element, FIG. 12 the reset element of the drive unit of the brush handpiece according to the invention, in a top view, FIG. 13 the reset element of the drive unit of the brush handpiece according to the invention, in a side view, FIG. 14 the reset element of the drive unit of the brush handpiece according to the invention, in a three-dimensional view, FIG. 15 an alternative reset element of a drive unit of a brush handpiece according to the invention, in a three-dimensional view, FIG. 16 an alternative reset element of a drive unit of a brush handpiece according to the invention, in a three-dimensional view, FIG. 17 an electrical toothbrush with a further electrical brush handpiece according to the invention and with a plug-on brush, in a first three-dimensional view, FIG. 18 the electrical toothbrush with the further electrical brush handpiece according to the invention and with the plug-on brush, in a second three-dimensional view, FIG. 19 the electrical toothbrush with the further electrical brush handpiece according to the invention and with the plug-on brush, in a longitudinal section along the longitudinal axis, FIG. 20 a portion of the further electrical brush handpiece according to the invention with the frame unit, with the energy storage, with the drive unit and with the interface, in a first three-dimensional view, FIG. 21 the portion of the further brush handpiece according to the invention with the frame unit, with the energy storage, with the drive unit and with the interface, in a second three-dimensional view, FIG. 22 the portion of the further brush handpiece according to the invention with the frame unit, with the energy storage, with the drive unit and with the interface, in a side view, FIG. 23 the portion of the further brush handpiece according to the invention with the frame unit, with the energy storage, with the drive unit and with the interface, in a top view, FIG. 24 the portion of the further brush handpiece according to the invention with the frame unit, with the energy storage, with the drive unit and with the interface, in an exploded view in the first three-dimensional view, FIG. 25 the portion of the further brush handpiece according to the invention with the frame unit, with the energy storage, with the drive unit and with the interface, in an exploded view in the second three-dimensional view, FIG. 26 the portion of the further brush handpiece according to the invention with the frame unit, with the energy storage, with the drive unit and with the interface, in a sectional view along the section line XXVI-XXVI through the reset element, FIG. 27 the sealing element of the drive unit of the further brush handpiece according to the invention, in a three-dimensional view, FIG. 28 the sealing element of the drive unit of the further brush handpiece according to the invention, in a further three-dimensional view, FIG. 29 the sealing element of the drive unit of the further brush handpiece according to the invention, in a side view, FIG. 30 the sealing element of the drive unit of the further brush handpiece according to the invention, in a top view, and FIG. 31 the sealing element of the drive unit of the further brush handpiece according to the invention, in a sectional view.

DESCRIPTION OF THE EXEMPLARY EMBODIMENTS

FIGS. 1 and 2 show an electrical toothbrush with an electrical brush handpiece 12a and with a plug-on brush 10a. The plug-on brush 10a is configured for the brush handpiece 12a. The plug-on brush 10a is configured for the electrical brush handpiece 12a. The plug-on brush 10a is implemented by an exchangeable brush. Principally, the application of the plug-on brush 10a and/or of an interface receptacle and/or an interface 14a is designed for electrical brush handpieces 12a with a pivoting movement or with a vibrating movement, which means for a brush handpiece of a toothbrush with an oscillating bristle region having a rotation axis that is substantially parallel to the longitudinal direction of the brush handpiece. However, the plug-on brush 10a and/or the interface receptacle and/or the interface 14a may as well be used for other products, like for example manual toothbrushes, like in particular reusable toothbrushes, for example exchangeable-head toothbrushes, alternative electrical toothbrushes, in particular with translational and/or rotational and/or oscillating movements, having plug-on parts with interdental cleaners, in particular interdental brushes with twisted-in bristles and/or tongue cleaners.

The plug-on brush 10a comprises a head portion 54a. The head portion 54a comprises a brush head 56a. Furthermore, the plug-on brush 10a comprises a plug-on portion 58a. The plug-on portion 58a comprises an interface receptacle (not visible in detail) of the plug-on brush 10a. The plug-on brush 10a further comprises a neck portion 60a, which is arranged between the head portion 54a and the plug-on portion 58a. The brush handpiece 12a comprises the interface 14a for a coupling with the plug-on brush 10a. The interface 14a comprises a shaft 62a of the interface 14a for directly engaging in the interface receptacle of the plug-on brush 10a. The shaft 62a of the interface 14a is realized by a metal shaft. Principally, however, a different implementation of the shaft 62a of the interface 14a, deemed expedient by someone skilled in the art, would also be conceivable. The brush handpiece 12a also comprises a housing 64a. The housing 64a comprises a base body 66a that is implemented of a hard component. The base body 66a forms a load-bearing structure of the housing 64a. The base body 66a is implemented in one piece. Principally, however, a different implementation, deemed expedient by someone skilled in the art, would also be conceivable, like for example a two-shell design. The housing 64a moreover comprises an injection-molded enveloping 68a that is implemented of a soft component. The injection-molded enveloping 68a is partly arranged on an outer surface of the base body 66a. The injection-molded enveloping 68a forms a handle region of the housing 64a. The electrical brush handpiece 12a further comprises a lid 70a. The lid 70a is configured for closing the housing 64a on a side that faces away from the interface 14a (FIGS. 1 and 2).

In the following FIGS. 3 to 11 will be referred to, which show different views of the brush handpiece 12a, in each of which both the housing 64a and the lid 70a have been blanked out. Due to the different views, there are some elements which are not shown in all the figures and are therefore not provided with reference numerals in all the figures.

Furthermore, the brush handpiece 12a comprises a fix frame unit 16a, which is arranged in the housing 64a. The brush handpiece 12a further comprises an additional frame unit 87a of a charging coil 88a, which is arranged in the housing 64a. In a mounted state, the frame unit 16a with the mounted frame unit 87a of the charging coil 88a has been inserted in the housing. The frame unit 16a is implemented in one piece, with the frame unit 87a of the charging coil 88a being mounted thereto. The frame unit 16a with the mounted frame unit 87a of the charging coil 88a extends axially over a large portion of the housing 64a. The frame unit 16a and the frame unit 87a of the charging coil 88a are implemented by a plastic frame. The frame unit 16a and the frame unit 87a of the charging coil 88a are made of plastic, preferably of a polypropylene. Principally, however, a different implementation of the frame unit 16a and/or of the frame unit 87a of the charging coil 88a, deemed expedient by someone skilled in the art, would also be conceivable. The frame unit 16a with the mounted frame unit 87a of the charging coil 88a furthermore comprises a row-wise arrangement of different geometries for receiving different components of the innards of the brush handpiece 12a. The frame unit 16a also comprises break-throughs and slots for cables and for weight reduction.

Beyond this the brush handpiece 12a comprises a drive unit 18a, which is accommodated in the housing 64a, for driving the interface 14a. The drive unit 18a is configured for driving the shaft 62a of the interface 14a. The drive unit 18a is implemented of a motor. The drive unit 18a is implemented of an oscillating armature motor. The frame unit 16a accommodates the drive unit 18a at least partly. The frame unit 16a accommodates the drive unit 18a completely. The drive unit 18a is mounted directly in the frame unit 16a. In particular, there is no separate motor assembly group in itself. The drive unit 18a comprises a rotor 20a. The rotor 20a is configured for an execution of an oscillating movement. The rotor 20a comprises a cage element 30a, which is realized in one piece. The cage element 30a is configured for receiving at least one magnet 32a, 32a'. The cage element 30a is configured for receiving two magnets 32a, 32a'. The magnets 32a, 32a' are in each case implemented of permanent magnets. For accommodating the magnets 32a, 32a', the cage element 30a comprises in each case respectively one receiving region. The cage element 30a furthermore has a base body 34a comprising the at least one receiving region, and comprises axis projections 36a, 38a, which are arranged on the two sides of the base body 34a and which form a rotation axis 44a of the rotor 20a. The axis projections 36a, 38a are respectively arranged on opposed sides of the base body 34a. A first axis projection 36a is arranged on a side of the base body 34a that faces away from the interface 14a. A second axis projection 38a is arranged on a side of the base body 34a that faces towards the interface 14a. The second axis projection 38a is coupled directly with the interface 14a. The second axis projection 38a is configured for a rotationally fixed accommodation of the shaft 62a of the interface 14a. An accommodation of the shaft 62a of the interface 14a may herein be achieved, for example, via a press fit, via gluing or via welding. The rotor 20a further comprises at least one cover 40a, 40a', which is configured for a closure of the receiving regions of the cage element 30a. The rotor 20a comprises at least two covers 40a, 40a', which are in each case configured for a closure of a side of the receiving regions of the cage element 30a, and which in particular serve at the same time to direct the magnetic field. The receiving regions are in each case open towards two opposed sides and are closed by means of the covers 40a, 40a' after insertion of the magnets 32a, 32a'. The covers 40a, 40a' are in each case screwed to or glued to or screwed with the base body 34a of the cage element 30a. In assembly preferably first of all the first cover 40a is connected to the base body 34a, then the magnets 32a, 32a' are inserted and after that the second cover 40a' is connected to the base body 34a. Then follows the mounting of bearings 72a, 74a for supporting the rotor 20a. The rotor 20a is accommodated in a receiving region of the frame unit 16a via its bearings 72a, 74a. The bearings 72a, 74a are, for example, realized by roller bearings and/or by slide bearings, which are in each case arranged with an outer ring in a bearing receptacle of the frame unit 16a and with an inner ring on one of the axis projections 36a, 38a. The receiving region for the rotor 20a is open toward two opposed sides. The covers 40a, 40a' are configured for covering the magnets 32a, 32a' and for distributing a magnetic field of the magnets 32a, 32a'.

The drive unit 18a further comprises a reset element 22a. The reset element 22a is implemented to be plate-shaped. The reset element 22a is implemented so as to be planar in a rest position, that is in a non-rotated state of the rotor 20a. The material thickness of the reset element 22a is 0.2 mm to 1 mm, preferably 0.3 mm to 0.7 mm. The reset element 22a is implemented at least partially of a spring steel. The reset element 22a is implemented completely of a spring steel. A material of the reset element 22a comprises at least carbon, silicon, manganese, phosphorus, sulfur and chromium. A carbon content of the material of the reset element 22a is 0.7% to 1.3%, preferably 0.8% to 1.1%. A silicon content of the material of the reset element 22a is 0.15 to 0.5%, preferably 0.15% to 0.4%. A manganese content of the material of the reset element 22a is 0.2% to 0.8%, preferably 0.3% to 0.7%. A phosphorus content of the material of the reset element 22a is 0.00% to 0.04%, preferably 0.00% to 0.03%. A sulfur content of the material of the reset element 22a is 0.00% to 0.04%, preferably 0.00% to 0.03%. A chromium content of the material of the reset element 22a is 0.00% to 0.5%, preferably 0.00% to 0.4%. The reset element 22a is exemplarily made of a spring steel according to the German standard DIN 1.1274 or 1.1269. A further material of the reset element 22a comprises at least carbon, silicon, manganese, phosphorus, sulfur, chromium and molybdenum. A carbon content of the material of the reset element 22a is 0.1% to 0.8%, preferably 0.2% to 0.5%. A silicon content of the material of the reset element 22a is 0.2% to 0.6%, preferably 0.3% to 0.5%. A manganese content of the material of the reset element 22a is 0.1% to 1.0%, preferably 0.4% to 0.8%. A phosphorus content of the material of the reset element 22a is 0.00% to 0.04%, preferably 0.00% to 0.03%. A sulfur content of the material of the reset element 22a is 0.00% to 0.04%, preferably 0.00% to 0.03%. A chromium content of the material of the reset element 22a is 10% to 17%, preferably 12% to 15%. A molybdenum content of the material of the reset element 22a is 0% to 4%, preferably 0% to 2%.

The reset element 22a is with a first end coupled with the rotor 20a in a rotationally fixed manner, and is with a second end fixated to the frame unit 16a in a rotationally fixed manner. The reset element 22a is with its first end coupled with the first axis projection 36a of the rotor 20a in a rotationally fixed manner. The reset element 22a is with its first end fixedly coupled with the first axis projection 36a of the rotor 20a. The axis projection 36a is implemented approximately in a half-cylindrical shape, with a middle axis of the original cylinder corresponding approximately to the rotation axis 44a of the rotor 20a. For a fixation of the first end of the reset element 22a, the axis projection 36a comprises an adjoining surface 42a that is parallel to the rotation axis 44a and faces towards the rotation axis 44a of the rotor 20a. The reset element 22a is configured to lie on the adjoining surface 42a, in a region of its first end, with a main extension surface. In a mounted state, in an initial position of the rotor 20a, a main extension plane of the reset element 22a runs parallel to the adjoining surface 42a. A smallest distance between the adjoining surface 42a and the rotation axis 44a of the rotor 20a is approximately equivalent to 50% of the smallest thickness 46a of the reset element 22a. The adjoining surface 42a is moreover arranged in a deepening, which is configured for securing the reset element 22a parallel to the adjoining surface 42a in a form-fit manner. The deepening is partly implemented correspondingly to the first end of the reset element 22a. With its second end, the reset element 22a is furthermore fixedly connected to a projection 52a of the frame unit 16a. The frame unit 16a comprises the projection 52a with an elevated fixation surface 100a, which the reset element 22a is fixated on. The fixation surface 100a is located on a free end of the projection 52a of the frame unit 16a. The fixation surface 100a is implemented of a square area. The fixation surface 100a has a dimension of 8 $mm^2$ to 30 $mm^2$, preferably 12 $mm^2$ to 20 $mm^2$. The fixation surface 100a is furthermore delimited on two sides by elevated walls 108a of the projection 52a. The walls 108a serve for a temporary securing and orientation of the reset element 22a. A minimum distance between the walls 108a at least approximately corresponds to a transverse extension of the reset element 22a on its second end.

The reset element 22a comprises a base body 28a with a first fixation portion 102a, a shaft 104a and a second fixation portion 106a. The first fixation portion 102a and the second fixation portion 106a are arranged on opposed ends of the reset element 22a and are connected via the shaft 104a. The first fixation portion 102a and the second fixation portion 106a respectively have a central recess. The central recesses are in each case implemented by circular holes. The first fixation portion 102a is arranged on the first end of the reset element 22a. The hole of the first fixation portion 102a is arranged on the rotation axis 44a of the rotor 20a. The hole has a diameter of 1 mm to 2 mm, preferably of 1.3 mm to 1.7 mm. The second fixation portion 106a is arranged on the second end of the reset element 22a. The second fixation portion 106a is arranged centrally on a free end of the reset element 22a and comprises the hole. The hole is arranged on the rotation axis 44a of the rotor 20a. The hole has a diameter of 1 mm to 2 mm, preferably 1.3 mm to 1.7 mm. The drive unit 18a comprises a first fixation element 48a, which is embodied as a screw and is configured for connecting the reset element 22a to the first axis projection 36a of the rotor 20a. The first fixation element 48a that is embodied as a screw is screwed through the hole of the first fixation portion 102a into a bore of the first axis projection 36a of the rotor 20a. The drive unit 18a further comprises a second fixation element 50a, which is embodied as a screw and is configured for fixating the reset element 22a on the projection 52a of the frame unit 16a. The second fixation element 50a that is embodied as a screw is screwed through the hole of the second fixation portion 106a into a bore of the projection 52a of the frame unit 16a.

The reset element 22a further comprises an abutment element 24a, which is implemented as an abutment projection and is in at least one first abutment position of the rotor 20a configured to adjoin an abutment 26a of the frame unit 16a. The abutment element 24a is configured to restrict an oscillating movement of the rotor 20a toward the first abutment position. The abutment element 24a is implemented by a mechanical abutment, with which the rotor 20a mechanically abuts on the abutment 26a of the frame unit 16a in a movement when reaching an end position. The abutment 26a is implemented by an abutment cylinder on the frame unit 16a. The abutment 26a is arranged off-center in the frame unit 16a. The abutment 26a shows, by way of example, a T-shaped cross section. The abutment 26a is herein arranged in such a way that the abutment element 24a hits onto the abutment 26a in case of a rotation, the end surface of the abutment 26a being adapted to a shape of the end surface of the abutment element 24a. Preferably the abutment element 24a contacts the abutment 26a only in one point of the surface, there may however also be a contact line. In an initial position of the rotor 20a, a minimum distance between the abutment element 24a and the abutment 26a is 0.5 mm to 3 mm, preferably 1 mm to 2 mm. The end surface of the abutment 26a has an area of 2 mm$^2$ to 20 mm$^2$, preferably of 5 mm$^2$ to 10 mm$^2$.

The reset element 22a further comprises a further abutment element 24a', which is implemented as a further abutment projection and is in at least one second abutment position of the rotor 20a configured to adjoin an abutment 26a' of the frame unit 16a. The further abutment element 24a' is configured to restrict an oscillating movement of the rotor 20a toward the second abutment position. The further abutment element 24a' is implemented by a mechanical abutment, with which the rotor 20a mechanically abuts on the abutment 26a' of the frame unit 16a in a movement when reaching an end position. The abutment 26a' is arranged opposite the abutment 26a. The abutment 26a' is arranged on a side of the abutment 26a that is opposed to the rotation axis 44a of the rotor 20a. The abutment 26a' is implemented in a mirrored fashion with respect to the abutment 26a. The abutment 26a' is implemented by an abutment cylinder on the frame unit 16a. The abutment 26a' is arranged off-center in the frame unit 16a. By way of example, the abutment 26a' has a T-shaped cross section. The abutment 26a' is herein arranged in such a way that the further abutment element 24a' hits onto the abutment 26a' in case of a rotation, with the end surface of the abutment 26a' being adapted to a shape of the end surface of the further abutment element 24a'. Preferably the abutment element 24a' contacts the abutment 26a' only in one point of the surface, there may however also be a contact line. In an initial position of the rotor 20a, a minimum distance between the further abutment element 24a' and the abutment 26a' is 0.5 mm to 3 mm, preferably 1 mm to 2 mm. The end surface of the abutment 26a has an area of 2 mm$^2$ to 20 mm$^2$, preferably of 5 mm$^2$ to 10 mm$^2$.

At the first end of the reset element 22a, the abutment element 24a and the further abutment element 24a' extend on opposite sides transversely to the base body 28a of the reset element 22a and away from the base body 28a of the reset element 22a. The abutment element 24a and the further abutment element 24a' extend transversely to the base body 28a of the reset element 22a and away from the first fixation portion 102a. The one abutment element 24a and the further abutment element 24a' are in each case embodied so as to be curved along their main extension direction. The abutment element 24a and the further abutment element 24a' in each case extend, perpendicularly to a main extension direction of the reset element 22a, away from a base body 28a of the reset element 22a, and curve in a direction pointing away from the rotor 20a. The reset element 22a is embodied in an anchor-like shape. The first end of the reset element 22a is arranged on a crown of the anchor shape. The shank 104a of the reset element 22a is herein formed by a shank of the anchor shape. The abutment elements 24a, 24a' are implemented by arms with flukes of the anchor shape. The second fixation portion 106a is formed by a crown of the anchor shape. The first fixation portion 102a is formed by a crown of the anchor shape. The reset element 22a has the shape of an anchor having at least a crown, a shank, a crown and arms with flukes. Other than an anchor, the reset element 22a is implemented in one piece.

The reset element 22a has a length of 12 mm to 20 mm, preferably 14 mm to 18 mm. The reset element 22a has along its central axis the first fixation portion 102a, the shank 104a and the second fixation portion 106a. The shaft 104a herein has a length of 3 mm to 10 mm, preferably 5 mm to 8 mm, and is arranged centrally between the first and second fixation portions 102a, 106a. The first fixation portion 102a and the second fixation portion 106a are respectively arranged on opposite sides of the shaft 104a, the remaining length being divided equally among them. The reset element 22a has a width of 7 mm to 15 mm, preferably 10 mm to 14 mm, across the abutment elements 24a, 24a'. On the shaft 104a the reset element 22a has a width of 1 mm to 4 mm, preferably 1.5 mm to 3 mm. The second fixation portion 106a has a width of 2 mm to 8 mm, preferably of 3 mm to 5 mm. All transitions of the reset element 22a are contiguous and rounded. The reset element 22a is moreover free of burrs and has smooth surfaces. Furthermore, the free ends of the abutment elements 24a, 24a' are rounded. A transition from the base body 28a to the abutment elements 24a, 24a' is also rounded, a radius being 0.5 mm to 5 mm, preferably 1.5 mm to 2.5 mm. Moreover, a transition from the shaft 104a to the second fixation portion 106a, in which the reset element 22a is connected to the frame unit 16a, is rounded, a radius being 0.5 mm to 5 mm, preferably 1.5 mm to 2.5 mm. All edges are rounded in their cross sections, a rounding radius being 0.1 mm to 0.7 mm, preferably 0.15 mm to 0.35 mm.

The abutment element 24a and the further abutment element 24a' are configured to limit a rotation of the rotor 20a to a rotation angle of 2° to 12°, preferably 6° to 10° and especially preferentially 7° to 8°. In a rotation of the reset element 22a by the rotor 20a, the first fixation portion 102a is twisted relative to the second fixation portion 106a by a torsion of the reset element 22a.

The drive unit 18a further comprises a stator 76a. The stator 76a comprises an integrally implemented carrier 78a, a sheet pack 80a inserted in the carrier 78a and a coil 82a encompassing the sheet pack 80a. The stator 76a comprises the integrally implemented carrier 78a that is made of a hard component, the sheet pack 80a inserted in the carrier 78a, the coil 82a encompassing the sheet pack 80a and a guide plate cover that is arranged between the coil 82a and the sheet pack 80a. The stator 76a is realized as a module. The carrier 78a is implemented of a plastic carrier. The carrier 78a is implemented of a substantially rectangular-cuboid-shaped carrier, which has a rectangular-cuboid-shaped recess on a first side for receiving the sheet pack 80a. The sheet pack 80a has a U-shaped cross section, the free ends of the sheet pack 80a respectively pointing away from the carrier. The sheet pack 80a consists of a plurality of tightly packed guide plates. The guide plates are in particular glued, pressed, latched or otherwise connected to the carriers 78a. For receiving the coil 82a, the carrier 78a further comprises a guiding groove on a rear side of the recesses. The coil 82a encompasses the carrier 78a and the sheet pack 80a. The coil 82a is wound around the sheet pack 80a and the carrier 78a. The coil 82a is oriented in a longitudinal direction. The coil 82a and the sheet pack 80a are implemented to be contact-free. For an insulation of the coil 82a against the sheet pack 80a on a side facing away from the carrier 78a, the stator 76a comprises an insulation platelet (not visible in detail), which is located between the coil 82a and the sheet pack 80a. The insulation platelet is implemented of a guide plate cover. The insulation platelet is made of a plastic material. A mounting of the guide plate cover is realized by latching in, gluing or something like that. The insulation platelet protects the wire of the coil 82a from the edges of the sheet pack 80a and prevents a short circuit between the coil 82a and the sheet pack 80a. The carrier 78a of the drive unit 18a is connected directly to the frame unit 16a. The carrier 78a is screwed with the frame unit 16a. However, a different connection, deemed expedient by someone skilled in the art, would principally also be conceivable. The carrier 78a covers the rotor 20a of the drive unit 18a from a side. The carrier 78a covers a first open side of the receiving region of the frame unit 16a for the rotor 20a. Furthermore, the sheet pack 80a partly projects into the receiving region of the rotor 20a. In a mounted state, the sheet pack 80a at least partly encompasses the rotor 20a.

The electrical brush handpiece 12a further comprises a rotor cover 84a. The rotor cover 84a covers the rotor 20a of the drive unit 18a from a side situated opposite the carrier 78a. The rotor cover 84a covers a second open side of the receiving region of the frame unit 16a for the rotor 20a. The rotor 20a is in a mounted state directly encompassed by the stator 76a, the frame unit 16a and the rotor cover 84a. The rotor cover 84a is implemented of a plastic part. The rotor cover 84a is fixedly connected with the frame unit 16a. The rotor cover 84a is connected with the frame unit 16a opposite the carrier 78a. The rotor cover 84a is screwed with the frame unit 16a. However, a different connection, deemed expedient by someone skilled in the art, is principally also conceivable. The rotor cover 84a is configured, together with the frame unit 16a, for a support and fixation of the rotor 20a of the drive unit 18a. The rotor cover 84a and the frame unit 16a in each case form two semicircle-shaped shaft receptacles for an accommodation of the rotor 20a. The semicircle-shaped shaft receptacles are in each case implemented by corresponding shaft receptacles, which together form a complete shaft receptacle. The shaft receptacles are respectively configured for receiving the two axis projections 36a, 38a of the rotor 20a via a respective bearing 72a, 74a. For this purpose, the bearings 72a, 74a, which are configured to support of the axis projections 36a, 38a of the rotor 20a against the frame unit 16a, are accommodated in the shaft receptacles. A variety of embodiments of the bearings 72a, 74a, deemed expedient by someone skilled in the art, are conceivable. The rotor 20a is supported between the frame unit 16a and the rotor cover 84a. The rotor cover 84a is moreover configured, together with the frame unit 16a, for a support and sealing of the shaft 62a of the interface 14a. For this purpose, the rotor cover 84a and the frame unit 16a respectively form a semicircle-shaped shaft receptacle for receiving a mounting ring 110a and a sealing cap 112a. The shaft 62a of the interface 14a is supported between the rotor cover 84a and the frame unit 16a. The rotor cover 84a therefore extends axially from the drive unit 18a to a shaft exit of the interface 14a out of the housing 64a.

The electrical brush handpiece 12a further comprises the mounting ring 110a and the sealing cap 112a, which are configured for a connection of the rotor cover 84a and the frame unit 16a to each other. The mounting ring 110a is configured to be slid over a shaft-side end of the rotor cover 84a and the frame unit 16a. In a mounted state the mounting ring 110a engages around the shaft-side end of the rotor cover 84a and of the frame unit 16a respectively. The mounting ring 110a moreover serves fora centering of the rotor cover 84a and the frame unit 16a. Furthermore, the mounting ring 110a serves for a shaft guidance of the shaft 62a of the interface 14a. The shaft 62a of the interface 14a is guided through the mounting ring 110a. The mounting ring 110a is preferably made of a hard component. In addition to its connecting function, the mounting ring 110 also has a support function for the sealing cap 112a. The sealing cap 112a is configured for latching with the frame unit 16a and the rotor cover 84a. The sealing cap 112a has on its inner side a circumferential latch extension, which is configured to latch into a circumferential latch groove of the frame unit 16a and of the rotor cover 84a. The sealing cap 112a is implemented substantially hollow-cylindrically, with a partially closed base side. The sealing cap 112a furthermore serves for a sealing of a housing interior against the interface 14a. For this purpose, the sealing cap 112a adjoins the shaft 62a of the interface 14a with oversize, such that the sealing cap 112a at least partially twists in a rotational movement of the shaft 62a of the interface 14a. The sealing cap 112a is made of an elastomer. The sealing cap 112a further serves for a sealing between the housing 64a and the frame unit 16a. In this region the mounting ring 110a supports the sealing cap 112a on the enveloping surface.

Beyond this the brush handpiece 12a comprises an energy storage 86a, which is accommodated in the housing 64a, for a supply of the drive unit 18a with energy. The frame unit 16a accommodates the energy storage 86a. The energy storage 86a is arranged on a side of the drive unit 18a that faces away from the interface 14a. The energy storage 86a is clamped radially by lateral holding arms of the frame unit 16a. Furthermore, a length-wise displacement of the energy storage 86a is avoided due to the compartmentalized structure of the frame unit 16a. The energy storage 86a is arranged substantially coaxially with the drive unit 18a. The energy storage 86a is implemented by a rechargeable battery, in particular a nickel metal hydride battery and/or a lithium-ion battery. However, principally a different implementation of the energy storage 86a, deemed expedient by someone skilled in the art, would also be conceivable, like for example as a primary battery. Exemplarily two different energy storages 86a are provided which are used with the brush handpiece 12a. A first proposed energy storage 86a, as shown in the figures, is implemented by a single energy storage cell. The first proposed energy storage 86*a* is implemented by an AA energy storage cell. However, principally it would also be conceivable that the energy storage is implemented by three energy storage cells, which are connected by a frame of the energy storage. With slight adaptions, the frame unit 16*a* is suitable for accommodating both energy storages 86*a*. The frame unit 16*a* is configured for receiving a single AA energy storage cell as well as for receiving three AAA energy storage cells in its frame. The frame is configured to connect the three energy storage cells in series. The series circuit is achieved by metal sheets constituting the contact points to the energy storage cells. An axial extent of the frame is equivalent to an axial extent of the single AA energy storage cells. Furthermore, a length-wise displacement of the energy storage 86*a* is avoided due to the mounting of the frame unit 87*a* of the charging coil 88*a* in cooperation with the charging coil 88*a* and a compensation element 90*a*.

The electrical brush handpiece 12*a* also comprises the charging coil 88*a* for charging the energy storage 86*a*. However, principally a charging of the energy storage 86*a* directly via plug connection would also be conceivable. The charging coil 88*a* is implemented by an induction coil.

The charging coil 88*a* is accommodated in the fix frame unit 87*a* of the charging coil 88*a* and is fixated to the frame unit 16*a* by means of its frame unit 87*a*. The frame unit 87*a* of the charging coil 88*a* comprises a receiving region for a positionally fixed accommodation of the charging coil 88*a*. The charging coil 88*a* is held from the outside by the frame unit 87*a* of the charging coil 88*a* and is held in the length-wise position by means of the compensation element 90*a*. In this way the position of the charging coil 88*a* is safeguarded both radially and axially. A mounting of the charging coil 88*a* is done in particular along the longitudinal axis. The frame unit 87*a* of the charging coil 88*a* is latched and held in a loss-proof manner by two latch brackets of the frame unit 16*a* provided with two latch detents. The compensation element 90*a* is arranged between the charging coil 88*a* and the energy storage 86*a* and is configured for a positioning of the charging coil 88*a* relative to the energy storage 86*a*. The charging coil 88*a* is arranged on a side of the energy storage 86*a* that faces away from the drive unit 18*a*. The charging coil 88*a* is arranged substantially coaxially with the energy storage 86*a* and with the drive unit 18*a*. Moreover, in the mounted state, the lid 70*a* engages into the charging coil 88*a* so as to enable a placement of a ferrite core of a charging device in the charging coil 88*a*. The charging coil 88*a* in particular has an inner diameter of 6 mm to 14 mm, preferably of 8 mm to 15 mm, and has an outer diameter of 12 mm to 19 mm, preferably of 14 mm to 17 mm. The charging coil 88*a* furthermore in particular has a height of 4 mm to 15 mm, preferably of 5 mm to 10 mm.

The electrical brush handpiece 12*a* also comprises a printed circuit board 92*a*. The printed circuit board 92*a* is configured for a controlling of the drive unit 18*a*. The printed circuit board 92*a* is configured, during operation, for a sinus actuation of the drive unit 18*a*. The printed circuit board 92*a* is for this purpose coupled with the energy storage 86*a*. The energy storage 86*a* is connected to the drive unit 18*a* itself by conduits via the printed circuit board 92*a*, which the controlling is integrated on. The energy storage 86*a* is connected to the coil 82*a* that is wound around the sheet pack 80*a*, wherein the coil 82*a* does not lie directly on the sheet pack 80*a* but lies, on the one hand, on the carrier 78*a* and, on the other hand, on the guide plate cover. In the coil 82*a* an alternating current is generated, which induces an alternating polarization which forms on the free ends of the sheet pack 80*a*. The magnets 32*a*, 32*a*' are fixedly arranged in the rotor 20*a* and are mounted via the covers 40*a*, 40*a*', which optimize the field created by the magnets 32*a*, 32*a*'. The rotor 20*a* is supported such as to be rotatable within the sheet pack 80*a*. Due to the polarization of the free ends of the sheet pack 80*a*, the rotor 20*a* seeks to re-align itself in the field with the magnets 32*a*, 32*a*', which will result in a movement. If the ends of the sheet pack 80*a* are re-polarized, the rotor 20*a* seeks to align itself in the other direction. This will result in an oscillating to-and-fro movement of the rotor 20*a*. The reset element 22*a* on the rotation axis 44*a* ensures re-guiding of the rotor 20*a* into a zero position, and furthermore brings about gentle movement transitions when the polarization changes. All in all, the reset element 22*a* is necessary to basically enable the movements, as otherwise the forces due to polarization would be too great to allow any oscillation. What is/are controlled by the printed circuit board 92*a*, are the energy pulses supplied to the drive unit 18*a*. These dimensions are specifically adapted to the actual drive, respectively the product. In order to obtain smooth running of the drive unit 18*a* with optimized energy requirement, the drive unit 18*a* is actuated in a sinus-shape manner and not with a rectangular signal.

Furthermore, the printed circuit board 92*a* is coupled with the charging coil 88*a*. The printed circuit board 92*a* is configured for a controlling of a charging process of the energy storage 86*a*. The printed circuit board 92*a* also comprises an operating element 94*a*, which can be operated through the base body 66*a* of the housing 64*a* and which serves for an activation and/or deactivation of the brush handpiece 12*a*. The operating element 94*a* is configured to be operated through the injection-molded enveloping 68*a* of the housing 64*a*. Beyond this, further elements are provided on the printed circuit board 92*a*, like in particular conduits, resistors, LEDs and/or a control unit. The printed circuit board 92*a* is furthermore partly accommodated in the frame unit 16*a* in a form-fit manner and extends over a large portion of an axial extent of the frame unit 16*a*. The printed circuit board 92*a* extends at least over the energy storage 86*a* and the drive unit 18*a* of the brush handpiece 12*a*. For a form-fitting accommodation of the printed circuit board 92*a*, the frame unit 16*a* comprises a plurality of hook-shaped form-fitting elements 96*a*, which are configured for a partial engagement over the printed circuit board 92*a* in a mounted state. For a mounting, the printed circuit board 92*a* has recesses 98*a* on an outer edge, which correspond to the form-fitting elements 96*a* and via which the printed circuit board 92*a* can be moved past the form-fitting elements 96*a* into an end position for mounting. Preferably, during mounting the printed circuit board 92*a* is put upon the frame unit 16*a* with an offset to the end position, wherein it is possible due to the recesses 98*a* to guide the printed circuit board 16*a* past the form-fitting elements 96*a*. After this the printed circuit board 92*a* is slid underneath the form-fitting elements 96*a* and is thus fixed. For this purpose, the printed circuit board 92*a* has separate small cutouts (not visible in detail) for a latching in the end position. The form-fitting elements 96*a* additionally serve as downholders, holding the printed circuit board 92*a* in a force-fitting manner. On a lower end of the printed circuit board 92*a* the frame unit 16*a* further comprises an abutment with a slope, which serves for an accurate positioning of the printed circuit board 92*a*.

Tolerances between the frame unit 16*a* and its structural parts and the housing 64*a* must be compensated such that in the mounted state, on the one hand, the operating element 94*a* is located in the correct position for being operated through the housing 64a and, on the other hand, the charging coil 88a is also in an optimum position, for the inductive charging process to achieve an optimum efficiency rate. Tolerances must also be compensated such that the frame unit 16a sits snugly in the housing 64a and no noise occurs during operation. A length compensation for compensating tolerances is achievable by a laying-in of the partially compressible compensation element 90a. It is also possible for elastic elements to be integrated on the frame unit 16a in order to ensure length compensation, for example flexible elements which are tensioned, i. e. bent, when mounting the lid 70a.

The frame unit 16a as a whole can be divided into a plurality of zones. The frame unit 16a has a coil zone. When viewed from below, the coil zone constitutes the first zone and serves for a direct accommodation and mounting of the charging coil 88a. The frame unit 16a furthermore has a battery zone. The battery zone directly succeeds the coil zone and is configured for an accommodation of the energy storage 86a. The frame unit 16a further has a spring zone. The spring zone directly succeeds the battery zone on a side facing away from the coil zone and is configured for an accommodation of the reset element 22a. The frame unit 16a moreover has an oscillating armature zone. The oscillating armature zone directly succeeds the spring zone on a side facing away from the coil zone and is configured for an accommodation of the drive unit 18a. In the region of the oscillating armature zone, the frame unit 16a is continuously open. Beyond this, the frame unit 16a has a shaft zone. The shaft zone directly succeeds the oscillating armature zone on a side facing away from the coil zone and is configured for an accommodation of the interface 14a, respectively the shaft 62a of the interface 14a. The frame unit 16a also has a print zone. The print zone is arranged on a front side of the frame unit 16a and is configured for an accommodation of the printed circuit board 92a.

The production of the electrical brush handpiece 12a is brought about by loading the frame unit 16a and introducing the frame unit 16a into the housing 64a. Loading the frame unit 16a is essentially done via a rear side. Only the printed circuit board 92a and the stator 76a are mounted from the front. Furthermore, the charging coil 88a and a connecting cap are mounted along the longitudinal axis. The drive unit 18a and the energy storage 86a are mounted from a rear side of the frame unit 16a. In an assembly of the electrical brush handpiece 12a, preferably in a first step the entire innards are mounted via the frame unit 16a. Herein a mounting of the reset element 22a is realized. A mounting of the reset element 22a to the frame unit 16a is done completely from one side. The mounting is herein realized by the fixation of the two fixation elements 48a, 50a which are embodied as screws. The alignment of the rotor 20a is herein brought about autonomously via the bores and surfaces as well as by the planar reset element 22a itself. For an initial position the adjoining surface 42a on the rotor 20a and the fixation surface 100a of the projection 52a of the frame unit 16a are aligned relative to each other by means of the reset element 22a. Then the frame unit 16a is inserted into the housing 64a in a further step. The frame unit 16a is herein firmly jammed in the housing 64a. For this purpose, the frame unit 16a comprises latch lugs, which engage in latch recesses of the housing 64a. After this, in a third step the lid 70a is fixed on the housing 64a, thus closing off the innards. The lid 70a may be screwed with the housing 64a as well as, for example, locked via a bayonet catch.

A production of the reset element 22a is done from a sheet steel. The sheet steel is herein rolled longitudinally. For a production, in a first step punching of the contour and/or of the holes of the reset element 22a is carried out. However, principally it would also be conceivable that the holes are drilled. Then in particular deburring and rounding of the reset element 22a is carried out, which may be effected, for example, by slide grinding, in particular vibratory finishing. Vibratory finishing and/or electropolishing may also be applied in order to obtain the necessary finish quality.

In FIGS. 15 to 31 three further exemplary embodiments of the invention are shown. The following descriptions are substantially limited to the differences between the exemplary embodiments wherein, regarding structural parts, features and functions which remain the same, the description of the other exemplary embodiments, in particular of FIGS. 1 to 14, may be referred to. In order to distinguish between the exemplary embodiments, the letter a present in the reference numerals of the exemplary embodiment of FIGS. 1 to 14 has been substituted by the letters b to d in the reference numerals of the exemplary embodiments of FIGS. 15 to 31. Regarding identically denominated structural parts, in particular structural parts having the same reference numerals, principally the drawings and/or the description of the other exemplary embodiments, in particular of FIGS. 1 to 14, may be referred to.

FIG. 15 shows an alternative implementation of a reset element 22b. The reset element 22b is implemented so as to be plate-shaped. The reset element 22b is with a first end coupled with a rotor in a rotationally fixed manner and is with a second end fixed to a frame unit in a rotationally fixed manner. In FIG. 15 the reset element 22b is triangle-shaped. The triangle-shaped reset element 22b is implemented in a plate shape as a leaf spring. The reset element 22b comprises a base body 28b with a first fixation portion 102ba and a second fixation portion 106b. The base body 28b is implemented as an isosceles triangle with two long legs 114b, 114b' and a short third side 116b. The reset element 22b has in this context the shape of a frame as the interior of the reset element 22b is an empty space. The first fixation portion 102b and the second fixation portion 106b are arranged on opposite ends of the reset element 22b. The first fixation portion 102b is arranged centrally on the short side 116b. The second fixation portion 106b is arranged at the vertex between the two legs 114b, 114b'. The first fixation portion 102b and the second fixation portion 106b respectively have a recess. The recesses are in each case arranged centrally on a rotation axis of the rotor. The central recesses are in each case embodied as round holes. The recesses are in each case configured for a fixation of the reset element 22b by screws. The fixation itself is brought about on an adjoining surface on the rotor and on a fixation surface on the frame unit. The first fixation portion 102b is arranged at the first end of the reset element 22b. The second fixation portion 106b is arranged at the second end of the reset element 22b.

The reset element 22b further comprises an abutment element 24b and a further abutment element 24b' which are configured, in a first abutment position and a second abutment position, to respectively adjoin an abutment of the frame unit. The abutment element 24b and the further abutment element 24b' are configured to limit an oscillating movement of the rotor toward the first abutment position and the second abutment position. The abutment elements 24b, 24b' are integrated directly in the frame of the reset element 22b. The abutment elements 24b, 24b' are in each case arranged in the corner regions between the short side 116b and respectively one of the legs 114b, 114b'. The reset element 22b can abut in the corner points, thus limiting the movement. The abutment element 24b and the further abutment element 24b' extend at the first end of the reset element 22b, on opposite sides at the end of the respective leg 114b, 114b' in the corner to the short side 116b. The abutment element 24b and the further abutment element 24b' respectively form a planar corner.

The reset element 22b has a length of 12 mm to 20 mm, preferably of 14 mm to 18 mm. The reset element 22b has a width of 7 mm to 15 mm, preferably of 10 mm to 14 mm, across the abutment elements 24b, 24b'. Furthermore, the reset element 22b is free of burrs and has smooth surfaces. Moreover, the free ends of the abutment elements 24b, 24b' are rounded. All the edges are rounded in the cross section, a rounding radius being 0.1 mm to 0.7 mm, preferably 0.15 mm to 0.35 mm.

The triangle-shaped reset element 22b has a frame width that is 1 mm to 5 mm, preferably 1.5 mm to 3 mm. The width is not necessarily implemented to be the same in all places, it may for example vary in the region of the fixation holes.

FIG. 16 shows an alternative implementation of a reset element 22c. The reset element 22c is implemented to be plate-shaped. The reset element 22c is with a first end coupled with a rotor in a rotationally fixed manner and is with a second end fixated to a frame unit in a rotationally fixed manner. In FIG. 16 the reset element 22c is O-shaped. The O-shaped reset element 22c is implemented in a plate shape as a leaf spring. The reset element 22c has a base body 28c with a first fixation portion 102c and a second fixation portion 106c.

The base body 28c has two parallel short sides 118c, 118c' and two parallel long sides 120c, 120c'. The reset element 22c has in this context the shape of a frame as the interior of the reset element 22c is an empty space. The first fixation portion 102c and the second fixation portion 106c are arranged on opposite ends of the reset element 22c. The first fixation portion 102c is arranged centrally on the short side 118c. The second fixation portion 106c is arranged centrally on the opposite-situated short side 118c'. The first fixation portion 102c and the second fixation portion 106c have one recess respectively. The recesses are in each case arranged centrally on a rotation axis of the rotor. The central recesses are in each case implemented by round holes. The recesses are in each case configured for a fixation of the reset element 22c by screws. The fixation itself is brought about on an adjoining surface on the rotor and on a fixation surface on the frame unit. The first fixation portion 102c is arranged at the first end of the reset element 22c. The second fixation portion 106c is arranged at the second end of the reset element 22c.

The reset element 22c further comprises an abutment element 24c and a further abutment element 24c' which are configured, in a first abutment position and a second abutment position of the rotor, to respectively adjoin an abutment of the frame unit. The abutment element 24c and the further abutment element 24c' are configured to limit an oscillating movement of the rotor toward the first abutment position and the second abutment position. The abutment elements 24c, 24c' are integrated directly in the frame of the reset element 22c. The abutment elements 24c, 24c' are in each case arranged in the corner regions between the short side 118c and a respective one of the long sides 120c, 120c'.

The reset element 22c can abut in the corner points, thus limiting the movement. The abutment element 24c and the further abutment element 24c' extend at the first end of the reset element 22c, on opposite sides on the end of the respective long side 120c, 120c' in the corner to the short side 118c. The abutment element 24c and the further abutment element 24c' in each case form a planar corner.

The reset element 22c has a length of 12 mm to 20 mm, preferably of 14 mm to 18 mm. The reset element 22c has a width of 7 mm to 15 mm, preferably 10 mm to 14 mm, across the abutment elements 24c, 24c'. All transitions of the reset element 22c are continuous and rounded. The reset element 22c is furthermore free of burrs and has smooth surfaces. All the edges are rounded in the cross section, a rounding radius being 0.1 mm to 0.7 mm, preferably 0.15 mm to 0.35 mm.

The O-shaped reset element 22c has a frame width that is 1 mm to 5 mm, preferably 1.5 mm to 3 mm. The width is not necessarily implemented to be the same in all places, it may, for example, vary in the region of the fixation holes.

FIGS. 17 and 18 illustrate a further implementation of an electrical toothbrush with an electrical brush handpiece 12d and with a plug-on brush 10d. The plug-on brush 10d is intended for the brush handpiece 12d. The plug-on brush 10d is intended for the electrical brush handpiece 12d. The plug-on brush 10d is implemented by an exchangeable brush. Principally, the usage of the plug-on brush 10d and/or of an interface receptacle, respectively an interface 14d, is intended for electrical brush handpieces 12d of a toothbrush with an oscillating bristle region, with a rotation axis that is substantially perpendicular to the longitudinal direction of the brush handpiece.

The plug-on brush 10d is embodied in a multi-part implementation. The plug-on brush 10d is composed of a plug-on brush housing 126d, a defining element 128d, a drive rod 130d and a brush head piece 132d.

The plug-on brush 10d, respectively the plug-on brush housing 126d has a head portion 54d. The head portion 54d comprises a brush head piece 132d that is inserted in the plug-on brush housing 126d. The plug-on brush 10d further comprises a plug-on portion 58d. The plug-on portion 58d is implemented at least partly by a defining element 128d that is inserted in the plug-on brush housing 126d. The plug-on portion 58d comprises an interface receptacle (not visible in detail) in the drive rod 130d. Furthermore, the plug-on brush 10d comprises a neck portion 60d, which is arranged between the head portion 54d and the plug-on portion 58d. The brush handpiece 12d comprises the interface 14d for a coupling with the plug-on brush 10d. The interface 14d comprises a shaft 62d of the interface 14d for a direct engagement in the interface receptacle in the drive rod 130d of the plug-on brush 10d, and further comprises a stud 122d for a direct engagement of the defining element 128d. The shaft 62d of the interface 14d is implemented by a metal shaft. However, a different implementation of the shaft 62d of the interface 14d, deemed expedient by someone skilled in the art, would principally also be conceivable. The brush handpiece 12d moreover comprises a housing 64d. The housing 64d comprises a base body 66d, which is implemented of a hard component. The base body 66d forms a load-bearing structure of the housing 64d. The base body 66d is implemented in one piece. However, a different implementation, deemed expedient by someone skilled in the art, would also be conceivable, like for example a two-shell implementation. The housing 64d further comprises an injection-molded enveloping 68d, which is implemented of a soft component. The injection-molded enveloping 68d is partly arranged on an outer surface of the base body 66d. The injection-molded enveloping 68d forms a handle region of the housing 64d. Beyond this the electrical brush handpiece 12d comprises a lid 70d. The lid 70d is configured to close the housing 64d on a side facing away from the interface 14d (FIGS. 17, 18).

In FIG. 19 the electrical toothbrush of FIGS. 17 and 18 is shown in a longitudinal section. The plug-on brush 10d is structured in a multi-part implementation. A plug-on brush housing 126d forms the basic structure that keeps everything together. The brush head piece 132d is mounted in the plug-on brush housing 126d with its rear side from the front side of the plug-on brush housing 126d, and is fixed from the rear via a bearing pin 134d. The fixation is realized in such a way that an oscillating rotational movement is enabled. The bearing pin 134d thus forms the rotation axis of the bristle region. In operation the bristle region will rotate oscillatingly around this rotation axis. The drive rod 130d is inserted from the plug-on side toward the brush handpiece 12d of the plug-on brush 10d, the drive rod 130d being mounted in such a way that its end-side-mounted toothing engages into the toothing on the rear side of the brush head piece 132d. The defining element 128d, which is inserted directly after the drive rod 130d, on the one hand latches with the plug-on brush housing 126d and, on the other hand, holds the drive rod 130d in its position. The drive rod 130d is movable so as to rotate oscillatingly around its longitudinal axis. The rotation axis of the drive rod 130d is parallel, respectively identical, to a rotation axis 44d of the shaft 62d of the interface 14d. In order to achieve a movement of the plug-on brush 10d, in particular of the brush head piece 132d, the plug-on brush 10d is plugged onto the stud 122d of the brush handpiece 12d with its opening in the defining element 128d, and at the same time the shaft 62d of the interface 14d of the brush handpiece 14d is also plugged into the plug-on brush 10d. Herein the stud 122d of the brush handpiece 12d fixes the plug-on brush housing 126d via the defining element 128d, such that in the operating state the plug-on brush housing 126d does not make any movements and/or is fixed relative to the brush handpiece 12d. The shaft 62d of the interface 14d is inserted and clamped in the drive rod 130d and serves for guiding the movement from the brush handpiece 12d to the brush head piece 132d. The shaft 62d of the interface 14d of the brush handpiece 12d is stuck on the drive rod 130d, the drive rod 130d transmits the movement via its toothing to a toothing on the rear side of the brush head piece 132d. This results in the brush head piece 132d—and thus the bristle region attached thereto—to be set into motion. The plug-on brush 10d is structured in such a way that the oscillating rotational movement of the shaft 62d of the interface 14d of the brush handpiece 12d is deflected into a rotational movement oscillating perpendicularly thereto, said movement being effected via the mutually engaging toothings of the drive rod 130d and the brush headpiece 132d.

Two connections to the brush handpiece 12d are shown; one connection is provided between the shaft 62d of the interface 14d and the defining element 128d, the other one between the defining element 128d and the stud 122d. The connection between the defining element 128d and the stud 122d defines the rigid position of the brush handpiece 12d via the stud 122d of the plug-on brush housing 126d that is connected to the defining element 128d. The connection between the shaft 62d of the interface 14d and the drive rod 130d creates a connection of the moved parts of the plug-on brush 10d to the shaft 62d of the interface 14d. The movement is transmitted from the shaft 62d of the interface 14d via the drive rod 130d to the brush head piece 132d with the bearing pin 134d.

In the following FIGS. 20 to 26 will be referred to, said figures showing different views of the brush handpiece 12d, with the housing 64d and the lid 70d being blanked out in each case. Because of the different views, there are some elements which are not shown in all figures and are hence not in all the figures provided with reference numerals. As the basic product structure was already described regarding FIGS. 3 to 11, only the differences will be discussed in the following.

Furthermore, the electrical brush handpiece 12d comprises the stud 122d and a sealing element 124d. The stud 122d is configured for a connection of a rotor cover 84d and a frame unit 16d to each other and for providing part of the interface 14d. The sealing element 124d is arranged within the stud 122d and seals the stud 122d against the shaft 62d of the interface 14d. The stud 122d is configured to be slid over a shaft-side end of the rotor cover 84d and of the frame unit 16d. In a mounted state the stud 122d respectively engages around the shaft-side end of the rotor cover 84d and of the frame unit 16d. The stud 122d furthermore serves for a centering of the rotor cover 84d and of the frame unit 16d. The stud 122d moreover serves as a shaft guidance for the shaft 62d of the interface 14d. The shaft 62d of the interface 14d is guided through the stud 122d and the sealing element 124d. The stud 122d is preferably made of a hard component. The sealing element 124d is implemented in such a way that it adjoins the stud 122d on one side and adjoins the shaft 62d of the interface 14d on the other side. The sealing element 124d is implemented essentially in the shape of a hollow cone. Moreover, an O-ring serves for a sealing of a housing interior against the stud 122d. For this purpose, the sealing element 124d in particular adjoins the shaft 62d of the interface 14d with undersize, such that the sealing element 124d gets at least partly twisted during a rotational movement of the shaft 62d of the interface 14d. On the other hand, the sealing element 124d adjoins the stud 122d with oversize. The sealing element 124d is made of an elastomer.

FIGS. 27 to 31 show the sealing element 124d implemented as a bellows seal in detail. The sealing element 124d implemented as a bellows seal has a rotationally symmetrical structure. In its outer envelope the sealing element 124d is realized similar to a truncated cone. A broad end 138d of the sealing element 124d serves with its outer shape for sealing against the stud 122d while a narrow end 140d of the sealing element 124d serves with its inner shape for sealing against the shaft 62d of the interface 14d. Respective sealing zones have a greater material thickness, such that the pressures that correspond to the sealing are achievable and the sealing is not too slack. The portion of the sealing element 124d that is situated between the broad end 138d with the greater diameter and the narrow end 140d with the smaller diameter essentially realizes two functions. On the one hand, some kind of a tub 142d is formed, in which running-in liquid is caught, such that it will not run to the sealing opposite the stud 122d. On the other hand, a torsion opportunity is created in the region, the sealing element 124d having in this region a small wall thickness, as a result of which the torsion is enabled. A torsion region 144d is formed.

The descriptions given here for specific figures may of course also be transferred to other figures which illustrate the same or similar implementations and in which the implementations are not described in such detail.

Of course, the implementation variants shown in the present specification are given by way of examples. In the scope of the invention the respective implementations and elements of these implementation variants can be combined with other implementation variants without leaving the scope of the present invention.

The invention claimed is:

1. An electrical brush handpiece, comprising at least one interface for a coupling with a plug-on brush, comprising at least one frame unit and comprising at least one drive unit for driving the interface which is accommodated in the frame unit, the drive unit comprising at least one rotor and at least one reset element that is coupled with the rotor with a first end in a rotationally fixed manner and is fixated to the frame unit with a second end in a rotationally fixed manner,
wherein the at least one reset element is implemented so as to be plate-shaped, and
wherein the at least one reset element comprises at least one abutment element, which is configured to adjoin an abutment of the frame unit in at least one first abutment position of the rotor.

2. The electrical brush handpiece according to claim 1, wherein
the at least one reset element is implemented so as to be planar in a rest position.

3. The electrical brush handpiece according to claim 1, wherein
the at least one reset element comprises at least one further abutment element, which is configured to adjoin an abutment of the frame unit in at least one second abutment position of the rotor.

4. The electrical brush handpiece according to claim 3, wherein
the at least one abutment element and the at least one further abutment element extend on the first end of the reset element, on opposed sides transversely to a base body of the reset element and away from the base body of the reset element.

5. The electrical brush handpiece according to claim 3, wherein
the at least one abutment element and the at least one further abutment element are configured to restrict a rotation of the rotor to a rotation angle of 2° to 25°.

6. The electrical brush handpiece according to claim 3, wherein
the at least one abutment element and the at least one further abutment element are in each case implemented so as to be curved along their respective main extension direction.

7. The electrical brush handpiece according to claim 1, wherein
the at least one reset element is implemented in an anchor shape, wherein the first end of the reset element is realized on a crown.

8. The electrical brush handpiece according to claim 1, wherein
the at least one reset element is implemented at least partially of a spring steel.

9. The electrical brush handpiece according to claim 1, wherein
a material of the at least one reset element comprises carbon, silicon, manganese, phosphorus, sulfur and/or chromium.

10. The electrical brush handpiece according to claim 9, wherein
a carbon content of the material of the at least one reset element is 0.7% to 1.3%.

11. The electrical brush handpiece according to claim 9, wherein
a silicon content of the material of the at least one reset element is 0.1% to 0.5%.

12. The electrical brush handpiece according to claim 9, wherein
a manganese content of the material of the at least one reset element is 0.2% to 0.8%.

13. The electrical brush handpiece according to claim 9, wherein
a phosphorus content of the material of the at least one reset element is 0.00% to 0.04%.

14. The electrical brush handpiece according to claim 9, wherein
a sulfur content of the material of the at least one reset element is 0.00% to 0.04%.

15. The electrical brush handpiece according to claim 9, wherein
a chromium content of the material of the at least one reset element is 0.00% to 0.05%.

16. The electrical brush handpiece according to claim 1, wherein
the at least one rotor comprises at least one integrally implemented cage element having at least one receiving region for an accommodation of at least one magnet.

17. The electrical brush handpiece according to claim 16, wherein
the cage element has a base body comprising at least one receiving region for the at least one magnet, and has axis projections, which are arranged on both sides of the base body, forming a rotation axis of the rotor.

18. The electrical brush handpiece according to claim 17, wherein
the reset element is with its first end coupled with a first axis projection of the axis projections of the rotor.

19. The electrical brush handpiece according to claim 16, wherein
the rotor comprises at least one cover, which is configured for a closure of the receiving region of the cage element.

20. The electrical brush handpiece according to claim 16, wherein
the cage element has a base body and has axis projections, which are arranged on both sides of the base body, forming a rotation axis of the rotor, wherein the axis projection comprises an adjoining surface for a fixation of the first end of the reset element, the adjoining surface being parallel to the rotation axis of the rotor and facing toward the rotation axis of the rotor.

21. The electrical brush handpiece according to claim 20, wherein
a smallest distance between the adjoining surface and the rotation axis of the rotor is at least approximately equivalent to 50% of the smallest thickness of the reset element.

22. The electrical brush handpiece according to claim 20, wherein
the adjoining surface is arranged in a deepening, which is configured for securing the reset element parallel to the adjoining surface in a form-fit manner.

23. The electrical brush handpiece according to claim 1, wherein
the drive unit comprises at least one first fixation element, which is embodied as a screw and is configured to connect the reset element to a first axis projection of the rotor.

24. The electrical brush handpiece according to claim 1, wherein
the drive unit comprises at least one second fixation element, which is embodied as a screw and is configured to fix the reset element on a projection of the frame unit.

25. The electrical brush handpiece according to claim 1, wherein
the drive unit is implemented by an oscillating armature motor.

26. The electrical brush handpiece according to claim 1, wherein
the at least one interface is configured for driving a plug-on brush with an oscillating bristle region, with a rotation axis that is substantially parallel to a longitudinal direction.

27. The electrical brush handpiece according to claim 1, wherein
the at least one interface is configured for driving a plug-on brush with an oscillating bristle region, with a rotation axis that is substantially perpendicular to a longitudinal direction.

28. An electrical toothbrush with an electrical brush handpiece according to claim 1 and with a plug-on brush.

* * * * *